US012623129B2

(12) United States Patent
Beach et al.

(10) Patent No.: US 12,623,129 B2
(45) Date of Patent: May 12, 2026

(54) GOLF BALL IMAGING FOR GOLF ENTERTAINMENT VENUE

(71) Applicant: Taylor Made Golf Company, Inc., Carlsbad, CA (US)

(72) Inventors: Todd Beach, Oceanside, CA (US); Ben Raymond, Encinitas, CA (US); Joshua Dipert, Carlsbad, CA (US)

(73) Assignee: Taylor Made Golf Company, Inc., Carlsbad, CA (US)

( * ) Notice: Subject to any disclaimer, the term of this patent is extended or adjusted under 35 U.S.C. 154(b) by 987 days.

(21) Appl. No.: 17/727,035

(22) Filed: Apr. 22, 2022

(65) Prior Publication Data

US 2022/0339513 A1     Oct. 27, 2022

Related U.S. Application Data

(60) Provisional application No. 63/246,586, filed on Sep. 21, 2021, provisional application No. 63/178,992, filed on Apr. 23, 2021.

(51) Int. Cl.
| | |
|---|---|
| *A63B 67/02* | (2006.01) |
| *A63B 24/00* | (2006.01) |
| *A63B 47/02* | (2006.01) |
| *G06F 16/51* | (2019.01) |

(52) U.S. Cl.
CPC .......... *A63B 67/02* (2013.01); *A63B 24/0021* (2013.01); *A63B 47/024* (2013.01); *G06F 16/51* (2019.01); *A63B 2024/0025* (2013.01);

*A63B 2024/0028* (2013.01); *A63B 2024/0037* (2013.01); *A63B 2024/0056* (2013.01); *A63B 2220/05* (2013.01); *A63B 2220/806* (2013.01)

(58) Field of Classification Search
CPC ... A63B 67/02; A63B 24/0021; A63B 47/024; G06F 16/51
See application file for complete search history.

(56) References Cited

U.S. PATENT DOCUMENTS

| | | | | |
|---|---|---|---|---|
| 5,370,389 | A | 12/1994 | Reising | |
| 8,306,390 | B2 * | 11/2012 | Yoshikawa | G06F 16/739 386/223 |
| 10,639,529 | B1 * | 5/2020 | Luciano, Jr. | A63B 60/46 |
| 2005/0200837 | A1 * | 9/2005 | Mydlack | G01N 21/8851 356/237.1 |
| 2010/0210377 | A1 * | 8/2010 | Lock | A63B 69/3658 473/409 |
| 2011/0076657 | A1 * | 3/2011 | Forest | G06Q 10/10 434/252 |

(Continued)

*Primary Examiner* — Joseph B Baldori
*Assistant Examiner* — Christopher Glenn
(74) *Attorney, Agent, or Firm* — Sterne, Kessler, Goldstein & Fox P.L.L.C.

(57) ABSTRACT

Golf entertainment venues with a computing system configured to optically identify and track graphical images located on golf balls hit by players. The graphical image located on a golf ball can be associated with a player and the computing system can assign the player a score when that player's golf ball successfully arrives at a target area. In some embodiments, the graphical images can be printed on the golf balls using, for example, a single pass inkjet printing technique. In some embodiments, the computing system can be configured to sort golf balls based on optically identified graphical images.

20 Claims, 26 Drawing Sheets

(56)          References Cited

U.S. PATENT DOCUMENTS

2013/0196787 A1*  8/2013  Luciano, Jr. ......... A63B 43/004
                                                      473/371
2018/0200601 A1*  7/2018  Jolliffe ............... A63B 71/0622
2019/0388729 A1* 12/2019  Shimizu ............. A63B 69/3658
2020/0406118 A1* 12/2020  Buscemi ........... A63B 71/0622

* cited by examiner

600

CAPTURE DIGITAL IMAGES OF GOLF BALLS — 602

IDENTIFY GRAPHICAL IMAGES INCLUDED ON GOLF BALLS — 604

REGISTER GRAPHICAL IMAGES TO PLAYERS — 606

1502

1502

1500

1512

1510

1512

GOLF BALL IMAGING FOR GOLF ENTERTAINMENT VENUE

CROSS REFERENCE TO RELATED APPLICATIONS

This application claims the benefit of U.S. Provisional Application No. 63/178,992, filed on Apr. 23, 2021, and U.S. Provisional Application No. 63/246,586, filed on Sep. 21, 2021, each of which is incorporated herein by reference in its entirety.

BACKGROUND

The modern game of golf can be traced to $15^{th}$ century Scotland, but some believe that its ancient origins can be traced back to the first century B.C. and the Roman game of paganica. A modern golf course includes either nine or eighteen holes. Each of these holes can include a teeing ground, a fairway area, rough and other hazard areas such as water traps or sand traps, and a putting green having a hole that is often marked with a target flag. Players must navigate through these holes with the goal of hitting golf balls into the hole in the least number of swings at the golf ball, also referred to as shots or strokes.

Many golf related venues have been developed to allow players to practice different golf shots without having to be on a golf course. These venues can include driving ranges, chipping areas, and/or putting greens to provide some examples to allow players to practice different long, medium, and/or short-range golf shots. And these venues have developed different types of golf-related games that have attracted a wide variety of players. In some cases, these golf-related games include various target areas at different locations within the venues that are assigned to different point values. These point values are often related to the difficulty of the golf shots required to hit these target areas. Players can accumulate points while playing these golf-related games and the player with the most points at the conclusion of the golf-related games can be declared the winner.

BRIEF DESCRIPTION OF THE DRAWINGS/FIGURES

The accompanying drawings, which are incorporated herein and form a part of the specification, illustrate the present disclosure and, together with the description, further serve to explain the principals thereof and to enable a person skilled in the pertinent art to make and use the same. Aspects of the present disclosure are best understood from the following detailed description when read with the accompanying figures. It is noted that, in accordance with the standard practice in the industry, features are not drawn to scale. In fact, the dimensions of the features may be arbitrarily increased or reduced for clarity of discussion.

FIG. 1 graphically illustrates a simplified exemplary golf entertainment venue according to some embodiments of the present disclosure.

FIG. 2 illustrates a flowchart for an exemplary golf entertainment game that can be played at the exemplary golf entertainment venue in accordance with some exemplary embodiments of the present disclosure.

FIG. 3A and FIG. 3B graphically illustrate simplified exemplary teeing areas that can be implemented within the exemplary golf entertainment venue according to some embodiments of the present disclosure.

FIG. 4A through FIG. 4D graphically illustrate exemplary images of golf balls that can be utilized by the exemplary golf entertainment venue according to some embodiments of the present disclosure.

FIG. 5 graphically illustrates an exemplary golf ball registration procedure within the exemplary golf entertainment venue according to some embodiments of the present disclosure.

FIG. 6 illustrates a flowchart for an exemplary golf ball registration procedure in accordance with some exemplary embodiments of the present disclosure.

FIG. 7A and FIG. 7B graphically illustrate simplified exemplary target areas that can be implemented within the exemplary golf entertainment venue according to some embodiments of the present disclosure.

FIG. 8 graphically illustrates an exemplary operation to identify players that hit golf balls within the exemplary golf entertainment venue according to some exemplary embodiments of the present disclosure.

FIG. 9 illustrates a flowchart for an exemplary golf ball identification procedure in accordance with some exemplary embodiments of the present disclosure.

FIG. 10 graphically illustrates another simplified exemplary golf entertainment venue according to some embodiments of the present disclosure.

FIG. 11 graphically illustrates a further simplified exemplary golf entertainment venue according to some embodiments of the present disclosure.

Figure 24:
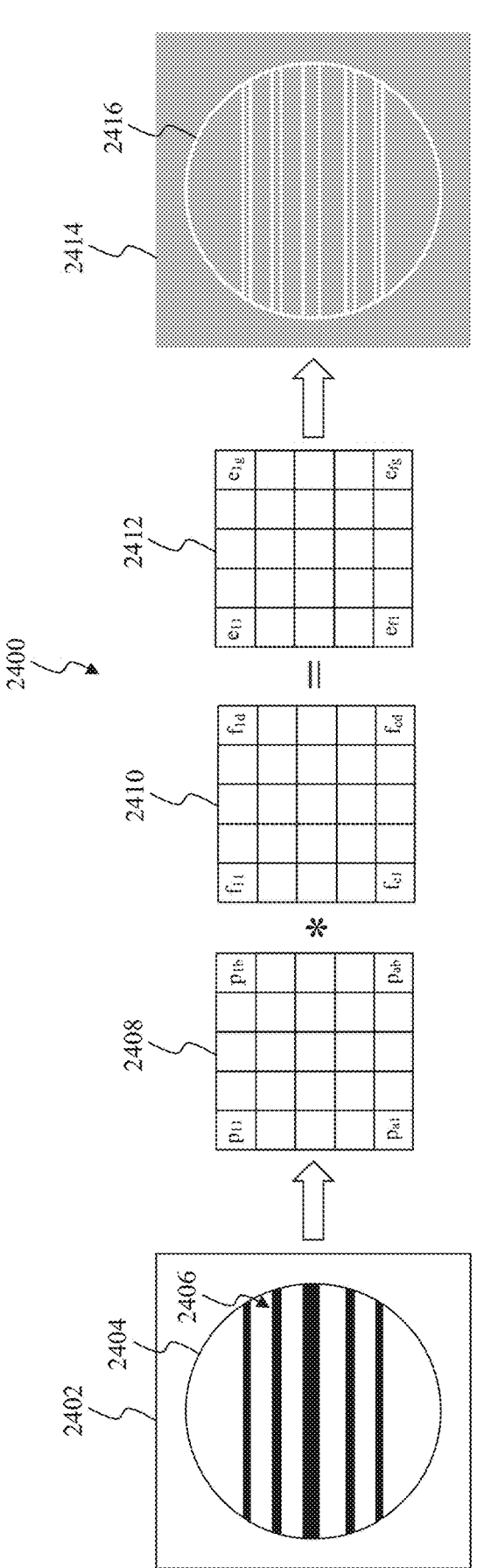

FIG. 24 graphically illustrates exemplary image processing techniques that can be used within the exemplary golf entertainment venue according to some embodiments of the present disclosure.

In the accompanying drawings, like reference numbers indicate identical or functionally similar elements. Additionally, the left most digit(s) of a reference number identifies the drawing in which the reference number first appears.

BRIEF SUMMARY

The present disclosure describes golf entertainment venues that are capable of optically identifying and tracking golf balls within the venue. The foregoing and other objects, features, and advantages of the invention(s) will become more apparent from the following detailed description, which proceeds with reference to the accompanying figures.

A first aspect (1) of the present application is directed to a computing system for a golf entertainment venue, the computing system including: one or more memories that store a golf ball registration database, the golf ball registration database including a plurality of graphical images included on a plurality of golf balls within the golf entertainment venue; and one or more processors configured to execute instructions stored in the memory, the instructions, when executed by the one or more processors, configuring the one or more processors to: receive a first digital image of a golf ball from among the plurality of golf balls that is to be hit by a player from a teeing area within the golf entertainment venue, identify a graphical image included on a golf ball from the first digital image, register the graphical image included on the golf ball to the player in the golf ball registration database, receive a second digital image of the golf ball in response to the golf ball arriving at a target area within the golf entertainment venue, identify the graphical image included on the golf ball from the second digital image, and identify that the player hit the golf ball that arrives at the target area from the graphical image included on the golf ball using the golf ball registration database.

In a second aspect (2), the computing system according to the first aspect (1) is provided and the instructions, when executed by the one or more processors, configure the one or more processors to: identify a second graphical image from among the plurality of graphical images of the golf ball registration database that matches the graphical image included on the golf ball; and associate the second graphical image to the player in the golf ball registration database to register the graphical image included on the golf ball to the player in the golf ball registration database.

In a third aspect (3), the computing system according to the first aspect (1) is provide and the instructions, when executed by the one or more processors, configure the one or more processors to: identify a second graphical image from among the plurality of graphical images of the golf ball registration database that matches the graphical image included on the golf ball; and identify the player that is associated with the second graphical image in the golf ball registration database as the player that hit the golf ball that arrives at the target area.

In a fourth aspect (4), the computing system according to any one of aspects (1)-(3) is provided and the instructions, when executed by the one or more processors, configure the one or more processors to: receive the first digital image from a teeing area image capture device associated with the teeing area, and receive the second digital image from a target area image capture device associated with the target area.

In a fifth aspect (5), the plurality of graphical images according to any one of aspects (1)-(4) are configured and arranged on the plurality of golf balls to differentiate the plurality of golf balls from one another.

In a sixth aspect (6), the computing system according to any one of aspects (1)-(5) is provided and the instructions, when executed by the one or more processors, configure the one or more processors to: receive a third digital image of the golf ball as the golf ball is traveling through a sorting system of the golf entertainment venue, identify the graphical image included on the golf ball from the third digital image, and sort the golf ball to be collected with other golf balls within the golf entertainment venue having the graphical image.

In a seventh aspect (7), the computing system according to any one of aspects (1)-(6) is provided and the instructions, when executed by the one or more processors, configure the one or more processors to: receive a third digital image of the golf ball as the golf ball is travelling through a sorting system of the golf entertainment venue; calculate a statistical measure of the golf ball from the third digital image to numerically quantify a degradation level of the golf ball; and compare the statistical measure to a golf ball degradation threshold to determine whether to remove the golf ball from being used within the golf entertainment venue.

An eighth aspect (8) of the present application is directed to a method for operating a golf entertainment venue, the method including: capturing, by a first image capture device within the golf entertainment venue, a first digital image of a golf ball that is to be hit by a player from a teeing area within the golf entertainment venue, the first digital image including the golf ball having a graphical image to differentiate the golf ball from other golf balls within the golf entertainment venue; registering, by the computing system using the first digital image, the graphical image included on the golf ball to the player in a golf ball registration database; capturing, by a second image capture device within the golf entertainment venue, a second digital image of the golf ball in response to the golf ball arriving at a target area within the golf entertainment venue, the second digital image including the golf ball having the graphical image; and identifying, by the computing system using the second digital image, that the player hit the golf ball that arrives at the target area from the graphical image included on the golf ball using the golf ball registration database.

In a ninth aspect (9), capturing the first digital image according to the eighth aspect (8) includes capturing the first digital image at the teeing area, and capturing the second digital image according to the eight aspect (8) includes capturing the second digital image at the target area.

In a tenth aspect (10), registering the graphical image according to the eighth aspect (8) or the ninth aspect (9) includes identifying a second graphical image from among the plurality of graphical images of the golf ball registration database that matches the graphical image included on the golf ball; and associating the second graphical image to the player in the golf ball registration database to register the graphical image included on the golf ball to the player in the golf ball registration database.

In an eleventh aspect (11), identifying that the player hit the golf ball according to the eighth aspect (8) or the ninth aspect (9) includes identifying a second graphical image from among the plurality of graphical images of the golf ball registration database that matches the graphical image included on the golf ball; and identifying the player that is associated with the second graphical image in the golf ball registration database as the player that hit the golf ball that arrives at the target area.

In a twelfth aspect (12), the method according to any one of aspects (8)-(11) further includes sorting the golf ball to be collected with other golf balls within the golf entertainment venue having the graphical image.

In a thirteenth aspect (13), the method according to any one of aspects (8)-(12) further includes: capturing a third digital image of the golf ball as the golf ball is travelling through a sorting system within the golf entertainment venue; calculating a statistical measure of the golf ball from the third digital image to numerically quantify a degradation level of the golf ball; and comparing the statistical measure to a golf ball degradation threshold to determine whether to remove the golf ball from being used within the golf entertainment venue.

A fourteenth aspect (14) of the present application is directed to a golf entertainment venue, including: a first image capture device configured to capture a first digital image of a golf ball that is to be hit by a player from a teeing area within the golf entertainment venue, the first digital image including the golf ball having a graphical image to differentiate the golf ball from other golf balls within the golf entertainment venue; a second image capture device configured to capture a second digital image of the golf ball in response to the golf ball arriving at a target area within the golf entertainment venue, the second digital image including the golf ball having the graphical image; a golf entertainment venue computing system configured to: identify a graphical image included on a golf ball from the first digital image, register the graphical image included on the golf ball to the player in a golf ball registration database, identify the graphical image included on the golf ball from the second digital image, and identify that the player hit the golf ball that arrives at the target area from the graphical image included on the golf ball using the golf ball registration database.

In a fifteenth aspect (15), the golf entertainment venue computing system according to the fourteenth aspect (14) includes: a teeing area computing device; and a golf entertainment venue computing device, and the teeing area computing device and the golf entertainment venue computing device are configured to functionally cooperate to register the graphical image included on the golf ball to the player in the golf ball registration database.

In a sixteenth aspect (16) the golf entertainment venue computing system according to the fourteenth aspect (14) or the fifteenth aspect (15) includes: a target area computing device; and a golf entertainment venue computing device, and the target area computing device and the golf entertainment venue computing device are configured to functionally cooperate to identify that the player hit the golf ball that arrives at the target area from the graphical image included on the golf ball using the golf ball registration database.

In a seventeenth aspect (17), the golf entertainment venue computing system according to any one of aspects (14)-(16) is configured to: identify a second graphical image from among the plurality of graphical images of the golf ball registration database that matches the graphical image included on the golf ball; and associate the second graphical image to the player in the golf ball registration database to register the graphical image included on the golf ball to the player in the golf ball registration database.

In an eighteenth aspect (18), the golf entertainment venue computing system according to any one of aspects (14)-(16) is configured to: identify a second graphical image from among the plurality of graphical images of the golf ball registration database that matches the graphical image included on the golf ball; and identify the player that is associated with the second graphical image in the golf ball registration database as the player that hit the golf ball that arrives at the target area.

In a nineteenth aspect (19), the golf entertainment venue according to any one of aspects (14)-(18) further includes a sorting system configured to sort the golf ball to be collected with other golf balls within the golf entertainment venue having the graphical image.

In a twentieth aspect (20), the golf entertainment venue according to any one of aspects (14)-(18) further includes a sorting system configured to: capture a third digital image of the golf ball as the golf ball is travelling through the sorting system; calculate a statistical measure of the golf ball from the third digital image to numerically quantify a degradation level of the golf ball; and compare the statistical measure to a golf ball degradation threshold to determine whether to remove the golf ball from being used within the golf entertainment venue.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the examples. This repetition does not in itself dictate a relationship between the embodiments and/or configurations discussed.

Overview

Golf balls within an exemplary golf entertainment venue can include, for example, be printed, painted, or stamped on, various graphical images that can be used to differentiate the golf balls from one another. Players can hit these golf balls from teeing areas within the exemplary golf entertainment venue to different target areas with the exemplary golf entertainment venue. The exemplary golf entertainment venue can register the graphical images included on the golf balls to the players within the teeing areas. Thereafter, the exemplary golf entertainment venue can utilize these graphical images to identify the players that hit the golf balls that arrive at the different target areas.

Optical identification and tracking according to embodiments described herein allows golf balls to be identified and tracked at the exemplary golf entertainment venue. In particular, optical identification and tracking according to embodiments described herein allows golf balls to be identified, associated with a particular player, and tracked at the exemplary golf entertainment venue. Such optical identification and tracking can provide various advantages, including but not limited to one or more of the following advantages.

First, the optical identification and tracking can allow the exemplary golf entertainment venue to assign a particular player a score when that player successfully hits a golf ball to a target area.

Second, the optical identification and tracking can be paired with other optical image techniques to measure ball flight characteristics of a particular player's golf ball. In some cases, these measured ball flight characteristics can be utilized by the exemplary golf entertainment venue to assign a player a score associated with the ball flight characteristics.

Such ball flight characteristic scores can be combined with a player's score for successfully hitting a golf ball to a target area.

Third, the optical identification and tracking can facilitate sorting of the golf balls at the exemplary golf entertainment venue. For example, in some embodiments, golf balls having the same graphical image can be sorted and collected for re-use. Sorting optically can also allow a player to select a particular graphical image for his or her golf balls and associate that particular image with that player. In some cases, particular graphical images can be associated with particular ball types (for example, golf ball brands). In such cases, the graphical images can be utilized to sort different golf ball types.

Fourth, the optical identification and tracking can facilitate sorting of worn golf balls at the exemplary golf entertainment venue. Worn golf balls can be optically identified at the exemplary golf entertainment venue by analyzing one or more wear characteristics of graphical images, and the worn balls can be removed from service, temporarily or permanently.

Exemplary Golf Entertainment Venue

Figure 1:
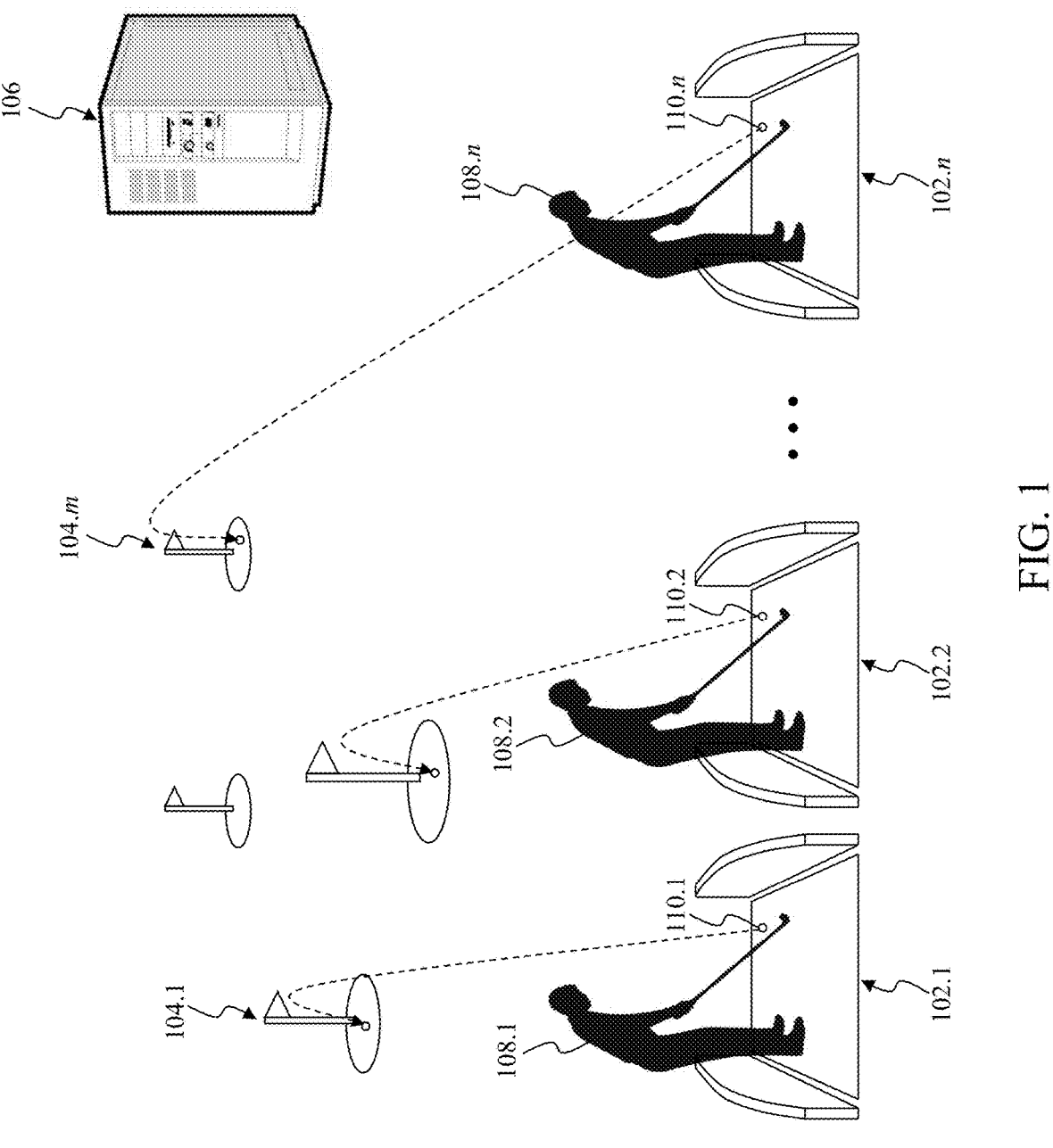

FIG. 1 graphically illustrates a simplified exemplary golf entertainment venue according to some embodiments of the present disclosure. In the exemplary embodiment illustrated in FIG. 1, a golf entertainment venue 100 can register graphical images included, for example, printed, painted, or stamped, on different golf balls to different players within the golf entertainment venue 100. These graphical images can be used by the golf entertainment venue 100 to identify which players hit these golf balls. As illustrated in FIG. 1, the golf entertainment venue 100 includes teeing areas 102.1 through 102.n, target areas 104.1 through 104.m, and a golf entertainment venue computing system 106. In some embodiments, the golf entertainment venue 100 can represent a golf driving range, a golf chipping area, and/or a golf putting green to provide some examples.

The teeing areas 102.1 through 102.n represent areas within the golf entertainment venue 100 for players 108.1 through 108.n to hit golf balls 110.1 through 110.n to practice different golf shots. As to be described in further detail below, the golf balls 110.1 through 110.n can include, for example, be printed, painted, or stamped on, various graphical images to differentiate the golf balls 110.1 through 110.n, or specific groups of golf balls 110.1 through 110.n, from one another. Generally, these graphical images can include one or more patterns, designs, decorations, shapes, illustrations, pictures, diagrams, and/or the like that can differentiate the golf balls 110.1 through 110.n, or specific groups of golf balls 110.1 through 110.n, from one another. In the exemplary embodiment illustrated in FIG. 1, the golf entertainment venue computing system 106 can perform a golf ball registration procedure to register the golf balls 110.1 through 110.n to the players 108.1 through 108.n. As part of the golf ball registration procedure, the golf entertainment venue 100 can capture one or more digital images of the golf balls 110.1 through 110.n that are hit by the players 108.1 through 108.n from the teeing areas 102.1 through 102. As part of the golf ball registration procedure, the golf entertainment venue computing system 106 can register the graphical images included on the golf balls 110.1 through 110.n to the players 108.1 through 108.n. As part of the golf ball registration procedure, the golf entertainment venue computing system 106 can store a golf ball registration database that maps the graphical images included on the golf balls 110.1 through 110.n to their associated players from among the players 108.1 through 108.n. The golf ball registration database can include a plurality of graphical images included on the golf balls 110.1 through 110.n within the golf entertainment venue 100. In some embodiments, the golf entertainment venue computing system 106 can include one or more memories that store the golf ball registration database. For example, the golf entertainment venue computing system 106 can register the one or more graphical images included on the golf ball 110.1 to the player 108.1, one or more graphical images included on the golf ball 110.2 to the player 108.2, and/or one or more graphical images included on the golf ball 110.n to the player 108.n.

As illustrated in FIG. 1, the players 108.1 through 108.n can utilize the teeing areas 102.1 through 102.n to practice different golf shots while aiming for the target areas 104.1 through 104.m. In the exemplary embodiment illustrated in FIG. 1, the players 108.1 through 108.n can hit the golf balls 110.1 through 110.n from the teeing areas 102.1 through 102.n to the target areas 104.1 through 104.m. As an example, the player 108.1 can hit the golf ball 110.1 from the teeing area to 102.1 the target area 104.1, the player 108.2 can hit the golf ball 110.2 from the teeing area 102.2 to the target area 104.2, and the player 108.n can hit the golf ball 110.n from the teeing area 102.n to the target area 104.m. In some embodiments, the golf entertainment venue computing system 106 can register the golf balls 110.1 through 110.n to the players 108.1 through 108.n, as described above, before, as, or after the players 108.1 through 108.n hit the golf balls 110.1 through 110.n from the teeing areas 102.1 through 102.n.

In the exemplary embodiment illustrated in FIG. 1, the golf entertainment venue computing system 106 can perform a golf ball identification procedure to identify the players 108.1 through 108.n that hit the golf balls 110.1 through 110.n that arrive at the target areas 104.1 through 104.m. As an example, the golf entertainment venue computing system 106 can identify that the player 108.1 hit the golf ball 110.1 that arrives at the target area 104.1, the player 108.2 hit the golf ball 110.2 that arrives at the target area 104.2, and the player 108.n hit the golf ball 110.n that arrives at the target area 104.m. As part of the golf ball registration procedure, the golf entertainment venue 100 can capture one or more digital images of the golf balls 110.1 through 110.n that arrive at the target areas 104.1 through 104.m. As part of this golf ball identification procedure, the golf entertainment venue computing system 106 identifies the graphical images included on the golf balls 110.1 through 110.n that arrive at the target areas 104.1 through 104.m. As part of this golf ball identification procedure, the golf entertainment venue computing system 106 determines the players 108.1 through 108.n that are registered to these graphical images from the golf ball registration database as described above to identify the players 108.1 through 108.n that hit the golf balls 110.1 through 110.n that arrive at the target areas 104.1 through 104.m. As an example, the golf entertainment venue computing system 106 identifies one or more graphical images included on the golf ball 110.1 as the golf ball 110.1 arrives at the target area 104.1. In this example, the golf entertainment venue computing system 106 determines the player 108.1 is registered to the one or more graphical images included on the golf ball 110.1 from the golf ball registration database as described above to identify that the player 108.1 hit the golf ball 110.1 that arrives at the target area 104.1.

In some embodiments, the golf entertainment venue 100 can additionally capture one or more parameters, characteristics, and/or attributes of the players 108.1 through 108.n and/or the golf balls 110.1 through 110.n, such as downward swing path, impact, club face angle, launch angle and/or ball speed to provide some examples. In some embodiments, the golf entertainment venue 100 can capture one or more parameters, characteristics, and/or attributes of the players 108.1 through 108.$n$ and/or the golf balls 110.1 through 110.$n$, such as downward swing path, impact, club face angle, launch angle and/or ball speed, using one or more club face impact detection techniques. In some embodiments, golf entertainment venue 100 can include one or more ball-flight cameras, for example, a GCQuad Launch Monitor manufactured by Foresight Sports, for capturing club face impact data. In some embodiments, the golf clubs used by the players 108.1 through 108.$n$ can include graphical images on their club faces to assist in capturing the one or more club face impact parameters, characteristics, and/or attributes of the players 108.1 through 108.$n$ and/or the golf balls 110.1 through 110.$n$. In these embodiments, the graphical images on the faces of the golf clubs can range from simple geometric shapes, for example, a circle, to more complex images such as those included on, for example, printed on, painted on, or stamped on, the golf balls 110.1 through 110.$n$, In these embodiments, the golf entertainment venue 100 can capture images of these graphical images on the faces of the golf clubs being used by the players 108.1 through 108.$n$ during a ball strike and can thereafter analyze these captured images to calculate the one or more club face impact parameters, characteristics, and/or attributes of the players 108.1 through 108.$n$ and/or the golf balls 110.1 through 110.$n$. In some embodiments, the golf clubs used by the players 108.1 through 108.$n$ can include one or more piezoelectric devices attached to their club faces to assist in capturing the one or more club face impact parameters, characteristics, and/or attributes of the players 108.1 through 108.$n$ and/or the golf balls 110.1 through 110.$n$.

In some embodiments, the golf entertainment venue computing system 106 can be configured to calculate one or more ball flight characteristics of the golf balls 110.1 through 110.$n$, such as a backspin rate, a side spin rate, a launch angle, a left/right trajectory, ball speed, an off-center trajectory, a lateral distance traveled, and a vertical distance traveled to provide some examples. In the some embodiments, the golf entertainment venue 100 can capture the one or more parameters, characteristics, and/or attributes of the players 108.1 through 108.$n$ and/or the golf balls 110.1 through 110.$n$ before, as, or after the players 108.1 through 108.$n$ hit the golf balls 110.1 through 110.$n$ from the teeing areas 102.1 through 102.$n$. In some embodiments, the golf entertainment venue 100 can display the ball flight characteristics for the golf balls 110.1 through 110.$n$ at the teeing areas 102.1 through 102.$n$, for example, on one or more electronic displays located in teeing areas 102.1 through 102.$n$.

In the exemplary embodiment illustrated in FIG. 1, the golf entertainment venue computing system 106 can utilize the one or more parameters, characteristics, and/or attributes of the players 108.1 through 108.$n$ and/or the golf balls 110.1 through 110.$n$ to predict that the golf balls 110.1 through 110.$n$ are expected to arrive at specific target from among the target areas 104.1 through 104.$m$. In some embodiments, the golf entertainment venue computing system 106 may not be able to identify the one or more graphical images included on the golf balls 110.1 through 110.$n$ that arrive at the target areas 104.1 through 104.$m$ as described above, for example, when the golf balls 110.1 through 110.$n$ have become heavily degraded. In these embodiments, the golf entertainment venue computing system 106 can utilize the predictions to identify the players

108.1 through 108.$n$ that hit the golf balls 110.1 through 110.$n$ that arrive at the target areas 104.1 through 104.$m$. As an example, the golf entertainment venue computing system 106 can predict that the golf ball 110.1 is to arrive at the target area 104.1 based on one or more ball flight characteristics of the golf balls 110.1 through 110.$n$. In this example, the golf entertainment venue computing system 106 can identify the player 108.1 hit the golf ball 110.1 from this prediction when the golf entertainment venue computing system 106 is unable to identify the one or more graphical images included on the golf ball 110.1 at the target area 104.1.

In some embodiments, the golf entertainment venue computing system 106 can combine the one or more digital images of the golf balls 110.1 through 110.$n$ that are hit by the players 108.1 through 108.$n$ from the teeing areas 102.1 through 102.$n$, the one or more digital images of the golf balls 110.1 through 110.$n$ that arrive at the target areas 104.1 through 104.$m$, and/or the ball flight characteristics for the golf balls 110.1 through 110.$n$ and/or the ball flight characteristics for the golf balls 110.1 through 110.$n$. In some embodiments, the combined digital images and/or ball flight characteristics can be used to provide the players 108.1 through 108.$n$ with ball flight path data for the golf balls 110.1 through 110.$n$. In some embodiments, the ball flight path data can be displayed at the teeing areas 102.1 through 102.$n$, for example, on the one or more electronic displays located in teeing areas 102.1 through 102.$n$.

Figure 2:
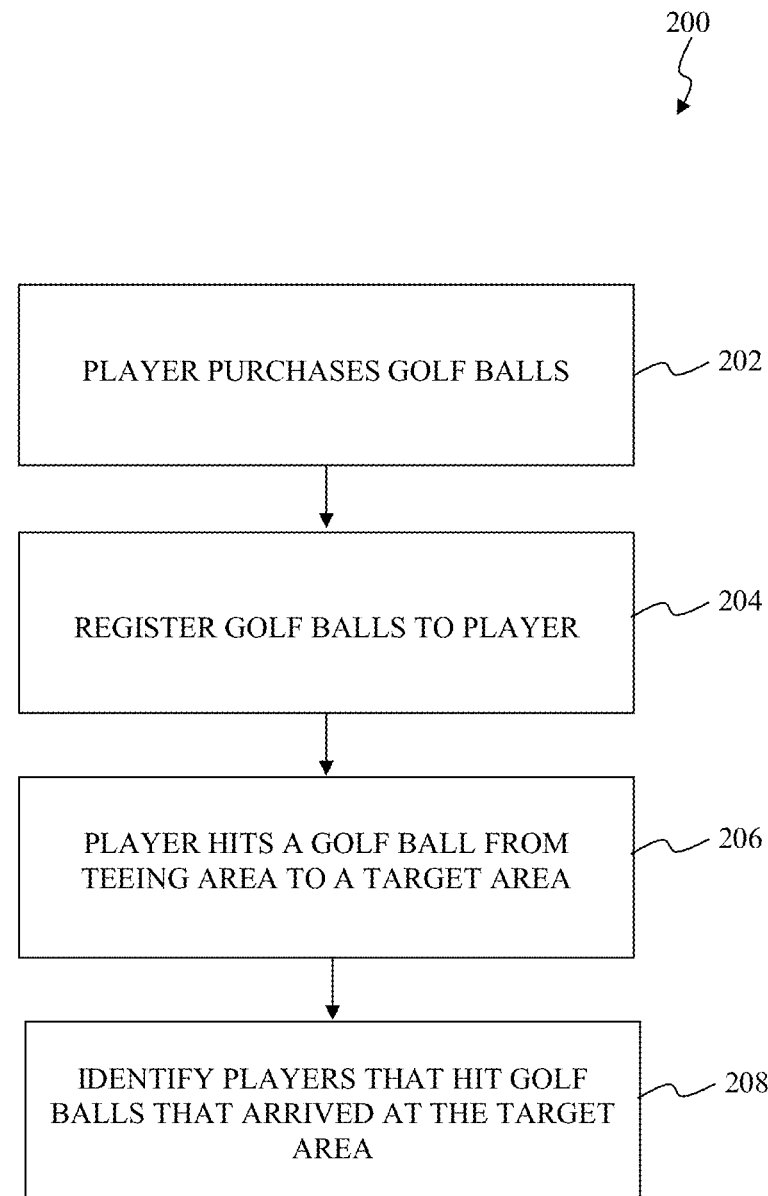

Exemplary Golf Entertainment Game that can be Played at the Exemplary Golf Entertainment Venue FIG. 2 illustrates a flowchart for an exemplary golf entertainment game that can be played at the exemplary golf entertainment venue in accordance with some exemplary embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 200 for an exemplary golf entertainment game that can be played at a golf entertainment venue, such as the golf entertainment venue 100 as described above. The operational control flow 200 can be executed by one or more computing devices, processors, controllers, systems, or other electrical, mechanical, and/or electro-mechanical devices executing firmware, software applications, routines, instructions, and/or or the like within the golf entertainment venue, such as the golf entertainment venue computing system 106.

At operation 202, a player within the golf entertainment venue can purchase golf balls, such as a bucket of the golf balls 110.1 as described above in FIG. 1, at the golf entertainment venue. In the exemplary embodiment illustrated in FIG. 2, the player can pay for various sizes of buckets of golf balls, which can be designated as small (30-50 balls), medium (50-80 balls), and large (80-150 balls) to provide some examples and can hit these golf balls from a teeing area to different target areas at their leisure. In the exemplary embodiment illustrated in FIG. 2, the golf balls can include the one or more graphical images that are, for example, printed, painted, or stamped, on the golf balls to differentiate the golf balls purchased by the player from one another and/or from other golf balls purchased by other players. In some embodiments, the golf entertainment venue can utilize a significantly large number, hundreds, thousands or tens of thousands to provide some examples, of unique graphical images on all, most, or a substantial number of the golf balls utilized by the golf entertainment venue to differentiate the golf balls purchased by the player from one another and/or from other golf balls purchased by other players. As to be described in further detail below, the golf balls purchased by the player can be uniquely, or near-uniquely, differentiated from other golf balls purchased by the player and/or from other golf balls purchased by other players. Herein, the term "near-unique" indicates that the same graphical image can be printed on more than one golf ball, but the statistical chances that multiple golf balls having the same the graphical image being used by multiple players is significantly small when compared to the overall number of possible graphical images included on all, most, or a substantial number of the golf balls being utilized by the golf entertainment venue.

At operation 204, the operation control flow 200 registers the golf balls from operation 202 to the player from operation 202. In the exemplary embodiment illustrated in FIG. 2, the operation control flow 200 can perform the golf ball registration procedure as described above in FIG. 1 to register the golf balls from operation 202 to the player from operation 202. As part of the golf ball registration procedure, the operation control flow 200 can register the graphical images included on the golf balls from operation 202 to the player from operation 202. As part of the golf ball registration procedure, the operation control flow 200 can register the graphical images included on the golf balls from operation 202 to the player from operation 202 in the golf ball registration database as described above in FIG. 1.

At operation 206, the player from operation 202 can hit the one of the golf balls from operation 202 from the teeing area from operation 202 to a target area from among the target areas from operation 202. In the exemplary embodiment illustrated in FIG. 2, the target areas can have different point values that can be related to the difficulty of the golf shots required to hit golf balls to the target areas.

At operation 208, the operation control flow 200 can identify players that hit golf balls that arrived at the target area from operation 206. In the exemplary embodiment illustrated in FIG. 2, the operational control flow 200 can perform the golf ball identification procedure as described above in FIG. 1 to identify the players that hit the golf balls that arrive at the target area from operation 206. As part of this golf ball identification procedure, the operational control flow 200 identifies the graphical images included on the golf balls that arrive at the target area from operation 206. As part of this golf ball identification procedure, the operational control flow 200 determines the players that are registered to these graphical images from the golf ball registration database as described above in FIG. 1. In the exemplary embodiment illustrated in FIG. 2, when the operational control flow 200 has identified that the player from operation 202 hit one of the golf balls from operation 202 that arrived at the target area from operation 206, the operational control flow 200 can update a score of the player from operation 202 with a score that is associated with the target area from operation 206. In some embodiments, the exemplary operational control flow 200 can calculate the ball flight path data for the golf balls from operation 202 in a substantially similar manner as described above in FIG. 1. In the exemplary embodiment illustrated in FIG. 2, the exemplary operational control flow 200 can use the ball flight path data to calculate the score of the player from operation 202. For example, in some embodiments, the exemplary operational control flow 200 can assign a ball flight score that is combined with the score that is associated with the target area from operation 206. In this example, the ball flight score can be used to further differentiate players playing the exemplary golf entertainment game from each other. The ball flight score can be based on one or more of: a backspin rate, a side spin rate, a launch angle, a left/right trajectory, ball speed, an off-center trajectory, a lateral distance traveled, and a vertical distance traveled. In this manner, the quality of a golf shot of the player from operation 202 be incorporated into the score of the player from operation 202. For example, a golf ball hit at a high side spin rate may be assigned a relatively low ball flight score while a golf ball hit at a high backspin rate may be assigned a relatively high ball flight score. As another example, a golf ball that arrives closer to a target flag of the target area from operation 206 may be assigned a relatively high ball flight score while golf ball that lands further from the target flag may be assigned a relatively low ball flight score.

Exemplary Golf Ball Registration Procedure: Capturing Digital Images of Golf Balls As described above, a golf entertainment venue computing system, such as the golf entertainment venue computing system 106 as described above in FIG. 1, can perform a golf ball registration procedure to register golf balls that are hit by players within a golf entertainment venue. As part of the golf ball registration procedure, the golf entertainment venue can capture one or more digital images of the golf balls that are hit by the players as to be described in further detail below.

Figures 3A, 3B:
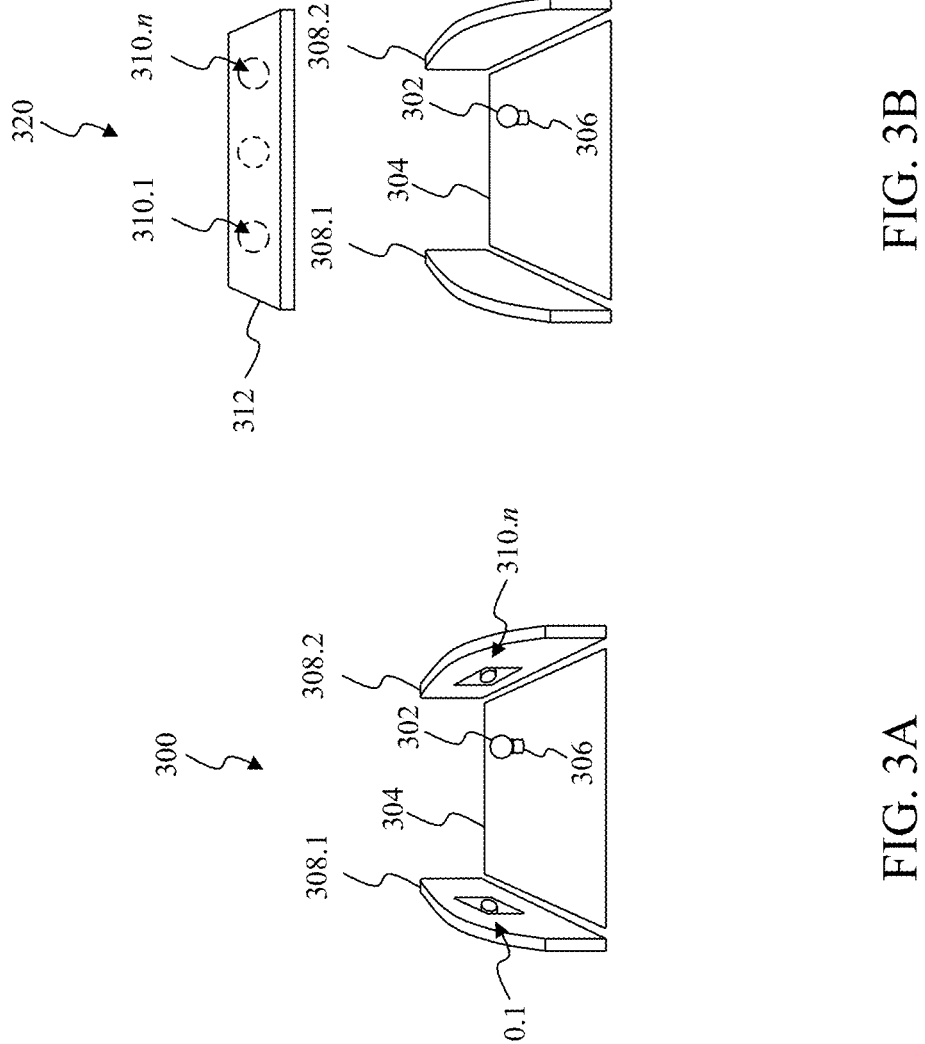

FIG. 3A and FIG. 3B graphically illustrate simplified exemplary teeing areas that can be implemented within the exemplary golf entertainment venue according to some embodiments of the present disclosure. As illustrated in FIG. 3A and FIG. 3B, a teeing area 300 and a teeing area 320 can capture one or more digital images of a golf ball 302. As to be described in further detail below, a golf entertainment venue computing system within a golf entertainment venue, such as the golf entertainment venue computing system 106 as described above in FIG. 1, can utilize the one or more digital images of the golf ball 302 to identify one or more graphical images included, for example, printed, painted, or stamped, on the golf ball 302. In the exemplary embodiment illustrated in FIG. 3A and FIG. 3B, the one or more graphical images can be used to differentiate the golf ball 302 from other golf balls within the exemplary golf entertainment venue. The golf entertainment venue computing system can register the one or more graphical images included on the golf ball 302 to a player as part of the golf ball registration procedure as described above in FIG. 1. The teeing area 300 and/or the teeing area 320 can represent exemplary embodiments of one or more of the teeing areas 102.1 through 102.$n$ as described above in FIG. 1.

In the exemplary embodiment illustrated in FIG. 3A and FIG. 3B, the teeing area 300 and the teeing area 320 can include a teeing mat 304 situated in between tee dividers 308.1 and 308.2. In some exemplary embodiments, the teeing area 300 and the teeing area 320 can include a tee 306 on the teeing mat 304. As illustrated in FIG. 3A and FIG. 3B, the teeing mat 304 can represent an area within the teeing area 300 and/or the teeing area 320 for the player to practice different golf shots. In some embodiments, the teeing mat 304 can include a designated area of grass, a rubber mat, and/or plastic teeing mat to provide some examples. As illustrated in FIG. 3A and FIG. 3B, the tee 306 represents a stand to support and/or elevate the golf ball 302 from the teeing mat 304. In some embodiments, the player can place the golf ball 302 onto the tee 306 and can thereafter hit the golf ball 302 from the tee 306 toward a target area within the golf entertainment venue. As illustrated in FIG. 3A and FIG. 3B, the tee dividers 308.1 and 308.2 can separate the teeing area 300 and the teeing area 320 from other teeing areas within the golf entertainment venue.

As illustrated in FIG. 3A and FIG. 3B, the teeing area 300 and the teeing area 320 can include one or more teeing area image capture devices 310.1 through 310.*n* to capture the one or more digital images of the golf ball 302. The teeing area image capture devices 310.1 through 310.*n* illustrated in FIG. 3A and FIG. 3B are for exemplary purposes only and not limiting. Those skilled in the relevant art(s) will recognize that the teeing area 300 and the teeing area 320 can include a different number of teeing area image capture devices 310.1 through 310.*n* than as depicted in FIG. 3A and FIG. 3 without departing from the spirit and scope of the present disclosure. As illustrated in FIG. 3A and FIG. 3B, the one or more teeing area image capture devices 310.1 through 310.*n* can capture the one or more digital images of the golf ball 302 from different locations and/or orientations within the teeing area 300 and/or the teeing area 320, respectively. The one or more teeing area image capture devices 310.1 through 310.*n* can be situated within the teeing area 300, for example, integrated within the tee dividers 308.1 and 308.2 as illustrated in FIG. 3A, mechanically connected to the tee dividers 308.1 and 308.2, and/or implemented as standalone, or discrete, devices situated within the teeing area 300. Alternatively, or in addition to, the one or more teeing area image capture devices 310.1 through 310.*n* can be situated outside of the teeing area 320, for example, situated above the teeing area 320 as illustrated in FIG. 3B. As illustrated in FIG. 3B, the one or more teeing area image capture devices 310.1 through 310.*n* can be integrated within an image capture device support structure 312, mechanically connected to the image capture device support structure 312, and/or implemented as standalone, or discrete, devices situated outside of the teeing area 320. In some embodiments, the image capture device support structure 312 can be connected to the teeing area 320 using various mechanical structures and/or can be suspended above the teeing area 320.

In the exemplary embodiment illustrated in FIG. 3A and FIG. 3B, the one or more teeing area image capture devices 310.1 through 310.*n* can capture the one or more digital images of the golf ball 302 before, as, or after the player hits the golf ball 302 from the teeing area 300 and/or the teeing area 320. In some embodiments, the one or more teeing area image capture devices 310.1 through 310.*n* can continuously, or near continuously, monitor the teeing area 300 and/or the teeing area 320. Alternatively, or in addition to, the one or more teeing area image capture devices 310.1 through 310.*n* can be triggered to monitor the teeing area 300 and/or the teeing area 320. In these embodiments, the one or more teeing area image capture devices 310.1 through 310.*n* can be triggered to capture the one or more digital images of the golf ball 302 in response to the golf ball 302 being placed onto a designated area on the teeing mat 304, for example, on the tee 306. Alternatively, or in addition to, the one or more teeing area image capture devices 310.1 through 310.*n* can capture the one or more digital images of the golf ball 302 in response to the golf ball 302 being hit from the designated area on the teeing mat 304, for example, from the tee 306. In some embodiments, the one or more teeing area image capture devices 310.1 through 310.*n* can additionally capture one or more parameters, characteristics, and/or attributes of the player and/or the golf ball 302, such as downward swing path, impact, club face angle, launch angle and/or ball speed to provide some examples. In these embodiments, the golf entertainment venue computing system can process these parameters, characteristics, and/or attributes to calculate one or more calculate one or more ball flight characteristics of the golf ball 302, such as a backspin rate, a side spin rate, a launch angle, a left/right trajectory, ball speed, an off-center trajectory, a lateral distance traveled, and a vertical distance traveled to provide some examples.

In some embodiments, the one or more teeing area image capture devices 310.1 through 310.*n* can include, for example, include, integrated with, and/or coupled to, a ball-flight camera to image the golf ball 302 as it travels from the teeing area 300 and/or the teeing area 320 towards the target area within the golf entertainment venue. In some embodiments, the ball-flight camera can include a GCQuad Launch Monitor manufactured by Foresight Sports. In some embodiments, the ball-flight camera can include a GCHawk™ Launch Monitor manufactured by Foresight Sports. In some embodiments, the ball-flight camera can include a TrackMan Launch Monitor manufactured by TrackMan.

In some embodiments, the one or more teeing area image capture devices 310.1 through 310.*n* can include one or more digital cameras. In these embodiments, the one or more digital cameras can include, but are not limited to, Nikon D800 D-SLR cameras.

Exemplary Golf Ball Registration Procedure: Identifying Graphical Images Included on Golf Balls Once the one or more digital images of the golf balls have been captured, the golf entertainment venue computing system can identify one or more graphical images included on the golf balls as described above in FIG. 1 as part of the golf ball registration procedure. As described above, the golf balls can include the one or more graphical images that are, for example, printed, painted, or stamped, on the golf balls. As to be described in further detail below, the golf entertainment venue computing system can identify the one or more graphical images from the one or more digital images of the golf balls.

FIG. 4A through FIG. 4D graphically illustrate exemplary images of golf balls that can be utilized by the exemplary golf entertainment venue according to some embodiments of the present disclosure. As described above, a golf entertainment venue, such as the golf entertainment venue 100 as described above in FIG. 1, can capture one or more digital images of a golf ball. In the exemplary embodiments illustrated in FIG. 4A through FIG. 4D, a golf entertainment venue computing system, such as the golf entertainment venue computing system 106 as described above in FIG. 1, can utilize the one or more digital images of the golf ball as illustrated in FIG. 4A through FIG. 4D to identify one or more graphical images included, for example, printed, painted, or stamped, on the golf ball. In the exemplary embodiment illustrated in FIG. 4A through FIG. 4D, the one or more graphical images can be used to differentiate the golf ball from other golf balls within the exemplary golf entertainment venue.

Figure 4A:
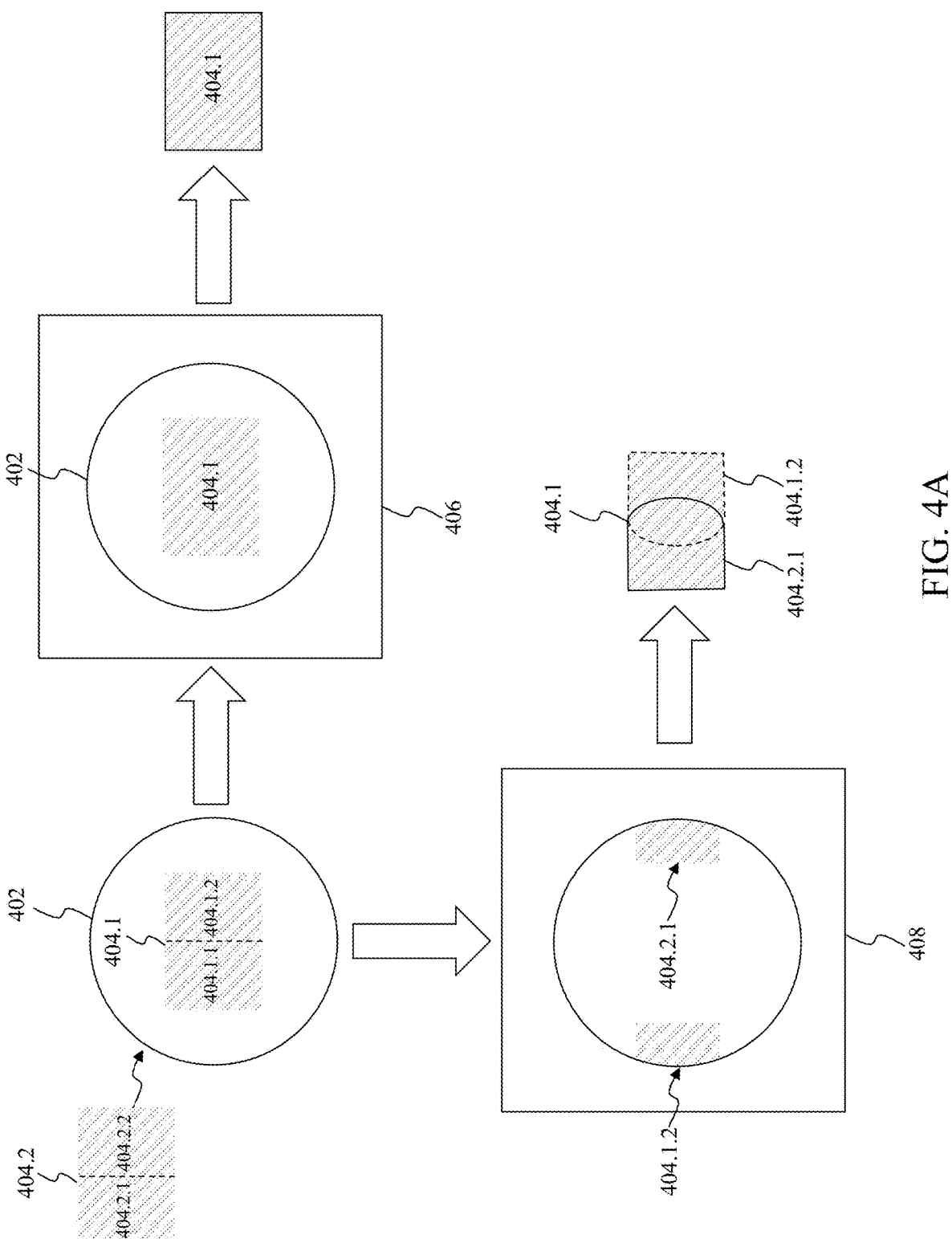

In the exemplary embodiment illustrated in FIG. 4A, a golf ball 402 can include graphical images 404.1 and 404.2 that can be, for example, printed, painted, or stamped, on the golf ball 402 as described above. In some embodiments, the graphical images 404.1 and 404.2 can be used to differentiate the golf ball 402 from other golf balls within the exemplary golf entertainment venue. The golf ball 402 can represent an exemplary embodiment of one or more of the golf balls 110.1 through 110.*n* as described above in FIG. 1. As illustrated in FIG. 4A, the graphical image 404.1 can be situated on a front surface of the golf ball 402 and the graphical image 404.2 can be situated on a back surface of the golf ball 402. In some embodiments, the graphical image 404.1 and the graphical image 404.2 can represent identical graphical images that are printed on the golf ball 402.

As described above, the golf entertainment venue computing system can capture one or more digital images of the golf ball 402, for example, before, as, or after the golf ball 402 is hit from a teeing area. Ideally, the golf entertainment venue can capture a digital image 406 of the golf ball 402 having the graphical image 404.1 and/or the graphical image 404.2 within the digital image 406 in their entireties as illustrated in FIG. 4A. In some embodiments, the golf entertainment venue can capture multiple digital images of the golf ball 402 until the digital image 406 includes the graphical image 404.1 and/or the graphical image 404.2 within the digital image 406 in their entireties. In the exemplary embodiment illustrated in FIG. 4A, the golf entertainment venue computing system can process the digital image 406 to identify the graphical image 404.1 and/or the graphical image 404.2 within the digital image 406. In some embodiments, this processing can include edge detection that identifies points in the digital image 406 at which the brightness of the digital image 406 changes sharply, for example, includes discontinuities. An exemplary edge detection technique is to be described below in FIG. 24. In some embodiments, the golf entertainment venue computing system can remove, for example, crop, the graphical image 404.1 and/or the graphical image 404.2 from the digital image 406 for further processing as to be described in further detail below.

However, in practice, the golf entertainment venue can capture a digital image 408 of the golf ball 402 having a portion of the graphical image 404.1 and a portion of the graphical image 404.2. As illustrated in FIG. 4A, the graphical image 404.1 can be logically separated into a first portion 404.1.1 and a second portion 404.1.2 and the graphical image 404.2 can be logically separated into a first portion 404.2.1 and a second portion 404.2.2. In the exemplary embodiment illustrated in FIG. 4A, the golf entertainment venue can capture the digital image 408 of the golf ball 402 having the second portion 404.1.2 of the graphical image 404.1 and the first portion 404.2.1 of the graphical image 404.2. In some embodiments, the graphical image 404.1 and the graphical image 404.2 are of sufficient surface area on the golf ball 402 such that the graphical image 404.1 and/or the graphical image 404.2 can be digitally reconstructed from the second portion of the graphical image 404.1.2 and the first portion of the graphical image 404.2.1. In the exemplary embodiment illustrated in FIG. 4A, the golf entertainment venue computing system can process the digital image 408 to identify the second portion 404.1.2 of the graphical image 404.1 and/or the first portion 404.2.1 of the graphical image 404.2 within the digital image 408. In some embodiments, this processing can include edge detection that identifies points in the digital image 408 at which the brightness of the digital image 408 changes sharply, for example, includes discontinuities. An exemplary edge detection technique is to be described below in FIG. 24. Once the second portion 404.1.2 of the graphical image 404.1 and the first portion 404.2.1 of the graphical image 404.2 have been identified within the digital image 406, the golf entertainment venue computing system can remove, for example, crop, the second portion 404.1.2 of the graphical image 404.1 and the first portion 404.2.1 of the graphical image 404.2 from the digital image 408. Thereafter, the golf entertainment venue computing system can reconstruct, for example, image stitch, the second portion 404.1.2 of the graphical image 404.1 and the first portion 404.2.1 of the graphical image 404.2 to reconstruct the graphical image 404.1 and/or the graphical image 404.2. In some embodiments, the golf entertainment venue computing system can provide the graphical image 404.1 and/or the graphical image 404.2 for further processing as to be described in further detail below.

Figure 4B:
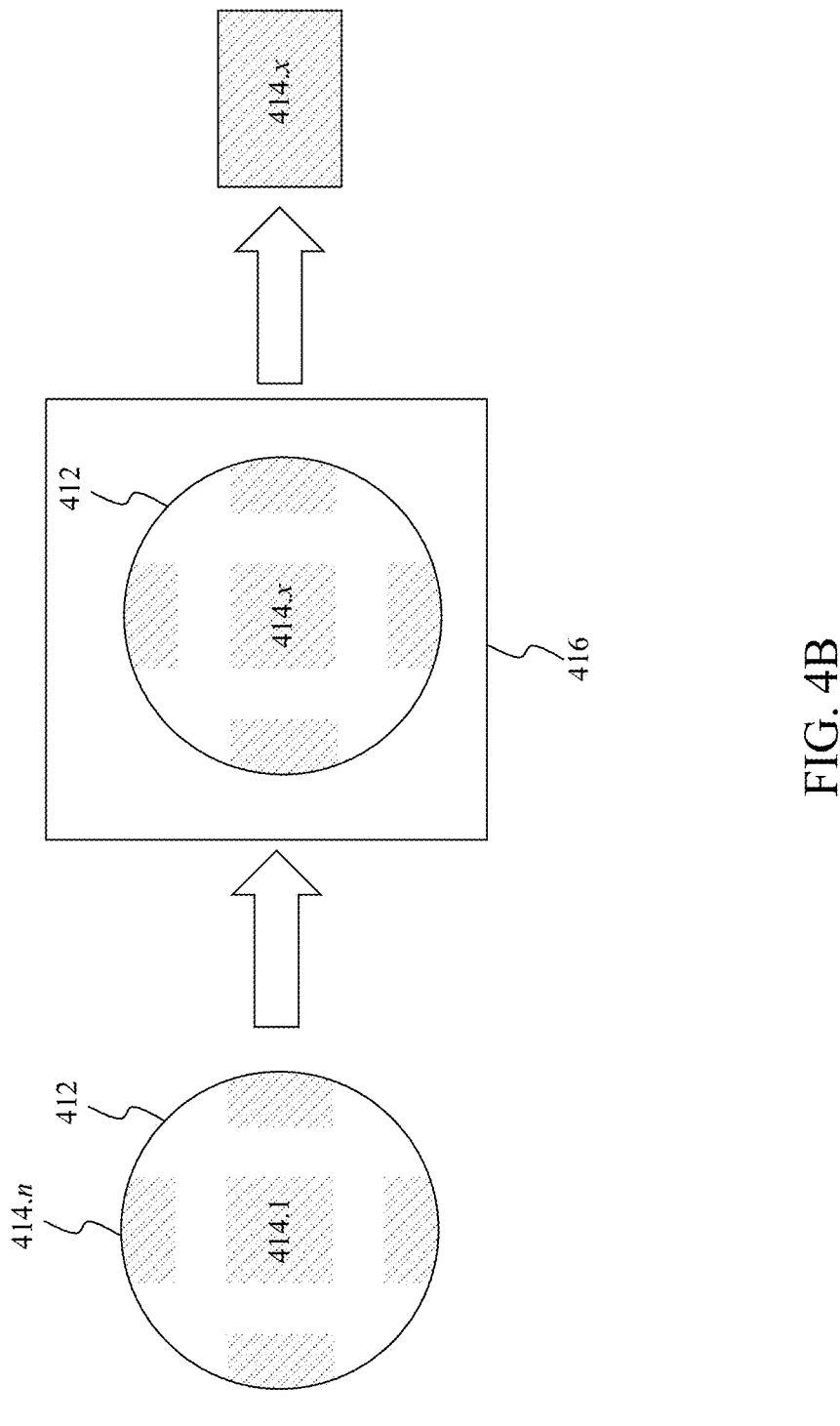

In the exemplary embodiment illustrated in FIG. 4B, a golf ball 412 can include graphical images 414.1 through 414.$n$ that can be, for example, printed, painted, or stamped, on the golf ball 412 as described above. In some embodiments, one or more of the graphical images 414.1 through 414.$n$ can be used to differentiate the golf ball 412 from other golf balls within the exemplary golf entertainment venue. The golf ball 412 can represent an exemplary embodiment of one or more of the golf balls 110.1 through 110.$n$ as described above in FIG. 1. In some embodiments, the graphical images 414.1 through 414.$n$ can represent identical, or nearly identical, graphical images that are included, for example, printed, painted, or stamped, on the golf ball 412. As described above, the golf entertainment venue can capture one or more digital images of the golf ball 412, for example, before, as, or after the golf ball 412 is hit from a teeing area. The golf entertainment venue can capture a digital image 416 of the golf ball 412 having a graphical image 414.$x$ from among the graphical images 414.1 through 414.$n$ within the digital image 416 in its entirety as illustrated in FIG. 4B. In the exemplary embodiment illustrated in FIG. 4B, the golf entertainment venue computing system can process the digital image 416 to identify the graphical image 414.$x$ within the digital image 416. In some embodiments, this processing can include edge detection that identifies points in the digital image 416 at which the brightness of the digital image 416 changes sharply, for example, includes discontinuities. An exemplary edge detection technique is to be described below in FIG. 24. In some embodiments, the golf entertainment venue computing system can remove, for example, crop, the graphical image 414.$x$ from the digital image 416. In some embodiments, the golf entertainment venue computing system can provide the graphical image 414.$x$ for further processing as to be described in further detail below. Exemplary embodiments for the graphical images 414.1 through 414.$n$ on the golf ball 412 are further described below in FIG. 15A through FIG. 15C. However, those skilled in the relevant art(s) will recognize that the graphical images 414.1 through 414.$n$ on the golf ball 412 are not limited to these embodiments described below in FIG. 15A through FIG. 15C.

Figure 4C:
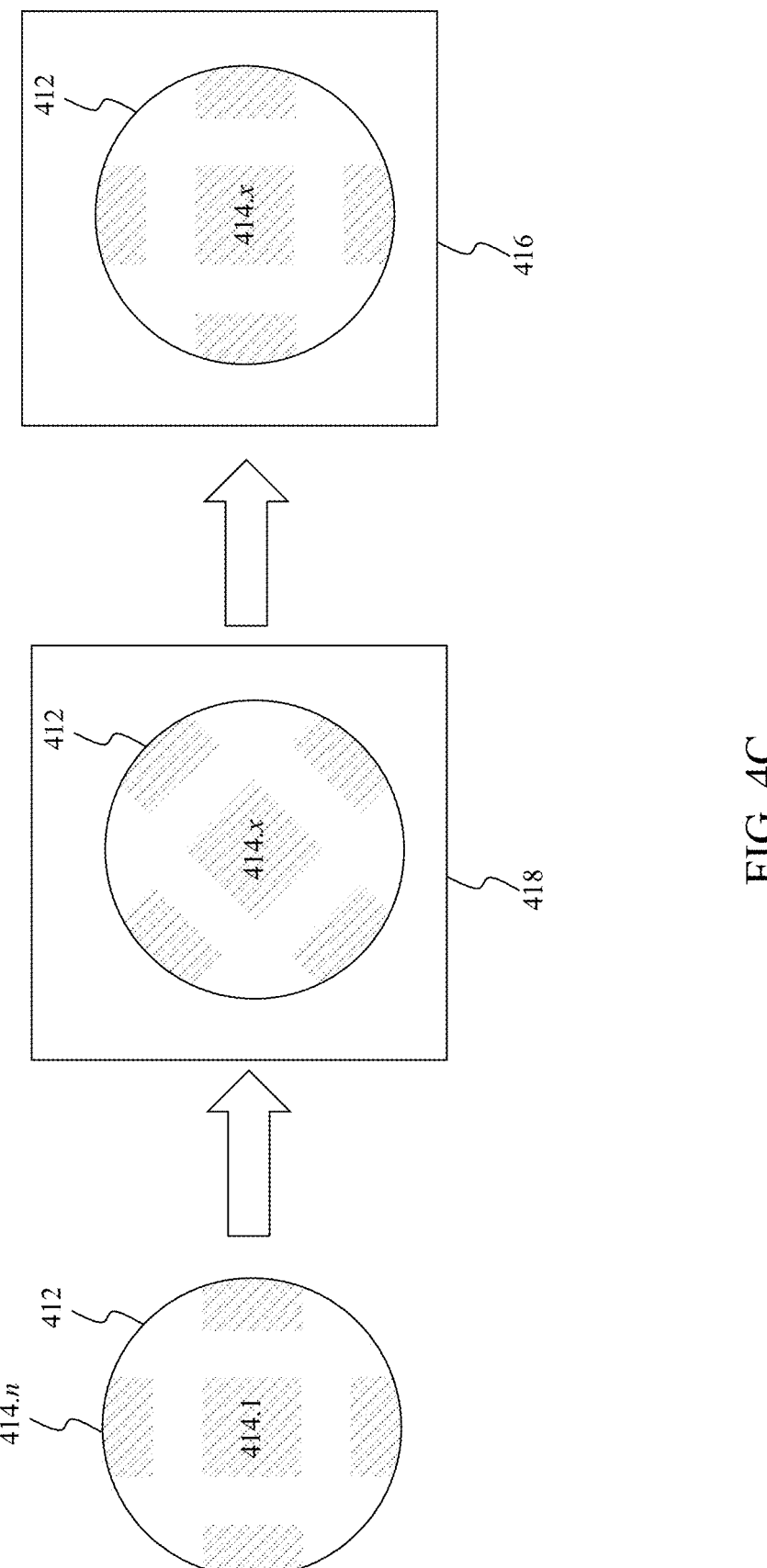

In some embodiments, the one or more graphical images included, for example, printed, painted, or stamped, on the golf balls within the golf entertainment venue can be rotated within the one or more digital images captured by the golf entertainment venue. In these embodiments, the golf entertainment venue computing system can process these digital images to de-rotate the one or more graphical images within the one or more digital images. As an example, in the exemplary embodiment illustrated in FIG. 4C, the golf entertainment venue can capture a digital image 418 of the golf ball 412 with the golf ball 412 being rotated within the digital image 418 when compared to the golf ball 412 within the digital image 416. For example, the graphical image 414.$x$ within the digital image 418 can be rotated in an y-z plane of a Cartesian coordinate system by approximately forty-five (45) degrees as illustrated in FIG. 4C when compared to the graphical image 414.$x$ within the digital image 416 as illustrated in FIG. 4B. In the exemplary embodiment illustrated in FIG. 4C, the golf entertainment venue computing system can process the digital image 418 to de-rotate the golf ball 412 within the digital image 418 to provide the digital image 416 as described above in FIG. 4B. In some embodiments, the golf entertainment venue computing system can rotate the golf ball 412 within the digital image 418 about a point, for example, an approximate center of the golf ball 412, within the digital image 418 by a rotation angle to provide the digital image 416 as described above in FIG. 4B.

Figure 4D:
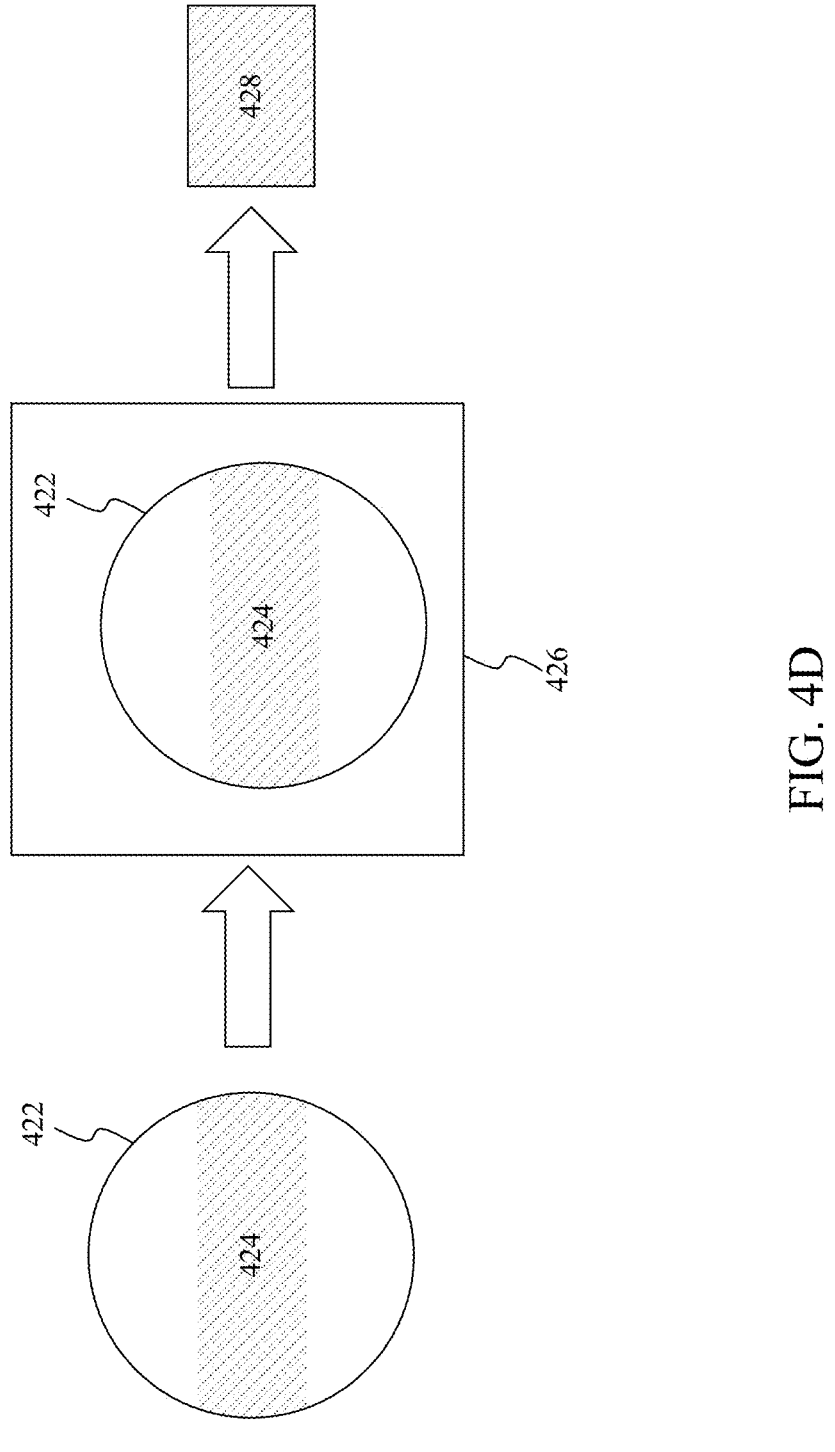

In the exemplary embodiment illustrated in FIG. 4D, a golf ball 422 can include graphical image 424 that can be included, for example, printed, painted, or stamped, on the golf ball 422 as described above. In some embodiments, the graphical image 424 can be used to differentiate the golf ball 422 from other golf balls within the exemplary golf entertainment venue. In some embodiments, the graphical image 424 can be characterized as being around a circumference of the golf ball 422. In these embodiments, the graphical image 424 can be characterized as being a repetitive, or nearly repetitive, pattern, design, decoration, shape, illustration, picture, diagram, and/or the like around the circumference of the golf ball 422. The golf ball 422 can represent an exemplary embodiment of one or more of the golf balls 110.1 through 110.n as described above in FIG. 1.

As described above, the golf entertainment venue can capture one or more digital images of the golf ball 422, for example, before, as, or after the golf ball 422 is hit from a teeing area. The golf entertainment venue can capture a digital image 426 of the golf ball 422 having the graphical image 424 within the digital image 426 in its entirety as illustrated in FIG. 4D. In the exemplary embodiment illustrated in FIG. 4D, the golf entertainment venue computing system can process the digital image 426 to identify a graphical image 428 representing the pattern, design, decoration, shape, illustration, picture, diagram, and/or the like around the circumference of the golf ball 422. In some embodiments, this processing can include edge detection that identifies points in the digital image 426 at which the brightness of the digital image 426 changes sharply, for example, includes discontinuities. An exemplary edge detection technique is to be described below in FIG. 24. Once the graphical image 428 has been identified within the digital image 426, the golf entertainment venue computing system can remove, for example, crop, a portion of the graphical image 428 from the digital image 426 to provide the digital image 426. In some embodiments, the golf entertainment venue computing system can provide the digital image 426 for further processing as to be described in further detail below. Exemplary embodiments for the graphical image 424 on the golf ball 422 are further described below in FIG. 20 through FIG. 22. However, those skilled in the relevant art(s) will recognize that the graphical image 424 on the golf ball 422 is not limited to these embodiments described below in FIG. 20 through FIG. 22.

Exemplary Golf Ball Registration Procedure: Registering Graphical Images to Players Once the one or more digital images included on the golf balls have been identified, the golf entertainment venue computing system can register these graphical images to the players as part of the golf ball registration procedure. As to be described in further detail below, the golf entertainment venue computing system can store a golf ball registration database that maps the graphical images included on the golf balls to their players.

Figure 5:
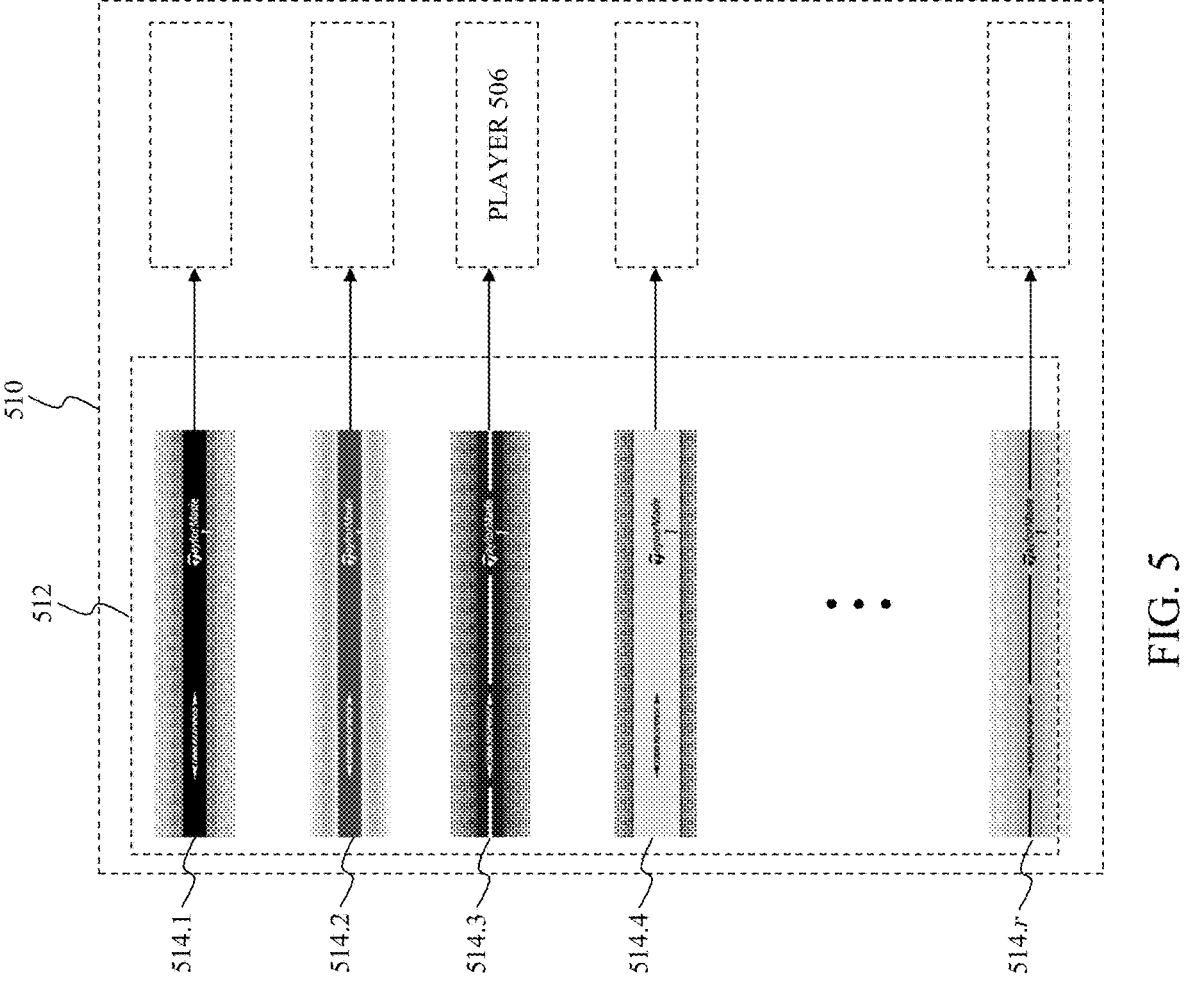
Figure 5:
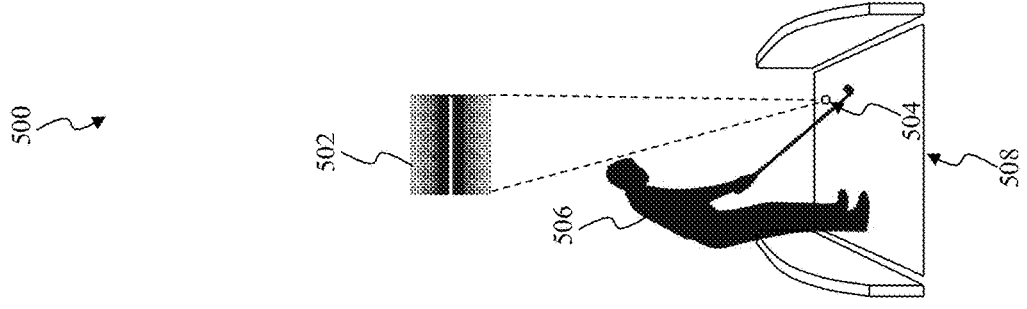

FIG. 5 graphically illustrates an exemplary golf ball registration procedure within the exemplary golf entertainment venue according to some embodiments of the present disclosure. As described above, a golf entertainment venue computing system, such as the golf entertainment venue computing system 106 as described above in FIG. 1, can identify one or more graphical images included, for example, printed, painted, or stamped, on golf balls within a golf entertainment venue, such as the golf entertainment venue 100 as described above in FIG. 1. In the exemplary embodiment illustrated in FIG. 5, the golf entertainment venue computing system can execute a golf ball registration procedure 500 to register these graphical images to players within the golf entertainment venue.

In the exemplary embodiment illustrated in FIG. 5, the golf ball registration procedure 500 can retrieve a graphical image 502 that is identified from a golf ball 504 about to be hit by player 506 from a teeing area 508. As illustrated in FIG. 5, the golf entertainment venue computing system registers the graphical image 502 included on the golf ball 504 with a player in a golf ball registration database 510. In the exemplary embodiment illustrated in FIG. 5, the golf ball registration database 510 includes a catalog of graphical images 512 that includes graphical images 514.1 and 514.r. In some embodiments, the graphical images 514.1 and 514.r represent all, or almost all, of the unique, or near-unique, graphical images that can be provided on the golf balls within the exemplary golf entertainment venue.

As illustrated in FIG. 5, the golf entertainment venue computing system compares the graphical image 502 and the graphical images 514.1 and 514.r to identify a graphical image from among the graphical images 514.1 and 514.r that matches, substantially matches, or most closely matches the graphical image 502. In some embodiments, the golf entertainment venue computing system can compare the graphical image 502 and the graphical images 514.1 and 514.r, using for example, image matching techniques. In these embodiments, the golf entertainment venue computing system can convert the graphical image 502 into one or more multi-dimensional feature vectors and thereafter compare these multi-dimensional feature vectors to multi-dimensional feature vectors of the graphical images 514.1 and 514.r to identify the graphical image from among the graphical images 514.1 and 514.r that matches, substantially matches, or most closely matches the graphical image 502. In some embodiments, these image matching techniques can include intensity-based image matching techniques, feature-based image matching techniques, and/or relational image matching techniques to provide some examples. In these embodiments, the intensity-based image matching techniques can convert the graphical image 502 into a matrix of grey values and compare this matrix of grey values to matrices of grey values for the graphical images 514.1 and 514.r. In these embodiments, the feature based matching techniques can extract features from the graphical image 502, such as, patches, corners, junctions, and/or edges to provide some examples, and thereafter compare these extracted features with similar extracted features of the graphical images 514.1 and 514.r. In these embodiments, the relational image matching techniques compares geometric or other relations between features and/or structures of the graphical image 502 and geometric or other relations between features and/or structures of the graphical images 514.1 and 514.r.

In the exemplary embodiment illustrated in FIG. 5, the golf entertainment venue computing system registers the graphical image from among the graphical images 514.1 and 514.r that matches, substantially matches, or most closely matches the graphical image 502 to the player 506. For example, as illustrated in FIG. 5, the graphical image 514.3 matches, substantially matches, or most closely matches the graphical image 502. In this example, the golf entertainment venue computing system registers the graphical image 514.3 to the player 506. The golf entertainment venue computing system associates the graphical image from among the graphical images 514.1 and 514.r that matches, substantially matches, or most closely matches the graphical image 502 to the player 506 to register the graphical image 502 to the player 506 in the golf ball registration database 510.

Exemplary Golf Ball Registration Procedure

Figure 6:
Figure 6:
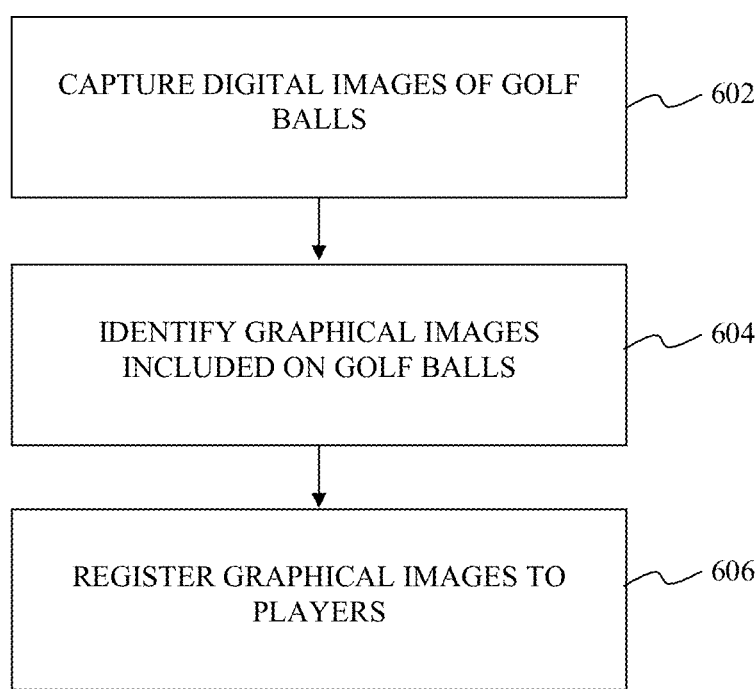

FIG. 6 illustrates a flowchart for an exemplary golf ball registration procedure in accordance with some exemplary embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 600 for registering golf balls that are hit by players within a golf entertainment venue, such as the golf entertainment venue 100 as described above in FIG. 1. The operational control flow 600 can be executed by one or more computing devices, processors, controllers, systems, or other electrical, mechanical, and/or electro-mechanical devices executing firmware, software applications, routines, instructions, and/or or the like within the golf entertainment venue, such as the golf entertainment venue computing system 106.

At operation 602, the operational control flow 600 captures one or more digital images included on the golf balls in a substantially similar manner as described above in FIG. 3A and FIG. 3B.

At operation 604, the operational control flow 600 identifies one or more graphical images from the one or more digital images from operation 602 in a substantially similar manner as described above in FIG. 4A through FIG. 4D.

At operation 606, the operational control flow 600 registers the one or more graphical images from operation 604 to the players in a substantially similar manner as described above in FIG. 5.

Exemplary Golf Ball Identification Procedure: Capturing Digital Images of Golf Balls As described above, a golf entertainment venue computing system, such as the golf entertainment venue computing system 106 as described above in FIG. 1, can perform a golf ball identification procedure to identify players that hit golf balls that arrive at target areas within a golf entertainment venue, such as the golf entertainment venue 100. As part of the golf ball identification procedure, the golf entertainment venue computing system can capture one or more digital images of the golf balls that arrive at the target areas as to be described in further detail below.

Figure 7B:
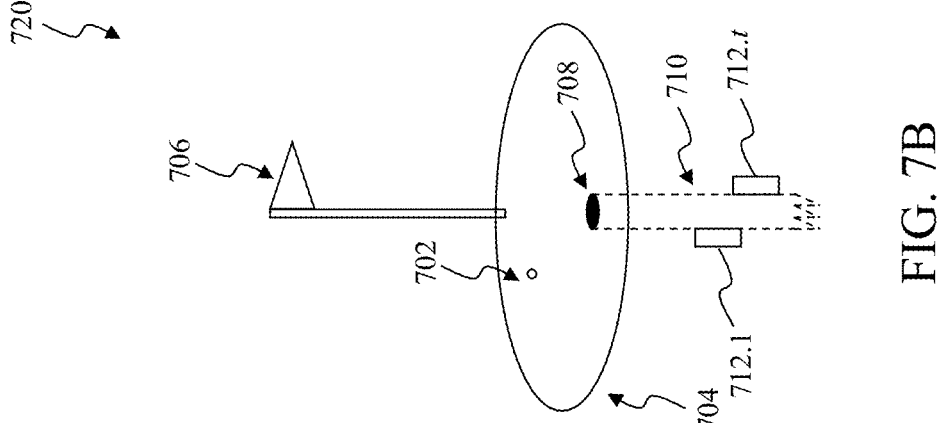
Figure 7A:
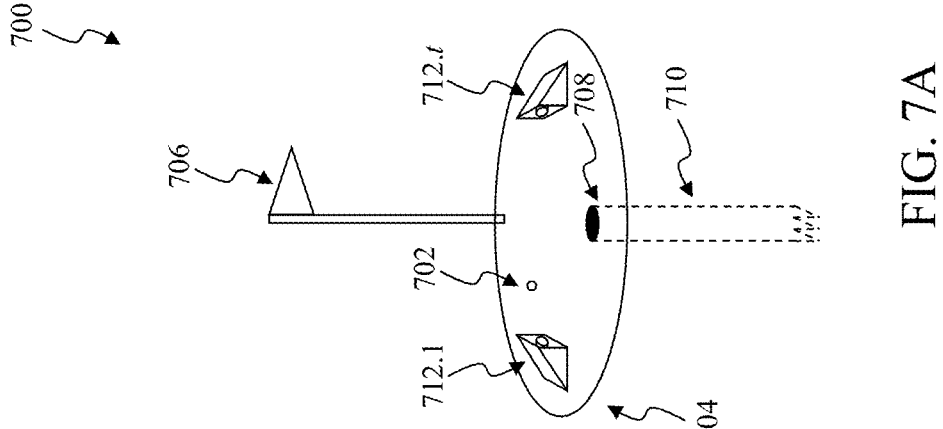

FIG. 7A and FIG. 7B graphically illustrate simplified exemplary target areas that can be implemented within the exemplary golf entertainment venue according to some embodiments of the present disclosure. As illustrated in FIG. 7A and FIG. 7B, a target area 700 and a target area 720 can capture one or more digital images of a golf ball 702. The golf ball 702 can represent an exemplary embodiment of one or more of the golf balls 110.1 through 110.n as described above in FIG. 1. As to be described in further detail below, a golf entertainment venue computing system within a golf entertainment venue, such as the golf entertainment venue computing system 106 as described above in FIG. 1, can utilize the one or more digital images of the golf ball 702 to identify one or more graphical images included, for example, printed, painted, or stamped, on the golf ball 702. In the exemplary embodiment illustrated in FIG. 7A and FIG. 7B, the one or more graphical images can be used to differentiate the golf ball 702 from other golf balls within the exemplary golf entertainment venue. The golf entertainment venue computing system can utilize the graphical images included on the golf ball 702 to identify a player, such as one of the players 108.1 through 108.n as described above in FIG. 1, which hit the golf ball 702 that arrives at the target area 700 and/or the target area 720. The target area 700 and/or the target area 720 can represent exemplary embodiments of one or more of the target areas 104.1 through 104.m as described above in FIG. 1.

In the exemplary embodiment illustrated in FIG. 7A and FIG. 7B, the target area 700 and the target area 720 can include a target mat 704, a target flag 706, and a target hole 708. As illustrated in FIG. 7A and FIG. 7B, the target mat 704 can represent an area within the target area 700 and/or the target area 720. In some embodiments, the target mat 704 can include a designated area of grass, a rubber mat, and/or plastic target mat to provide some examples. The target mat 704 can be specifically constructed to direct the golf ball 702 that arrives at the target area 700 and/or the target area 720 toward a target hole 708. For example, the target mat 704 can be sloped so that the golf ball 702 can roll into the target hole 708. After entering the target hole 708, the golf ball 702 can enter a golf ball collection mechanism 710. In some embodiments, the golf ball collection mechanism 710, a portion of which is illustrated in FIG. 7A and FIG. 7B, can direct the golf ball 702 toward a collection container that can be accessed to later retrieve the golf ball 702 for reuse. In some embodiments, the golf ball collection mechanism 710 can direct the golf ball 702 toward a sorting system as to be described in further detail below in FIG. 23. In some embodiments, the golf ball collection mechanism 710 can include, or be coupled to, for example, a channel, a tube, or a conveyor to direct the golf ball 702 toward a collection container or a sorting system.

As illustrated in FIG. 7A and FIG. 7B, the target area 700 and the target area 720 can include one or more target area image capture devices 712.1 through 712.n to capture the one or more digital images of the golf ball 702. The target area image capture devices 712.1 through 712.n illustrated in FIG. 7A and FIG. 7B are for exemplary purposes only and not limiting. Those skilled in the relevant art(s) will recognize that the target area 700 and the target area 720 can include a different number of target area image capture devices 712.1 through 712.n than as depicted in FIG. 7A and FIG. 7 without departing from the spirit and scope of the present disclosure. The one or more target area image capture devices 712.1 through 712.n can be situated within the target area 700, for example, integrated within the target mat 704 as illustrated in FIG. 7A, mechanically connected to the target mat 704, and/or implemented as standalone, or discrete, devices situated within the target area 700. Alternatively, or in addition to, the one or more target area image capture devices 712.1 through 712.n can be situated outside of the target area 720, for example, situated within the golf ball collection mechanism 710 as illustrated in FIG. 7B. For example, as illustrated in FIG. 7B, the one or more target area image capture devices 712.1 through 712.n can be integrated within the golf ball collection mechanism 710, mechanically connected to the golf ball collection mechanism 710, and/or implemented as standalone, or discrete, devices situated outside of the target area 720.

In the exemplary embodiment illustrated in FIG. 7A and FIG. 7B, the one or more target area image capture devices 712.1 through 712.n can capture the one or more digital images of the golf ball 702 before, as, or after the golf ball 702 arrives at the target area 700 and/or the target area 720.

In some embodiments, the one or more target area image capture devices 712.1 through 712.*n* can be implemented in a substantially similar manner as the image capture devices 310.1 through 310.*n* as described above in FIG. 3A and/or FIG. 3B.

Exemplary Golf Ball Identification Procedure: Identifying Graphical Images Included on Golf Balls Once the one or more digital images of the golf balls have been captured, the golf entertainment venue computing system can identify one or more graphical images included, for example, printed, painted, or stamped, on the golf balls as described above in FIG. 1 as part of the golf ball identification procedure. The one or more graphical images can be used to differentiate the golf balls from one another. The golf entertainment venue computing system can identify one or more graphical images on the golf balls that arrive at target areas, such as the target areas 104.1 through 104.*m* as described above in FIG. 1, in a substantially similar manner as described in FIG. 4A through FIG. 4D above.

Exemplary Golf Ball Identification Procedure: Identifying Players That Hit the Golf Balls Once the one or more graphical images included on the golf balls have been identified, the golf entertainment venue computing system can identify the players that hit the golf balls that arrive at target areas. As to be described in further detail below, the golf entertainment venue computing system can identify the players that are registered to these graphical images from the golf ball registration database.

Figure 8:
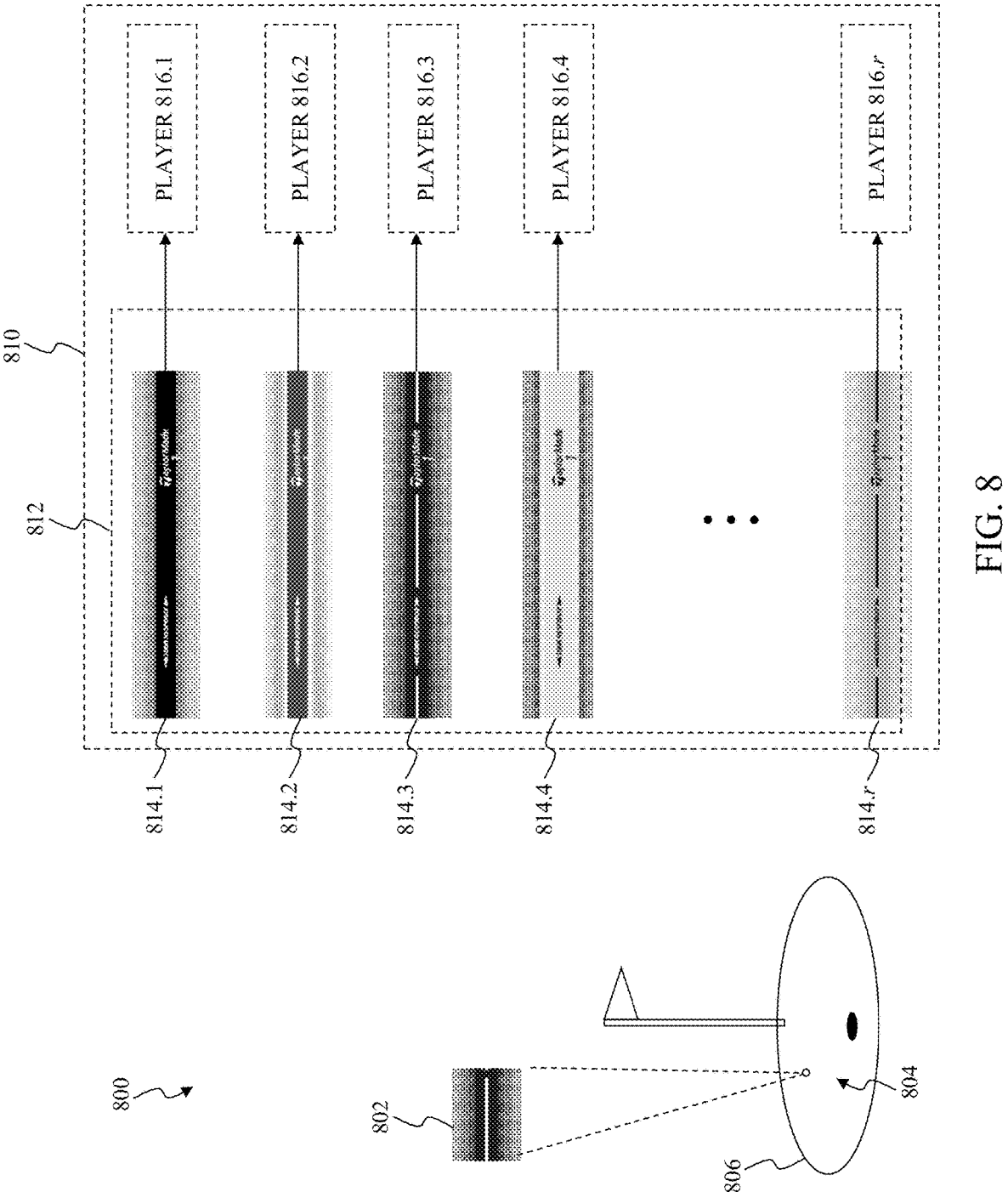

FIG. 8 graphically illustrates an exemplary golf ball identification procedure within the exemplary golf entertainment venue according to some embodiments of the present disclosure. As described above, a golf entertainment venue computing system, such as the golf entertainment venue computing system 106 as described above in FIG. 1, can identify one or more graphical images included, for example, printed, painted, or stamped, on golf balls within a golf entertainment venue, such as the golf entertainment venue 100 as described above in FIG. 1. In the exemplary embodiment illustrated in FIG. 8, the golf entertainment venue computing system can execute a golf ball registration procedure 800 identify the players that hit the golf balls that arrive at target areas within the golf entertainment venue.

In the exemplary embodiment illustrated in FIG. 8, the golf ball registration procedure 800 can retrieve a graphical image 802 that is identified from a golf ball 804 that arrives at a target area 806. As illustrated in FIG. 8, the golf entertainment venue computing system identifies the player that hit the golf ball 804 from the graphical image 802 using a golf ball registration database 810. In the exemplary embodiment illustrated in FIG. 8, the golf ball registration database 810 includes a catalog of graphical images 812 that includes graphical images 814.1 and 814.*r*. In some embodiments, the graphical images 814.1 and 814.*r* represent all, or almost all, of the unique, or near-unique, graphical images that can be provided on the golf balls within the exemplary golf entertainment venue. And as illustrated in FIG. 8, the graphical images 814.1 and 814.*r* are registered to corresponding players from among players 816.1 and 816.*r* in the golf ball registration database 810.

As illustrated in FIG. 8, the golf entertainment venue computing system can compare the graphical image 802 and with graphical images 814.1 and 814.*r* to identify a graphical image from among the graphical images 814.1 and 814.*r* that matches, substantially matches, or most closely matches the graphical image 802. In some embodiments, the golf entertainment venue computing system can compare the graphical image 802 and the graphical images 814.1 and

814.*r*, using for example, the image matching techniques as described above in FIG. 5. Thereafter, the golf entertainment venue computing system identifies the player hit the golf ball that arrived at the target area 806 that is registered to the graphical image from among the graphical images 814.1 and 814.*r* that matches, substantially matches, or most closely matches the graphical image 802. For example, as illustrated in FIG. 8, the graphical image 814.1 matches, substantially matches, or most closely matches the graphical image 802. In this example, the golf entertainment venue computing system identifies player 816.3 hit the golf ball that arrived at the target area 806.

Exemplary Golf Ball Identification Procedure

Figure 9:
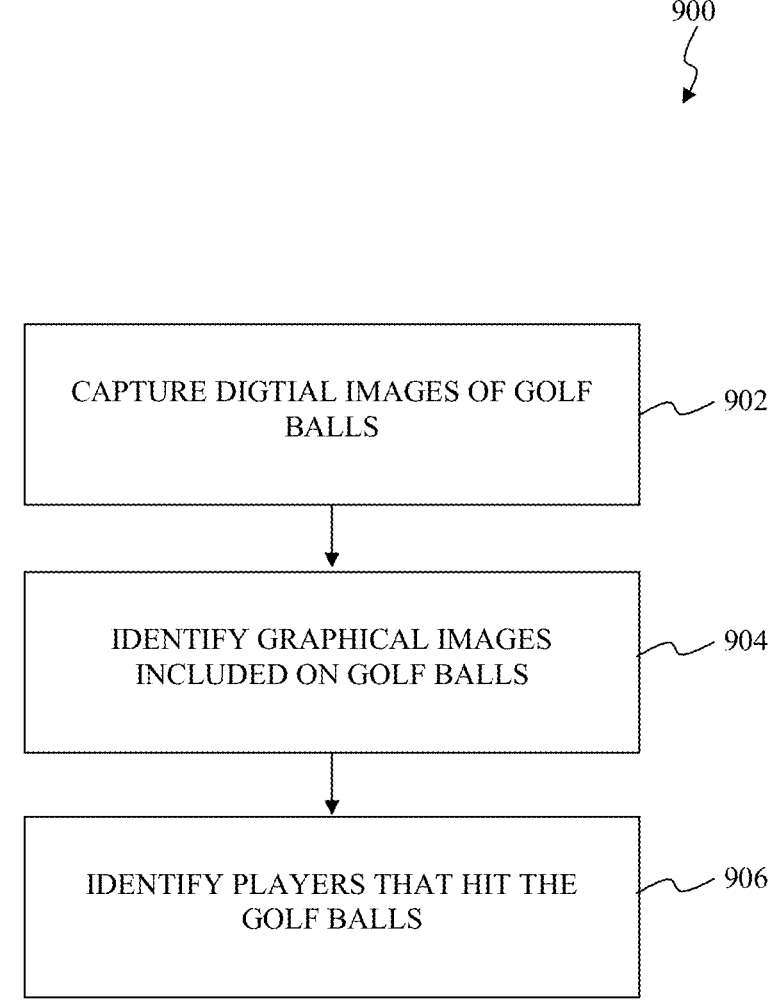

FIG. 9 illustrates a flowchart for an exemplary golf ball identification procedure in accordance with some exemplary embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 900 identifying players, such as the players 108.1 through 108.*n*, that hit golf balls, that arrive at target areas within a golf entertainment venue, such as the golf entertainment venue 100 as described above in FIG. 1. The operational control flow 900 can be executed by one or more computing devices, processors, controllers, systems, or other electrical, mechanical, and/or electro-mechanical devices executing firmware, software applications, routines, instructions, and/or or the like within the golf entertainment venue, such as the golf entertainment venue computing system 106.

At operation 902, the operational control flow 900 captures one or more digital images included on the golf balls in a substantially similar manner as described above in FIGS. 7A and 7B.

At operation 904, the operational control flow 900 identifies one or more graphical images from the one or more digital images from operation 902 in a substantially similar manner as described above in FIG. 4A through FIG. 4D.

At operation 906, the operational control flow 900 identifies the players that hit the golf balls that arrive at the target areas from the one or more graphical images from operation 904 in a substantially similar manner as described above in FIG. 8.

Figure 10:
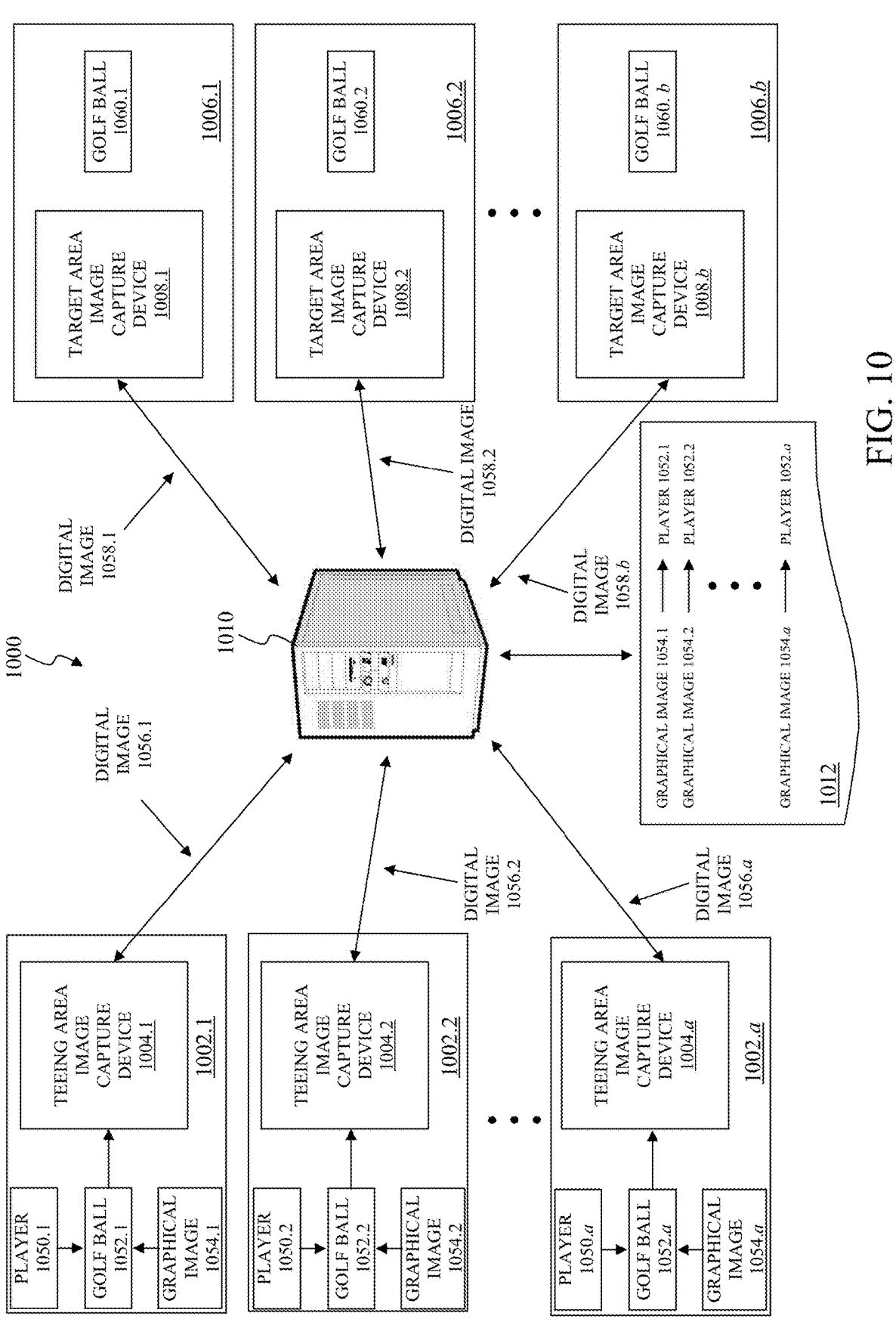

Exemplary Golf Entertainment Venue Computing System that can be Implemented within the Exemplary Golf Entertainment Venue FIG. 10 graphically illustrates another simplified exemplary golf entertainment venue according to some embodiments of the present disclosure. As to be described in further detail below, a golf entertainment venue 1000 can perform a golf ball registration procedure to register golf balls to the players that hit the golf balls from teeing areas. And the golf entertainment venue 1000 can perform a golf ball identification procedure to identify the players that hit the golf balls that arrive at target areas. In the exemplary embodiment illustrated in FIG. 10, the golf entertainment venue 1000 can include teeing areas 1002.1 through 1002.*a*, target areas 1006.1 through 1006.*b*, and a golf entertainment venue computing system 1010. The golf entertainment venue 1000 can represent an exemplary embodiment of the golf entertainment venue 100 as described above in FIGS. 1.

In the exemplary embodiment illustrated in FIG. 10, the teeing areas 1002.1 through 1002.*a* can include teeing area image capture devices 1004.1 through 1004.*a*. In some embodiments, each of the teeing area image capture devices 1004.1 through 1004.*a* can include one or more of the teeing area image capture devices 310.1 through 310.*n* as described above in FIG. 3A and FIG. 3B. As illustrated in FIG. 10, players 1050.1 through 1050.*a* can hit golf balls 1052.1 through 1052.*a* from the teeing areas 1002.1 through 1002.*a* toward target areas 1006.1 through 1006.*b*. And as illustrated in FIG. 10, the golf balls 1052.1 through 1052.*a* can include graphical images 1054.1 through 1054.*a* as described above. In some embodiments, the graphical images 1054.1 through 1054.*a* can be used to differentiate the golf balls 1052.1 through 1052.*a* from one another.

As illustrated in FIG. 10, the teeing area image capture devices 1004.1 through 1004.*a* can capture digital images of the golf balls 1052.1 through 1052.*a* to provide digital images 1056.1 through 1056.*a* of the golf balls 1052.1 through 1052.*a*. In some embodiments, the teeing area image capture devices 1004.1 through 1004.*a* can capture the one or more digital images of the golf balls 1052.1 through 1052.*a* in a substantially similar manner as described above in FIG. 3A and FIG. 3B. Thereafter, the teeing area image capture devices 1004.1 through 1004.*a* can communicate the digital images 1056.1 through 1056.*a* to the golf entertainment venue computing system 1010. In some embodiments, the teeing area image capture devices 1004.1 through 1004.*a* can communicate the digital images 1056.1 through 1056.*a* to the golf entertainment venue computing system 1010 over a wireless communication network, a wireline communication network, and/or any combination thereof that will be apparent to those skilled in the relevant art(s) without departing from the spirit and scope of the present disclosure. In these embodiments, the wireless communication network can be compliant with, for example, a version of an Institute of Electrical and Electronics Engineers (I.E.E.E.) 802.11 communication standard, for example, 802.11a, 802.11b/g/n, 802.11h, and/or 802.11ac, which are collectively referred to as Wi-Fi, a version of a Bluetooth communication standard, and/or or any other wireless communication standard or protocol that will be apparent to those skilled in the relevant art(s) without departing from the spirit and scope of the present disclosure. In these embodiments, the wireline communication network can be compliant with, for example, a version of an Institute of Electrical and Electronics Engineers (IEEE) 802.10 communication standard or protocol, also referred as Ethernet, such as 50G Ethernet, 100G Ethernet, 200G Ethernet, and/or 400G Ethernet to provide some examples, and/or or any other wireline communication standard or protocol that will be apparent to those skilled in the relevant art(s) without departing from the spirit and scope of the present disclosure.

In the exemplary embodiment illustrated in FIG. 10, the golf entertainment venue computing system 1010 can perform the golf ball registration procedure to register the golf balls 1052.1 through 1052.*a* to the players 1050.1 through 1050.*a*. In some embodiments, the golf entertainment venue computing system 1010 can identify the graphical images 1054.1 through 1054.*a* included, for example, printed, painted, or stamped, on the golf balls 1052.1 through 1052.*a*. In these embodiments, the golf entertainment venue computing system 1010 can identify the graphical images 1054.1 through 1054.*a* in a substantially similar manner as described above in FIG. 4A through FIG. 4D. In some embodiments, the golf entertainment venue computing system 1010 can register the graphical images 1054.1 through 1054.*a* included, for example, printed, painted, or stamped, on the golf balls 1052.1 through 1052.*a* to the players 1050.1 through 1050.*a*. In these embodiments, the golf entertainment venue computing system 1010 can register the graphical images 1054.1 through 1054.*a* to the players 1050.1 through 1050.*a* in a substantially similar manner as described above in FIG. 5. Moreover, the golf entertainment venue computing system 1010 can store a golf ball registration database 1012 that maps the graphical images 1054.1 through 1054.*a* to the players 1050.1 through 1050.*a* as illustrated in FIG. 10.

As illustrated in FIG. 10, the target areas 1006.1 through 1006.*b* can include target area image capture devices 1008.1 through 1008.*b*. In some embodiments, each of the target area image capture devices 1008.1 through 1008.*b* can include one or more of the target area image capture devices 712.1 through 712.*n* as described above in FIG. 7A and FIG. 7B. As illustrated in FIG. 10, the golf balls 1052.1 through 1052.*a* that are hit by the players 1050.1 through 1050.*a* from the teeing areas 1002.1 through 1002.*a* arrive at the target areas 1006.1 through 1006.*b* as golf balls 1060.1 through 1060.*b*. For example, the player 1050.1 can hit the golf ball 1052.1 from the teeing area 1002.1 that arrives at the target area 1006.1 as the golf ball 1060.1. In this example, the player 1050.2 can hit the golf ball 1052.2 from the teeing area 1002.2 that similarly arrives at the target area 1006.1 as the golf ball 1060.1 and the player 1050.*a* can hit the golf ball 1052.*a* from the teeing area 1002.*a* that arrives at the target area 1006.2 as the golf ball 1060.2.

In the exemplary embodiment illustrated in FIG. 10, the target area image capture devices 1008.1 through 1008.*b* can capture one or more digital images of the golf balls 1060.1 through 1060.*b* that arrive at the target areas 1006.1 through 1006.*b* to provide digital images 1058.1 through 1058.*b* of the golf balls 1060.1 through 1060.*b*. In some embodiments, the target area image capture devices 1008.1 through 1008.*b* can capture one or more digital images of the golf balls 1060.1 through 1060.*b* in a substantially similar manner as described above in FIG. 7A and FIG. 7B. In some embodiments, the target area image capture devices 1008.1 through 1008.*b* can communicate the digital images 1058.1 through 1058.*b* to the golf entertainment venue computing system 1010. In these embodiments, the target area image capture devices 1008.1 through 1008.*b* can communicate digital images 1058.1 through 1058.*b* to the golf entertainment venue computing system 1010 over the wireless communication network, the wireline communication network, and/or any combination thereof that will be apparent to those skilled in the relevant art(s) without departing from the spirit and scope of the present disclosure.

In the exemplary embodiment illustrated in FIG. 10, the golf entertainment venue computing system 1010 can perform a golf ball identification procedure to identify the players 1050.1 through 1050.*a* that hit the golf balls 1060.1 through 1060.*b* that arrive at the target areas 1006.1 through 1006.*b*. In some embodiments, the golf entertainment venue computing system 1010 identifies the graphical images 1054.1 through 1054.*a* included, for example, printed, painted, or stamped, on the golf balls 1052.1 through 1052.*a* that arrive at the target areas 1006.1 through 1006.*b* as the golf balls 1060.1 through 1060.*b* from the digital images 1058.1 through 1058.*b*. In these embodiments, the golf entertainment venue computing system 1010 can identify the graphical images 1054.1 through 1054.*a* included, for example, printed, painted, or stamped, on the golf balls 1060.1 through 1060.*b* in a substantially similar manner as described above in FIG. 4A through FIG. 4D.

In some embodiments, the golf entertainment venue computing system 1010 can identify the players 1050.1 through 1050.*a* that hit the golf balls 1060.1 through 1060.*b* that arrive at the target areas 1006.1 through 1006.*b*. In these embodiments, the golf entertainment venue computing system 1010 can identify the players 1050.1 through 1050.*a* that hit the golf balls 1052.1 through 1052.*a* that arrive at the target areas 1006.1 through 1006.*b* in a substantially similar manner as described above in FIG. 8. In some embodiments, the golf entertainment venue computing system 1010 can identify the players 1050.1 through 1050.*a* that hit the golf balls 1052.1 through 1052.*a* that arrive at the target areas 1006.1 through 1006.*b* from the golf ball registration database 1012. In these embodiments, the golf entertainment venue computing system 1010 can identity the players 1050.1 through 1050.*a* that are registered to the graphical images 1054.1 through 1054.*a* included, for example, printed, painted, or stamped, on the golf balls 1060.1 through 1060.*b* that arrive at the target areas 1006.1 through 1006.*b* from the golf ball registration database 1012.

In some embodiments, the golf entertainment venue computing system 1010 can update scores of the players 1050.1 through 1050.*a* that hit the golf balls 1060.1 through 1060.*b* that arrived at the target areas 1006.1 through 1006.*b* with scores that are associated with the target areas 1006.1 through 1006.*b*. In some embodiments, the target areas 1006.1 through 1006.*b* can have different point values that can be related to the difficulty of the golf shots required to hit the golf balls 1052.1 through 1052.*a* to the target areas 1006.1 through 1006.*b*. In these embodiments, the scores of the players 1050.1 through 1050.*a* can be updated with scores that are associated with the target areas 1006.1 through 1006.*b* when their golf balls arrive at the target areas 1006.1 through 1006.*b*.

Figure 11:
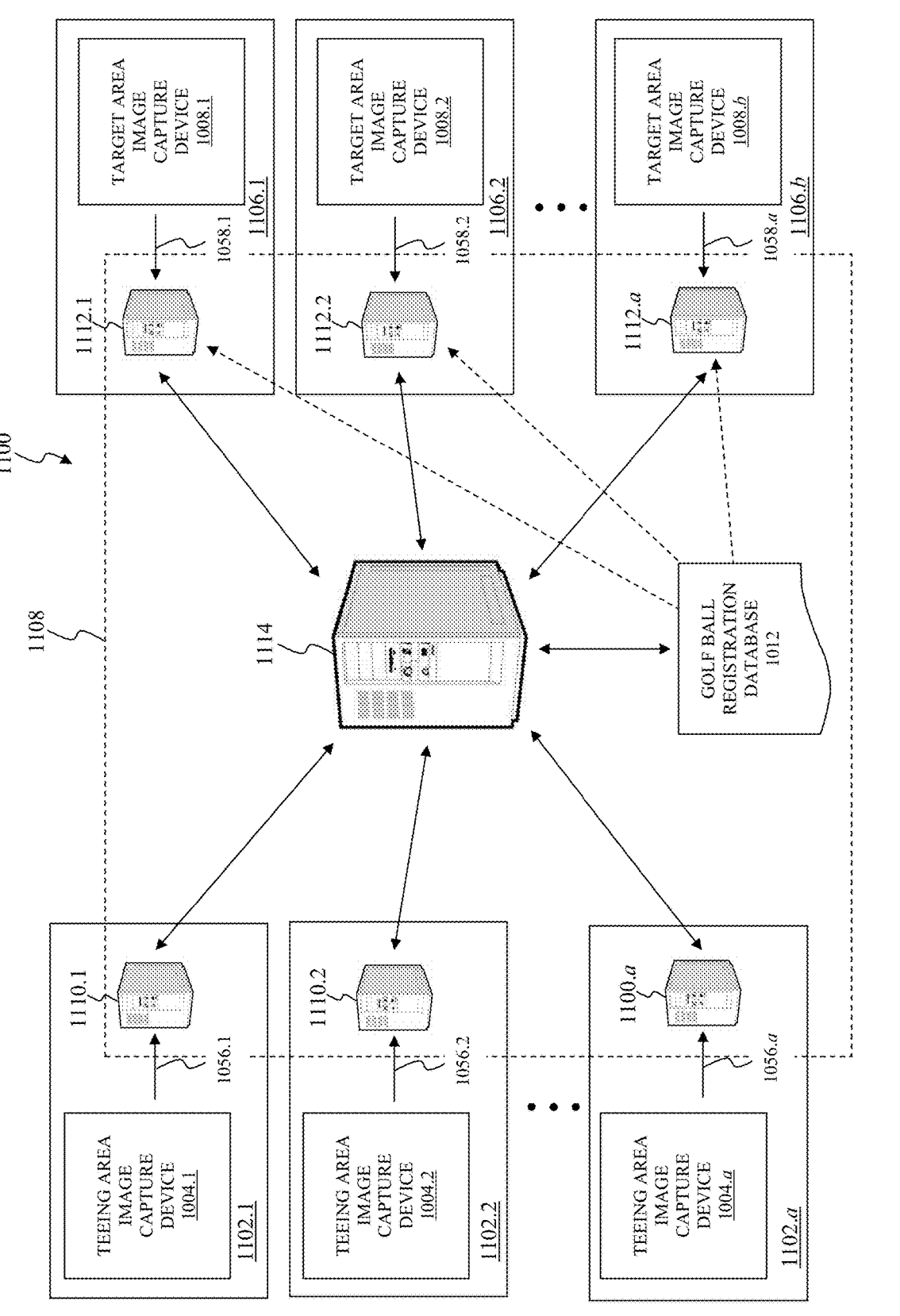

FIG. 11 graphically illustrates a further simplified exemplary golf entertainment venue according to some embodiments of the present disclosure. As to be described in further detail below, a golf entertainment venue 1100 can perform a golf ball registration procedure to register golf balls to the players that hit the golf balls from teeing areas. And the golf entertainment venue 1100 can perform a golf ball identification procedure to identify the players that hit the golf balls that arrive at target areas. In the exemplary embodiment illustrated in FIG. 11, the golf entertainment venue 1100 can include teeing areas 1102.1 through 1102.*a*, target areas 1106.1 through 1106.*b*, and a golf entertainment venue computing system 1108. The golf entertainment venue 1100 can represent an exemplary embodiment of the golf entertainment venue 100 as described above in FIG. 1.

In the exemplary embodiment illustrated in FIG. 11, the teeing areas 1102.1 through 1102.*a* can include the teeing area image capture devices 1004.1 through 1004.*a* as described above in FIG. 10. In some embodiments, players 1050.1 through 1050.*a* can hit golf balls 1052.1 through 1052.*a* from the teeing areas 1102.1 through 1102.*a* toward target areas 1106.1 through 1106.*b* in a substantially similar manner as described above in FIG. 10. In these embodiments, the golf balls 1052.1 through 1052.*a* can include the graphical images 1054.1 through 1054.*a* as described above in FIG. 10.

As illustrated in FIG. 11, the teeing area image capture devices 1004.1 through 1004.*a* can capture the digital images of the golf balls 1052.1 through 1052.*a* to provide the digital images 1056.1 through 1056.*a* of the golf balls 1052.1 through 1052.*a* in a substantially similar manner as described above in FIG. 10. Thereafter, the teeing area image capture devices 1004.1 through 1004.*a* can communicate the digital images 1056.1 through 1056.*a* to the golf entertainment venue computing system 1010. In some embodiments, the teeing area image capture devices 1004.1 through 1004.*a* can communicate the digital images 1056.1 through 1056.*a* to the golf entertainment venue computing system 1108 over the wireless communication network, the wireline communication network, and/or any combination thereof that will be apparent to those skilled in the relevant art(s) without departing from the spirit and scope of the present disclosure.

As illustrated in FIG. 11, the golf entertainment venue computing system 1108 can be implemented as a distributed computing system having one or more computing devices, processors, controllers, systems, or other electrical, mechanical, and/or electro-mechanical devices executing firmware, software applications, routines, instructions, and/or the like throughout the golf entertainment venue 1100. In the exemplary embodiment illustrated in FIG. 11, the golf entertainment venue computing system 1108 can include teeing area computing devices 1110.1 through 1110.*a*, target area computing devices 1112.1 through 1112.*b*, and a golf entertainment venue computing device 1114.

In the exemplary embodiment illustrated in FIG. 11, the teeing area computing devices 1110.1 through 1110.*a* are communicatively coupled to the teeing area image capture devices 1004.1 through 1004.*a*. In some embodiments, the teeing area computing devices 1110.1 through 1110.*a* can be situated within the teeing areas 1102.1 through 1102.*a*, for example, integrated within tee dividers of the teeing areas 1102.1 through 1102.*a* and/or mechanically connected to the tee dividers to provide some examples. In some embodiments, the teeing area computing devices 1110.1 through 1110.*a* can be situated outside of the teeing areas 1102.1 through 1102.*a*, for example, situated above the teeing areas 1102.1 through 1102.*a*. For example, the teeing area computing devices 1110.1 through 1110.*a* can be integrated within image capture device support structures of the teeing areas 1102.1 through 1102.*a*, mechanically connected to the image capture device support structure, and/or implemented as standalone, or discrete, devices situated outside of the teeing areas 1102.1 through 1102.*a*.

As illustrated in FIG. 11, the golf entertainment venue computing device 1114 is communicatively coupled to the teeing area computing devices 1110.1 through 1110.*a* and the target area computing devices 1112.1 through 1112.*b*. In some embodiments, the golf entertainment venue computing device 1114 represents a centralized computing device for overseeing the operation of the golf entertainment venue 1100. In some embodiments, the golf entertainment venue computing device 1114 can be situated within a professional shop within the golf entertainment venue 1100 where the players 1050.1 through 1050.*a* can purchase the golf balls 1052.1 through 1052.*a* or elsewhere within the golf entertainment venue 1100.

In the exemplary embodiment illustrated in FIG. 11, the teeing area computing devices 1110.1 through 1110.*a* and the golf entertainment venue computing device 1114 can functionally cooperate to perform the golf ball registration procedure to register the golf balls 1052.1 through 1052.*a* to the players 1050.1 through 1050.*a*. In some embodiments, the teeing area computing devices 1110.1 through 1110.*a* receive the digital images 1056.1 through 1056.*a* from the teeing area image capture devices 1004.1 through 1004.*a*. In some embodiments, the teeing area computing devices 1110.1 through 1110.*a* can identify the graphical images 1054.1 through 1054.*a* included, for example, printed, painted, or stamped, on the golf balls 1052.1 through 1052.*a* in a substantially similar manner as described above in FIG. 10. In some embodiments, the teeing area computing devices 1110.1 through 1110.*a* can provide the golf entertainment venue computing device 1114 with the graphical images 1054.1 through 1054.*a* included, for example, printed, painted, or stamped, on the golf balls 1052.1 through 1052._a_ and the players 1050.1 through 1050._a_ that are situated within the teeing areas 1102.1 through 1102._a_. In these embodiments, the teeing area computing devices 1110.1 through 1110._a_ can store a graphical image database having reference indictors, such as alphanumeric codes, corresponding to the graphical images included on all, most, or a substantial number of the golf balls utilized by the golf entertainment venue. In these embodiments, the teeing area computing devices 1110.1 through 1110._a_ can communicate the reference indictors corresponding to the graphical images 1054.1 through 1054._a_ identified by the teeing area computing devices 1110.1 through 1110._a_ to the golf entertainment venue computing device 1114. In some embodiments, the golf entertainment venue computing device 1114 can store the graphical images 1054.1 through 1054._a_ included, for example, printed, painted, or stamped, on the golf balls 1052.1 through 1052._a_ and the players 1050.1 through 1050._a_ received from the teeing area computing devices 1110.1 through 1110._a_ in the golf ball registration database 1012 in a substantially similar manner as described above in FIG. 10.

In the exemplary embodiment illustrated in FIG. 11, the target area computing devices 1112.1 through 1112._b_ are communicatively coupled to the target area image capture devices 1008.1 through 1008._b_. In some embodiments, the target area computing devices 1112.1 through 1112._b_ can be situated within the target areas 1106.1 through 1106._b_, for example, integrated within target mats of the target areas 1106.1 through 1106._b_, mechanically connected to the target mats, and/or implemented as standalone, or discrete, devices situated within the target areas 1106.1 through 1106._b_. In some embodiments, the target area computing devices 1112.1 through 1112._b_ can be situated outside of the target areas 1106.1 through 1106._b_, for example, situated within golf ball collection mechanisms of the target areas 1106.1 through 1106._b_, mechanically connected to the golf ball collection mechanisms, and/or implemented as standalone, or discrete, devices situated outside of the target areas 1106.1 through 1106._b_.

In the exemplary embodiment illustrated in FIG. 11, the target area computing devices 1112.1 through 1112._b_ and the golf entertainment venue computing device 1114 can functionally cooperate to perform a golf ball identification procedure to identify the players 1050.1 through 1050._a_ that hit the golf balls 1060.1 through 1060._b_ that arrive at the target areas 1106.1 through 1106._b_. In some embodiments, the target area computing devices 1112.1 through 1112._b_ receive the digital images 1058.1 through 1058._b_ from the target areas 1106.1 through 1106._b_. In some embodiments, the target areas 1106.1 through 1106._b_ can identify the graphical images 1054.1 through 1054._a_ included, for example, printed, painted, or stamped, on the golf balls 1060.1 through 1060._b_ in a substantially similar manner as described above in FIG. 10. In some embodiments, the target area computing devices 1112.1 through 1112._b_ can identify the players 1050.1 through 1050._a_ that hit the golf balls 1060.1 through 1060._b_ that arrive at the target areas 1106.1 through 1106._b_ in a substantially similar manner as described above in FIG. 10. In some embodiments, the target area computing devices 1112.1 through 1112._b_ can identify the players 1050.1 through 1050._a_ that hit the golf balls 1052.1 through 1052._a_ that arrive at the target areas 1106.1 through 1106._b_ from the golf ball registration database 1012 in a substantially similar manner as described above in FIG. 10. In these embodiments, the target area computing devices 1112.1 through 1112._b_ can received the golf ball registration database 1012 from the golf entertainment venue computing device 1114. Thereafter, the target area computing devices 1112.1 through 1112._b_ can communicate the players 1050.1 through 1050._a_ that hit the golf balls 1060.1 through 1060._b_ that arrive at the target areas 1106.1 through 1106._b_ to the golf entertainment venue computing device 1114.

In some embodiments, the golf entertainment venue computing device 1114 can update scores of the players 1050.1 through 1050._a_ that hit the golf balls 1060.1 through 1060._b_ that arrived at the target areas 1106.1 through 1106._b_ with scores that are associated with the target areas 1106.1 through 1106._b_. In some embodiments, the target areas 1106.1 through 1106._b_ can have different point values that can be related to the difficulty of the golf shots required to hit the golf balls 1052.1 through 1052._a_ to the target areas 1106.1 through 1106._b_. In these embodiments, the scores of the players 1050.1 through 1050._a_ can be updated with scores that are associated with the target areas 1106.1 through 1106._b_ when their golf balls arrive at the target areas 1106.1 through 1106._b_.

Figure 12:
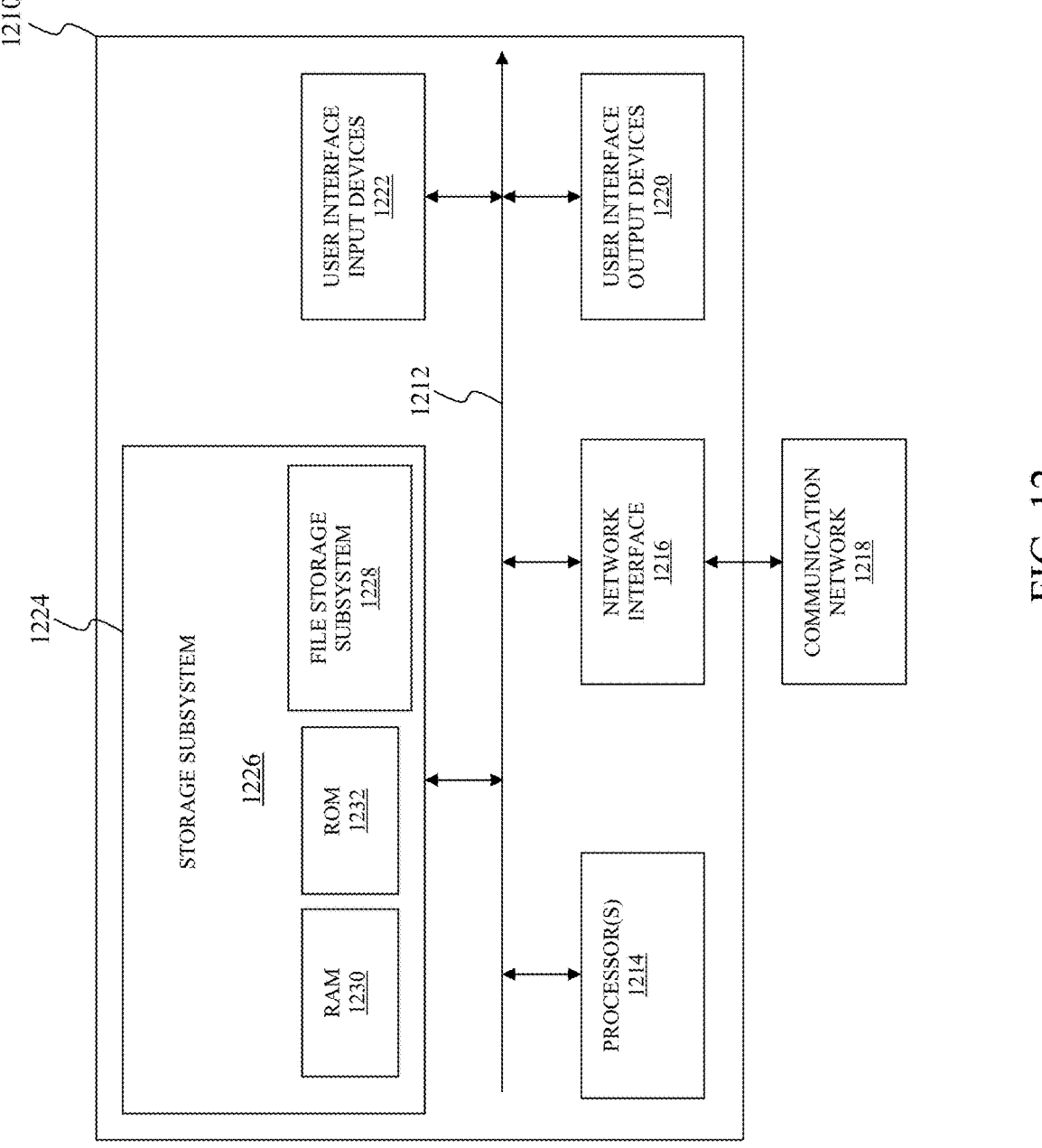
FIG. 12 illustrates a simplified block diagram of a computer system suitable for use with embodiments described herein according to some embodiments of the present disclosure.

Exemplary Computer System that can be Implemented within the Exemplary Golf Entertainment Venue FIG. 12 illustrates a simplified block diagram of a computer system suitable for use with embodiments described herein according to some embodiments of the present disclosure. The various electronic devices, for example, the golf entertainment venue computing system 106 as described above in FIG. 1, the teeing area image capture devices 310.1 through 310._n_ as described above in FIG. 3A and FIG. 3B, target area image capture devices 712.1 through 712._n_ as described above in FIG. 7A and FIG. 7B, the golf entertainment venue computing system 1010 as described above in FIG. 10, and/or one or more of the teeing area computing devices 1110.1 through 1110._a_, the target area computing devices 1112.1 through 1112._b_, the golf entertainment venue computing device 1114 as described above in FIG. 11, and the controller 2302 as to be described below in FIG. 23 can be implemented in hardware, firmware, software, or any combination thereof. The discussion of FIG. 12 to follow describes an exemplary computer system 1210 that can be used for these electronic devices.

In the exemplary embodiment illustrated in FIG. 12, the computer system 1210 typically includes at least one processor 1214 that communicates with a number of peripheral devices via bus subsystem 1212. Typically, the at least processor 1214 can include, or can be, any of a microprocessor, graphics processing unit, or digital signal processor, and their electronic processing equivalents, such as an Application Specific Integrated Circuit ("ASIC") or Field Programmable Gate Array ("FPGA"). As used herein, the term "processor" signifies a tangible data and information processing device that physically transforms data and information, typically using a sequence transformation (also referred to as "operations"). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements. The processor can be electronic, for example, comprising digital logic circuitry (for example, binary logic), or analog (for example, an operational amplifier). The processor may also operate to support performance of the relevant operations in a "cloud computing" environment or as a "software as a service" (SaaS). For example, at least some of the operations may be performed by a group of processors available at a distributed or remote system, these processors accessible via a communications network (e.g., the Internet) and via one or more software interfaces (e.g., an application program interface (API).)

The computer system typically includes an operating system, such as Microsoft's Windows, Sun Microsystems's Solaris, Apple Computer's MacOs, Linux or UNIX. The computer system also typically can include a Basic Input/Output System (BIOS) and processor firmware. The operating system, BIOS and firmware are used by the processor to control subsystems and interfaces coupled to the processor. Typical processors compatible with these operating systems include the Pentium and Itanium from Intel, the Opteron and Athlon from Advanced Micro Devices, and the ARM processor from ARM Holdings.

As illustrated in FIG. 12, peripheral devices may include a storage subsystem 1224, comprising a memory subsystem 1226 and a file storage subsystem 1228, user interface input devices 1222, user interface output devices 1220, and a network interface subsystem 1216. The input and output devices allow user interaction with computer system 1210. In the exemplary embodiment illustrated in FIG. 12, the network interface subsystem 1216 provides an interface to outside networks, including an interface to a communication network 1218, and is coupled via a communication network 1218 to corresponding interface devices in other computer systems or machines. The communication network 1218 may include many interconnected computer systems, machines and communication links. These communication links may be wired links, optical links, wireless links, or any other devices for communication of information. The communication network 1218 can be any suitable computer network, for example a wide area network such as the Internet, and/or a local area network such as Ethernet. The communication network 1218 can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

The user interface input devices 1222 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, image capture devices, and other types of input devices. Such devices can be connected by wire or wirelessly to a computer system. In general, use of the term "input device" is intended to include all possible types of devices and ways to input information into the computer system 1210 or onto the communication network 1218. The user interface input devices 1222 typically allow a user to select objects, icons, text and the like that appear on some types of user interface output devices, for example, a display subsystem.

The user interface output devices 1220 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from the computer system 1210 to the user or to another machine or computer system.

The memory subsystem 1226 typically includes a number of memories including a main random-access memory ("RAM") 1230 (or other volatile storage device) for storage of instructions and data during program execution and a read only memory ("ROM") 1232 in which fixed instructions are stored. The file storage subsystem 1228 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 1228.

The bus subsystem 1212 provides a device for letting the various components and subsystems of the computer system 1210 communicate with each other as intended. Although the bus subsystem 1212 is shown schematically as a single bus, alternative embodiments of the bus subsystem may use multiple busses. For example, RAM-based main memory can communicate directly with file storage systems using Direct Memory Access ("DMA") systems.

Exemplary Golf Balls that can be Used within the Exemplary Entertainment Venue

As described above, golf balls that are used within a golf entertainment venue, such as the golf balls 110.1 through 110.n as described above in FIG. 1, can include, for example, be printed, painted, or stamped on, various graphical images to differentiate the golf balls, or specific groups of the golf balls, from one another. The discussion of FIG. 15A through FIG. 22 to follow is to describe exemplary embodiments for these golf balls. However, those skilled in the relevant art(s) will recognize that the golf balls that are used within the golf entertainment venue are not limited to these embodiments described below in FIG. 15A through FIG. 22.

Figure 13:
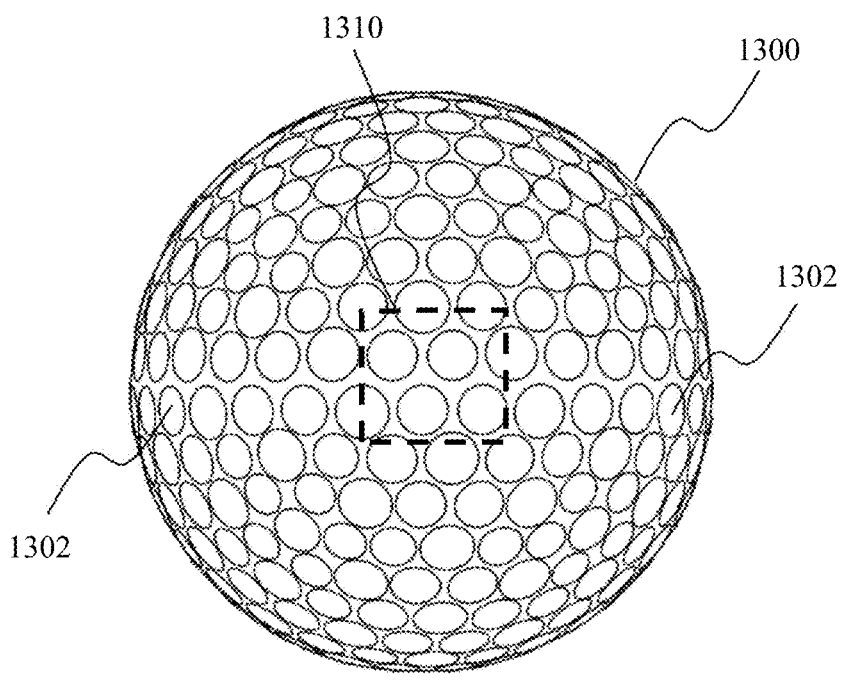
FIG. 13 illustrates an exemplary golf ball that can be used within the exemplary golf entertainment venue according to some embodiments of the present disclosure.

FIG. 13 illustrates an exemplary golf ball that can be used within the exemplary golf entertainment venue according to some embodiments of the present disclosure. As illustrated in FIG. 13 golf balls, such as the golf balls 110.1 through 110.n as described above in FIG. 1, include an outer surface 1300 including surface dimples 1302 and one or more graphical images 1310, such as the one or more graphical images 404.1 and 404.2, 414.x, and 424 described above in FIGS. 4A through 4D. As used herein, a graphical image 1310 represents an image configured to be identified by a golf entertainment venue computing system (for example, golf entertainment venue computing system 106). In some embodiments, the one or more graphical images 1310 configured to be identified by a golf entertainment venue computing system can exclude a barcode and a QR Code (Quick Response code).

In some embodiments, the one or more graphical images 1310 can be located on outer surface 1300 of the golf ball. In some embodiments, the one or more graphical images 1310 can be printed on outer surface 1300. In some embodiments, the one or more graphical images 1310 can be painted on outer surface 1300. In some embodiments, the one or more graphical images 1310 can be stamped on outer surface 1300.

In some embodiments, the one or more graphical images 1310 can be located below outer surface 1300 of the golf ball. For example, in some embodiments, the golf ball can include a dimpled surface and a protective coating layer disposed on the dimpled surface and defining outer surface 1300 of the golf ball. In such embodiments, the one or more graphical images 1310 can be located on the dimpled surface covered by the protective coating layer. In some embodiments, the one or more graphical images 1310 can be printed on the dimpled surface. In some embodiments, the one or more graphical images 1310 can be painted on the dimpled surface. In some embodiments, the one or more graphical images 1310 can be stamped on the dimpled surface.

In some embodiments, the one or more graphical images 1310 can be printed on the golf ball using a single pass inkjet printing technique where an oriented golf ball passes under or next to a printing head and rotates at a predetermined speed to apply a continuous image at a parting line.

With single pass industrial inkjet printers, a golf ball can pass below or adjacent to a series of print heads only once, producing high throughput speeds for mass production. In one embodiment, single pass inkjet systems are able to run at extremely high speeds, up to 50 inches per second and higher.

In order to increase resolution of a printed graphical image in the lateral sense, it is possible to add additional print heads in the print direction and offset them by a certain number of pixels to double or triple the dots per inch (dpi) in the in track while running at maximum speed. The print width can also be increased by adding print heads in the cross track to increase the print swath by a factor of the print head width.

In some embodiments, the resolution of the printed graphical image can vary between 100 to 1400 dots per inch (dpi), between 200 dpi and 400 dpi, between 300 dpi and 400 dpi, between 320 dpi and 390 dpi, between 1000 dpi and 1300 dpi, or between 350 dpi and 370 dpi. The typical firing frequency of the single pass printer heads can be between 6 kHz to 12 kHz. In some embodiments, the print swathe width for the printed graphical image can be between 1 mm to 25 mm, 3 mm to 20 mm, 4 mm to 15 mm, 5 mm to 10 mm, 25 mm to 200 mm, between 500 to 100 mm, or between 60 to 80 mm.

In some embodiments, the single pass inkjet printers consist of WW+CYMK. It is also possible to vastly expand the color gamut with the addition of print heads having Orange, Green, and Violet.

In some embodiments, the golf ball can be pre-treated to apply a charge to the surface on which the one or more graphical images is to be printed to improve ink adhesion. Some examples of pre-treatment methods include corona discharge, flame, or plasma pretreatment.

In some embodiments, a single pass printed graphical image 1310 can be printed using a UV curable ink. In such embodiments, at least one UV pinning operation can be used to pre-cure the UV curable ink before a final UV curing operation. In some embodiments, a single pass printed graphical image 1310 can be printed using the methods and devices described in U.S. Provisional App. No. 63/066,033, filed on Aug. 14, 2020, which is hereby incorporated by reference in its entirety.

In some embodiments, the one or more graphical images 1310 can be printed on the golf ball with various invisible mediums that are not visible to the human eye, such as infrared (IR) ink. In some embodiments, a portion of the one or more graphical images 1310 can be printed on the golf ball with these invisible mediums. In such embodiments, these invisible mediums can be read with illumination by a camera including a detector configured to read the invisible medium. In some embodiments, a teeing area image capture device (for example, teeing area image capture devices 310.1 through 310.n) can include a camera including an IR detector. In some embodiments, a target area image capture device (for example, target area image capture devices 712.1 through 712.n) can include a camera including an IR detector.

In some embodiments, the golf ball can include a single graphical image 1310. In such embodiments, the single graphical image 1310 can be used by the golf entertainment venue computing system, such as the golf entertainment venue computing system 106 as described above in FIG. 1, to identify the golf ball. In some embodiments including a plurality of golf balls, for example golf balls 110.1 through 110.n as described above in FIG. 1, with a single graphical image 1310, each single graphical image 1310 can be a different image unique, or near-unique, to a specific one of the plurality of golf balls, or a specific group of the plurality of golf balls. In these embodiments, no other golf ball, or specific group of golf balls, within a plurality of golf balls tracked by a golf entertainment venue computing system, such as the golf entertainment venue computing system 106 as described above, includes the same single graphical image. Alternatively, or in addition to, the same single graphical image can be used; however, the statistical chances that multiple golf balls having the same the graphical image being used by multiple players is significantly small when compared to the overall number of possible graphical images included on all, most, or a substantial number of the golf balls being utilized by the golf entertainment venue. In this fashion, the single graphical image 1310 can allow the golf entertainment venue computing system to identify and track a specific golf ball, or specific group of golf balls.

Figures 14A, 14B, 14C:
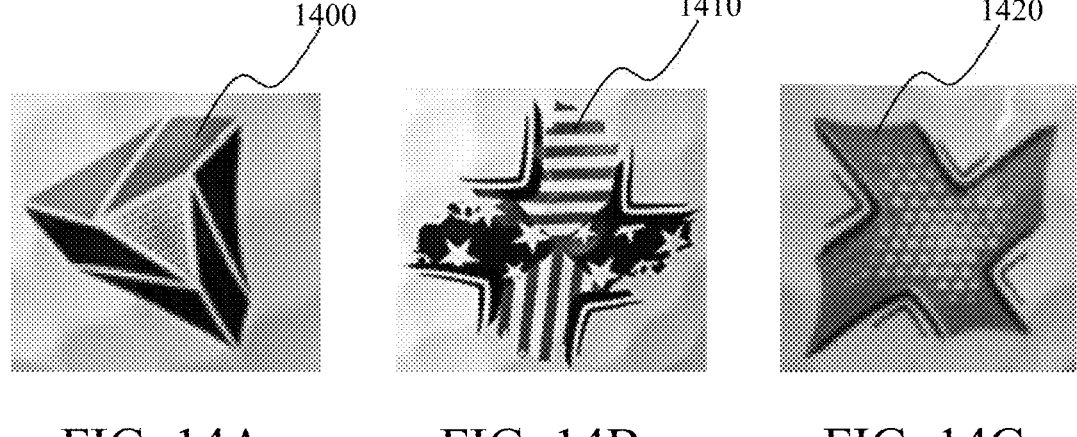
FIG. 14A through FIG. 14C illustrate exemplary graphical images that can be used on the exemplary golf ball according to some embodiments of the present disclosure.

FIG. 14A through FIG. 14C illustrate exemplary graphical images that can be used on the exemplary golf ball according to some embodiments of the present disclosure. Various exemplary single graphical images 1400, 1410, and 1420 are shown in FIG. 14A through FIG. 14C. The golf entertainment venue computing system can identify and track any of the single graphical images 1400, 1410, and 1420 in a substantially similar manner as described above in FIG. 1 through FIG. 12.

Referring back to FIG. 13, additional exemplary graphical image types for graphical image 1310 can include, but are not limited to, a basic geometrical shape, an animal character shape, a transportation object shape, a flag, a sports object shape, a symbol, a dot pattern, or a stripe pattern. In some embodiments, graphical image 1310 can include one of these graphical image types. In some embodiments, graphical image 1310 can include two or more of these graphical image types. For example, in some embodiments, graphical image 1310 can include a basic geometrical shape and a dot pattern. As another example, graphical image 1310 can include a basic geometrical shape, an animal character shape, and a dot pattern.

Exemplary basic geometrical shapes for graphical image 1310 include, but are not limited to, a triangle, a quadrilateral, a polygon (e.g., a pentagon, a hexagon, a heptagon, etc.), a circle, an ellipse, a crescent, and a pill-shape.

Exemplary animal character shapes for graphical image 1310 include, but are not limited to, a bear, a bison, a camel, a cat, a dog, a cow, a cougar, a tiger, a lion, a donkey, a goat, a horse, a zebra, an elephant, a giraffe, a monkey, a gorilla, a hippopotamus, a hyena, a kangaroo, a bird, an owl, a penguin, a rabbit, a ram, a rhinoceros, a seal, a sheep, a turtle, a snake, a frog, a spider, a lizard, a fish, a dolphin, a shark, a duck, a rooster, a turkey, a chicken, and a pig.

Exemplary transportation object shapes for graphical image 1310 include, but are not limited to, a car, a truck, a train, an airplane, a subway car, a motorcycle, a bicycle, a boat, a jet ski, a tractor, submarine, and a rocket.

Exemplary flags for graphical image 1310 include, but are not limited to, a United States flag, a Canadian flag, a Mexican flag, a Great Britain flag, an Irish flag, a Scottish flag, a French flag, a Spanish flag, a Portuguese flag, a German flag, a Swiss flag, an Italian flag, a South African flag, a Chinese flag, a Japanese flag, and an Australian flag.

Exemplary sports object shapes for graphical image 1310 include, but are not limited to, a soccer ball, a baseball, a softball, a basketball, a tennis ball, a volleyball, a frisbee, a football, a golf club, a lacrosse stick, a hockey stick, a hockey skate, a baseball cap, a baseball bat, a skateboard, and a surf board.

Exemplary symbols for graphical image 1310 include, but are not limited to, a dollar sign, a maple leaf, a Greek letter, a smiley face, a peace sign, a ying-yang, a zodiac sign, a heart, a spade, and a musical note symbol.

Figure 18:
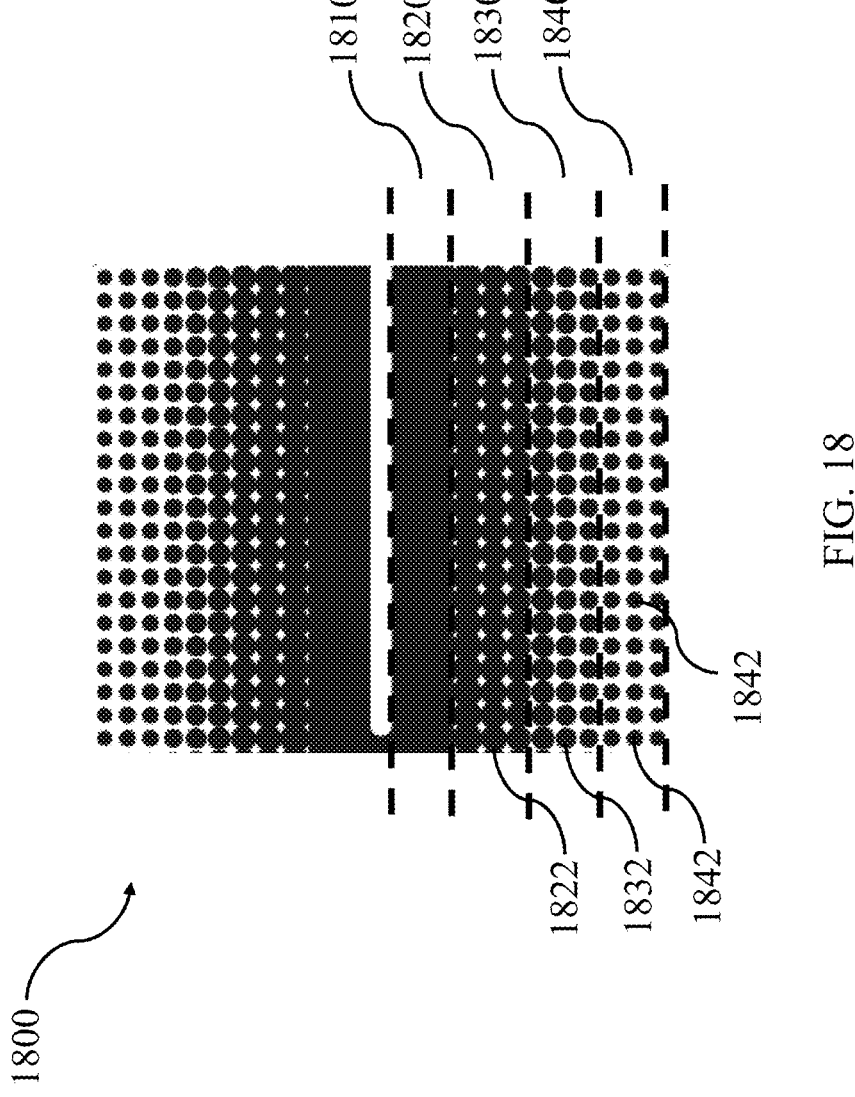
FIG. 18 and FIG. 19 illustrate exemplary dot patterns for a graphical image that can be used on the exemplary golf ball according to some embodiments of the present disclosure.
Figure 19:
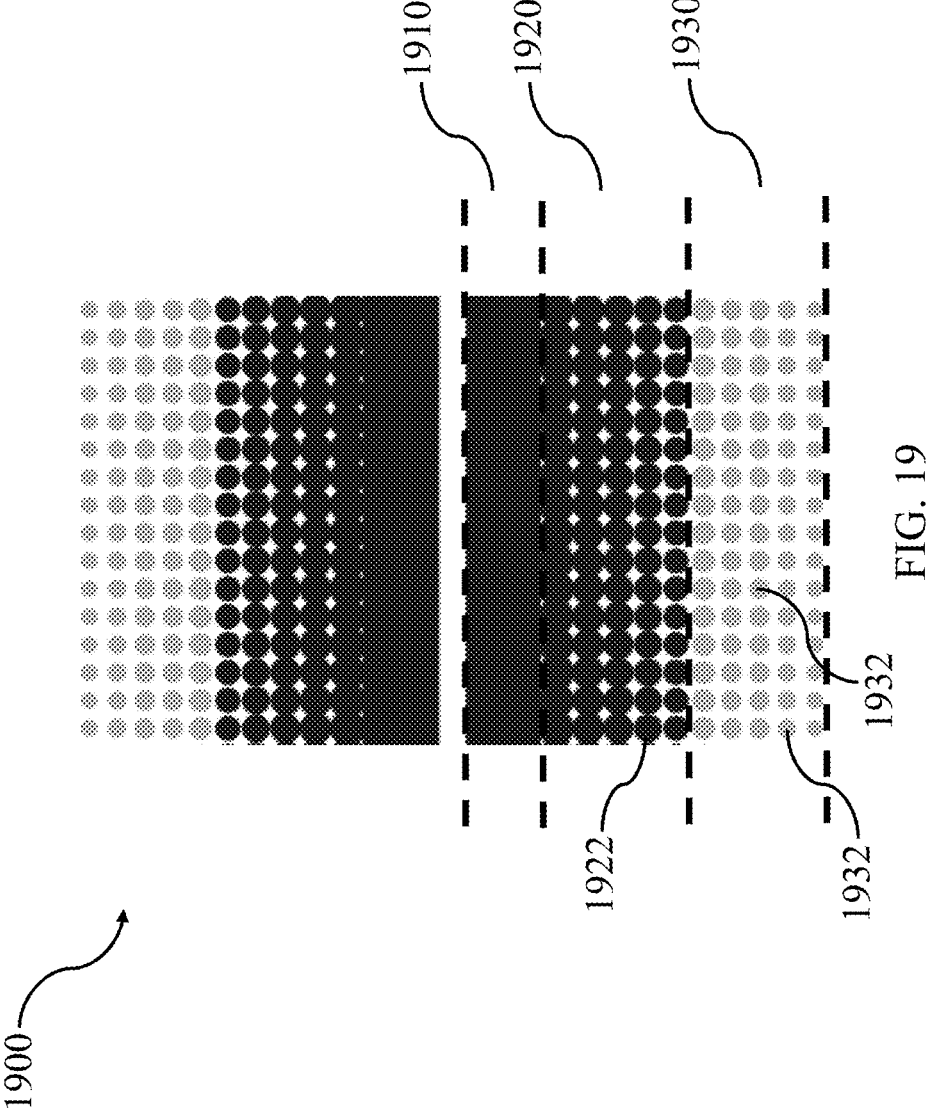

A dot pattern for graphical image 1310 can include one or more solid color areas and one or more dotted areas. Solid color area(s) are defined by an area of a single color. Dotted area(s) include a plurality of dots. The dots can be arranged in a pattern. Exemplary dot patterns are illustrated in FIG. 18 and FIG. 19. However, those skilled in the relevant art(s) will recognize that other dot patterns are possible without departing from the spirit and scope of the present disclosure. For example, while the dots are illustrated as circles in FIG. 18 and FIG. 19, the dots can be in the form of other shapes, such as, but not limited to squares, triangles, and ovals to provide some examples.

The dots in each dotted area can have a set of characteristics that distinguish the dots in each dotted area from dots in different dotted areas. As such, the set of characteristics can demarcate different dotted areas from each other. These different dotted areas and solid color areas can be utilized by the golf entertainment venue computing system, such as the golf entertainment venue computing system 106 as described above in FIG. 1, to identify and track the golf ball.

A set of characteristics for dots in a dotted area includes two or more characteristics of the dots in that area. The set of characteristics can be, but are not limited to, a dot shape, a dot surface area, a dot density, and a dot color. A "dot shape" refers to the overall shape of the dots, for example, a circle, a square, a triangle, or an oval. A "dot surface area" refers to the average surface area occupied by each dot on the surface of a golf ball. A "dot density" refers to the number of dots per unit surface area on a golf ball surface. A "dot color" refers to the color of each dot. As a non-limiting example, dots in a dotted area can have a circular shape, a dot surface area of 1 mm², a dot density of four dots per 10 mm², and a dot color of blue.

In some embodiments including multiple dotted areas, each dotted area in a graphical image 1310 includes a set of characteristics that is different from at least one of the other dotted areas in the graphical image 1310. A set of characteristics is different if at least one of the characteristics in the same set of characteristics for two different dotted areas is different. For example, the dots in a first dotted area can have a circular shape, a dot surface area of 1 mm², a dot density of four dots per 10 mm², and a dot color of blue, while the dots in a second dotted area can have a circular shape, a dot surface area of 1 mm², a dot density of four dots per 10 mm², and a dot color of red. In this example, only one out of four of the same characteristics (color) in the first and second set is different. As another example, the dots in the second dotted area can have a circular shape, a dot surface area of 1.5 mm², a dot density of four dots per 10 mm², and a dot color of red. In this example, two out of four of the same characteristics (color and dot surface area) in the first and second set are different. A size characteristic, for example "dot surface area" or a "dot density" is considered different if there is at least 10% difference in the characteristic.

A dot pattern can create a unique or near-unique graphical image on a golf ball to uniquely, or near-uniquely, differentiate the golf ball from other golf balls within the golf entertainment venue, such as the golf entertainment venue 100 as described above in FIG. 1. In some embodiments including golf balls with dot patterns, the golf entertainment venue computing system can identify different golf balls by imaging and analyzing the unique or near-unique arrangement of solid color area(s) and dotted area(s) of a dot pattern as described above in FIG. 1 through FIGS. 12.

A stripe pattern can include one or more solid color area stripes and one or more dotted area stripes. Solid color area stripes(s) are defined by a stripe of a single color. Dotted area stipes(s) include a plurality of dots. The dots can be arranged in a pattern. Exemplary stripe patterns are to be described in further detail below in FIG. 20 and FIG. 21. However, those skilled in the relevant art(s) will recognize that other stripe patterns are possible without departing from the spirit and scope of the present disclosure. For example, while the dotted area stripes are illustrated as including circles in FIG. 20 and FIG. 21, the dotted area stripes can be in the form of other shapes, such, but not limited to squares, triangles, and ovals to provide some examples.

The dots in each dotted area stripe can have a set of characteristics that distinguish the dots in each dotted area stripe from dots in different dotted area stripes in the same manner as discussed above for the dotted areas in a dot pattern.

The one or more solid color area stripes and the one or more dotted area stripes for stripe pattern include an area extending around the circumference of a golf ball and having a length that is at least two times greater than its width. The width of a solid color area stripe or a dotted area stripe is measured at a 90° angle relative to the length. In some embodiments, the one or more solid color area stripes and the one or more dotted area stripes for stripe pattern include an area extending around the circumference of a golf ball and having a length that is at least three times greater than its width.

Figure 22:
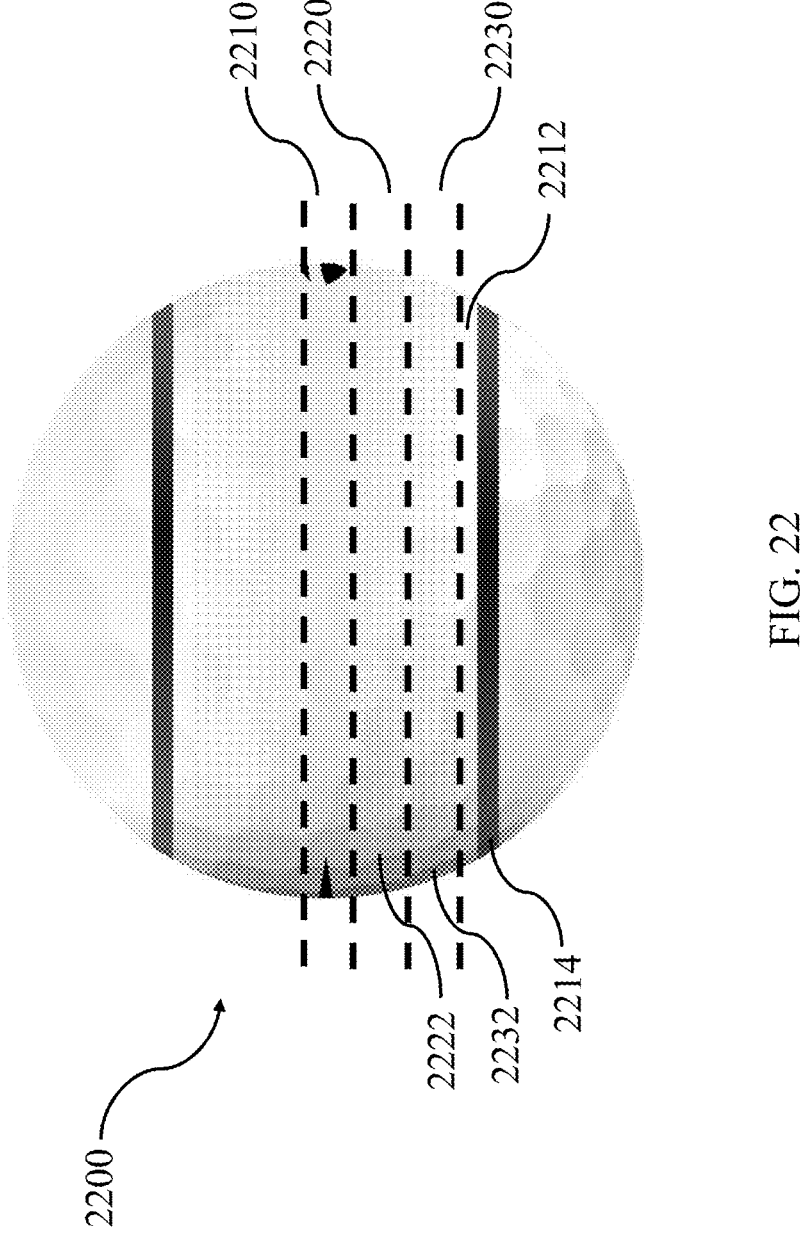

In some embodiments, the one or more solid color area stripes and the one or more dotted area stripes for a stripe pattern can have a length that circumscribes at least 50% of the circumference of a golf ball. In some embodiments, the one or more solid color area stripes and the one or more dotted area stripes for a stripe pattern can have a length that circumscribes at least 75% of the circumference of a golf ball. In some embodiments, the one or more solid color area stripes and the one or more dotted area stripes for a stripe pattern can have a length that circumscribes at least 90% of the circumference of a golf ball. In some embodiments, the one or more solid color area stripes and the one or more dotted area stripes for a stripe pattern can have a length that circumscribes 100% of the circumference of a golf ball. FIG. 22 illustrates a stripe pattern circumscribing at least 50% of the circumference of a golf ball according to some embodiments.

A stripe pattern can create a unique or near-unique graphical image on a golf ball to uniquely, or near-uniquely, differentiate the golf ball from other golf balls within the golf entertainment venue, such as the golf entertainment venue 100 as described above in FIG. 1. In some embodiments including golf balls with stripe patterns, the golf entertainment venue computing system can identify different golf balls by imaging and analyzing the unique or near-unique arrangement of solid color area stripe(s) and dotted area stripe(s) of a stripe pattern as described above in FIG. 1 through FIG. 12.

In some embodiments, the graphical image 1310 can include a single color defining all features of the graphical image 1310. In some embodiments, each graphical image 1310 on a golf ball can include the same single color defining all features of the graphical image 1310. In some embodiments, the one or more graphical images 1310 on different golf balls can include a different single color defining all features of the graphical image(s) 1310. In some embodiments, a graphical image 1310 can include a plurality of different colors defining different features of the graphical image 1310. In some embodiments, each graphical image on a golf ball can include the same plurality of different colors defining different features of the graphical image 1310. In some embodiments, the one or more graphical images 1310 on different golf balls can include one or more different colors defining different features of the graphical image(s) 1310.

In some embodiments, the one or more colors of a graphical image can create a unique or near-unique graphical image on a golf ball to uniquely, or near-uniquely, differentiate the golf ball from other golf balls within the golf entertainment venue. For example, in some embodiments including golf balls including an animal character shape graphical image 1310, the golf entertainment venue computing system can identify different golf balls by imaging and analyzing the animal character shape and color(s) of the animal character shape as described above in FIG. 1 through FIG. 12. As another example, in some embodiments including golf balls including graphical images 1310 with a dot pattern, the golf entertainment venue computing system can identify different golf balls by imaging and analyzing the dot pattern and color(s) of the dot pattern as described above in FIG. 1 through FIG. 12.

A color for a graphical image 1310 can be, for example, red, crimson, maroon, magenta, pink, orange, yellow, gold, chartreuse, green, blue, navy, aqua, teal, cerulean, indigo, violet, purple, brown, black, grey, white, beige, silver, taupe, or various shades of these colors.

A color can be described with respect to CIELab color space using L*a*b* color values or L*C*h color values, but other color descriptions can be used. As used herein, L* is referred to as lightness, a* and b* are referred to as chromaticity coordinates, C* is referred to as chroma, and h is referred to as hue. In the CIELab color space, +a* is a red direction, −a* is a green direction, +b* is a yellow direction, and −b* is the blue direction. L* has a value of 100 for a perfect white diffuser. Chroma and hue are polar coordinates associated with a* and b*, wherein chroma (C*) is a distance from the axis along which a*=b*=0 and hue is an angle measured counterclockwise from the +a* axis.

In some embodiments, a yellow color may have L, a, and b values within the following ranges: L=80-95; a=−20-5; and b=45-110. For example, in some embodiments, an orange color may have L, a, and b values within the following ranges: L=50-90; a=5-65; and b=40-95. As another example, in some embodiments, a red color may have L, a, and b values within the following ranges: L=35-85; a=25-80; and b=−50-55. As another example, in some embodiments, a violet color may have L, a, and b values within the following ranges: L=15-80; a=20-80; and b=−65-0. In some embodiments, a blue color may have L, a, and b values within the following ranges: L=10-90; a=−55-55; and b=−75-−10. As another example, in some embodiments, a green color may have L, a, and b values within the following ranges: L=25-90; a=−85-15; and b=−15-85.

In some embodiments, a first color can be selected from the group of: red, crimson, maroon, magenta, pink, orange, yellow, gold, chartreuse, green, blue, navy, aqua, teal, cerulean, indigo, violet, purple, brown, black, grey, white, beige, silver, or taupe. In some embodiments, a second color can be selected from the group of: red, crimson, maroon, magenta, pink, orange, yellow, gold, chartreuse, green, blue, navy, aqua, teal, cerulean, indigo, violet, purple, brown, black, grey, white, beige, silver, or taupe.

Two colors are considered different if there is any detectable color difference between the first color and the second color. In some embodiments, a first color described as being different from a second color has one or more of a lightness value, a chroma value, or a hue value that is at least 1% higher or at least 1% lower than the lightness value, chroma value, and hue value the second color. In some embodiments, the first color can have a lightness value of at least 1% higher or at least 1% lower than the lightness value of the second color. In some embodiments, the first color can have a chroma value of at least 1% higher or at least 1% lower than the chroma value of the second color. In some embodiments, the first color can have a hue value of at least about 1% higher or at least about 1% lower than the hue value of the second color.

In some embodiments, a first color described as being different from a second color has one or more of a lightness value, a chroma value, or a hue value that is at least 5% higher or at least 5% lower than the lightness value, chroma value, and hue value the second color. In some embodiments, the first color can have a lightness value of at least 5% higher or at least 5% lower than the lightness value of the second color. In some embodiments, the first color can have a chroma value of at least 5% higher or at least 5% lower than the chroma value of the second color. In some embodiments, the first color can have a hue value of at least about 5% higher or at least about 5% lower than the hue value of the second color.

In some embodiments, a first color described as being different from a second color has one or more of a lightness value, a chroma value, or a hue value that is at least 10% higher or at least 10% lower than the lightness value, chroma value, and hue value the second color. In some embodiments, the first color can have a lightness value of at least 10% higher or at least 10% lower than the lightness value of the second color. In some embodiments, the first color can have a chroma value of at least 10% higher or at least 10% lower than the chroma value of the second color. In some embodiments, the first color can have a hue value of at least about 10% higher or at least about 10% lower than the hue value of the second color.

In some embodiments, the number of golf balls tracked by golf entertainment venue computing system 106 at a golf entertainment venue, for example golf entertainment venue 100, can include 500 or more golf balls, 1000 or more golf balls, 5000 or more golf balls, or 10,000 or more golf balls. In some embodiments, the number of specific groups of golf balls tracked by golf entertainment venue computing system 106 can include 100 or more specific groups of golf balls, 500 or more specific groups of golf balls, or 1000 or more specific groups of golf balls.

As used herein, a "specific group of golf balls" or a "group of specific golf balls" refers to a group of golf balls having the same graphical image or set of graphical images. In other words, each golf ball in a specific group of golf balls or group of specific golf balls has the same graphical image or set of graphical images that can be used by the golf entertainment venue computing system 106 to identify, track, and/or sort each ball in that specific group. In some embodiments, a "specific group of golf balls" or a "group of specific golf balls" can include 50 or more golf balls, 100 or more golf balls, 250 or more golf balls, or 500 or more golf balls.

In some embodiments, the golf ball can include a plurality of graphical images 1310. In some embodiments, the plurality of graphical images 1310 can be a plurality of the same graphical image. In some embodiments, the plurality of graphical images 1310 can be different graphical images. In some embodiments, the golf ball can include three or more graphical images 1310. In some embodiments, the golf ball can include four or more graphical images 1310.

In some embodiments including a golf ball with a plurality of the same graphical image 1310, any one of the plurality of graphical images 1310 can be used by the golf entertainment venue computing system to identify the golf ball. In some embodiments including a plurality of golf balls, for example golf balls 110.1 through 110.$n$ as described above in FIG. 1, each respectively having a plurality of the same graphical image, the graphical images can be unique or near-unique to a specific one of the plurality of golf balls, or a specific group of golf balls. In other words, no other golf ball, or specific group of golf balls, within a plurality of golf balls tracked by the golf entertainment venue computing system includes the same graphical image. Alternatively, or in addition to, the same single graphical image can be used; however, the statistical chances that multiple golf balls having the same the graphical image being used by multiple players is significantly small when compared to the overall number of possible graphical images included on all, most, or a substantial number of the golf balls being utilized by the golf entertainment venue. In this fashion, the plurality of graphical images can allow the golf entertainment venue computing system to identify and track a specific golf ball, or specific group of golf balls. Since the golf entertainment venue computing system can rely on any one of the plurality of same unique or near-unique graphical images, the golf entertainment venue computing system can identify a particular golf ball even if one of the plurality of images is damaged (for example, worn) or hidden from view in a captured image of the golf ball.

Figure 15A:
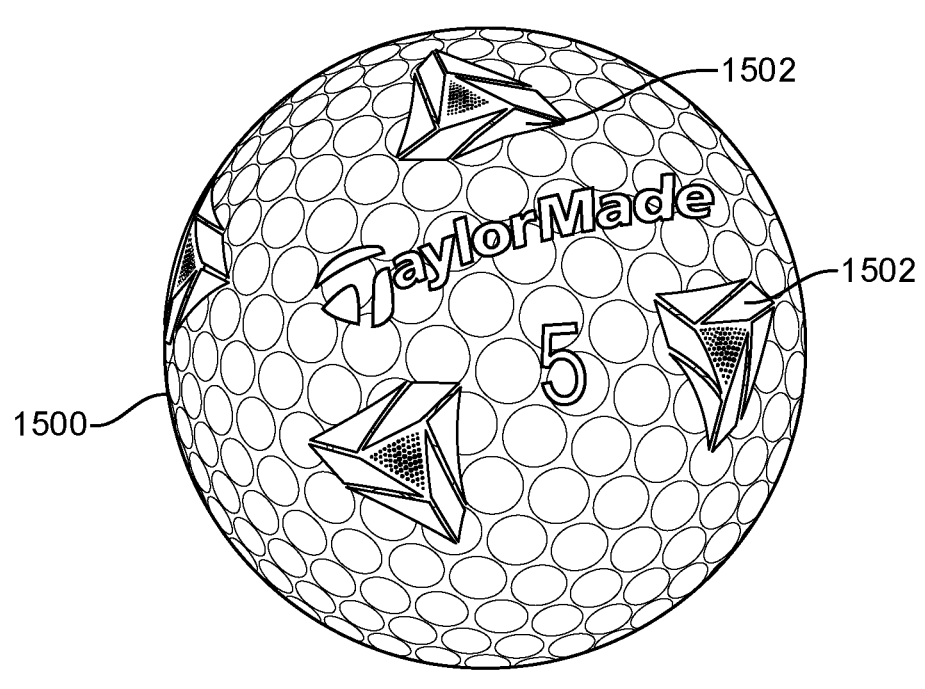
FIG. 15A through FIG. 15C illustrate exemplary golf balls having multiple graphical images that can be used within the exemplary golf entertainment venue according to some embodiments of the present disclosure.
Figure 15B:
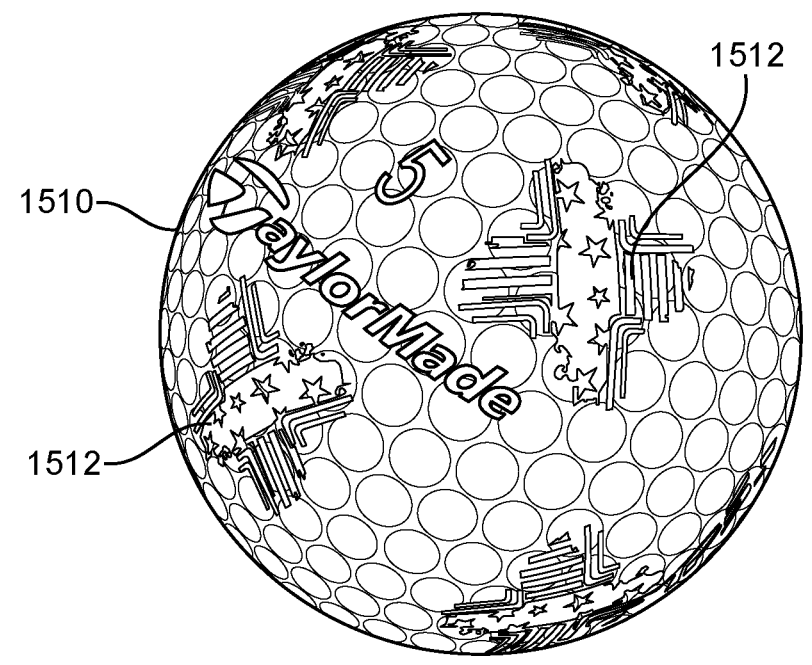
Figure 15C:
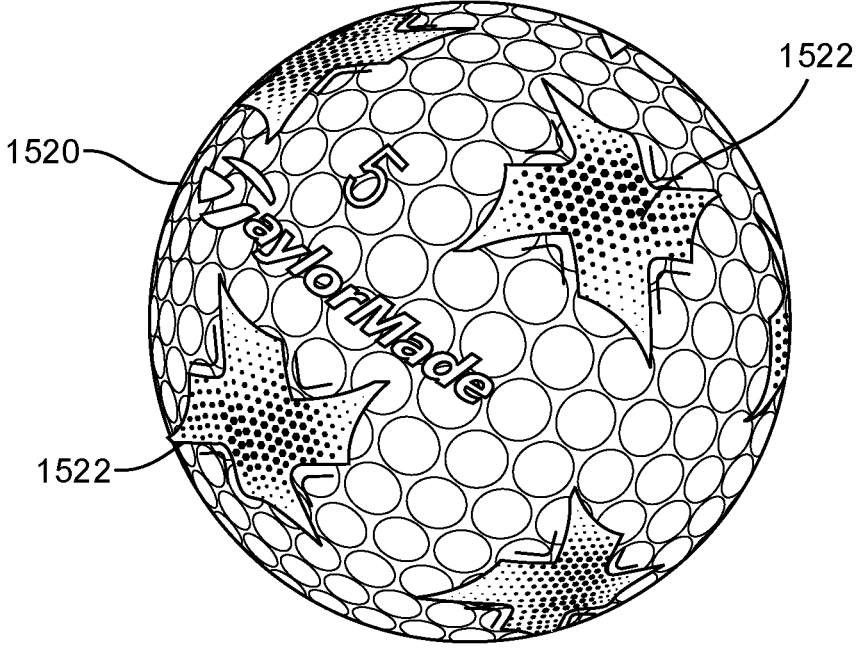

FIG. 15A through FIG. 15C illustrate exemplary golf balls having multiple graphical images that can be used within the exemplary golf entertainment venue according to some embodiments of the present disclosure. As illustrated in FIG. 15, exemplary golf balls 1500, 1510, and 1520 each having a plurality of the same unique or near-unique graphical image. FIG. 15A shows a golf ball 1500 including a plurality of the same graphical images 1502. FIG. 15B shows a golf ball 1510 including a plurality of the same graphical images 1512. FIG. 15C shows a golf ball 1520 including a plurality of the same graphical images 1522.

In some embodiments, the golf ball can include a graphical image defined by a set of elementary graphical images that the golf entertainment venue computing system uses to identify and track the golf ball. In some embodiments, no other golf ball, or specific group of golf balls, within a plurality of golf balls tracked by the golf entertainment venue computing system includes a graphical image with the same set of elementary graphical images. Alternatively, or in addition to, the same set of elementary graphical images can be used; however, the statistical chances that multiple golf balls having the same set of elementary graphical images being used by multiple players is significantly small when compared to the overall number of possible graphical images included on all, most, or a substantial number of the golf balls being utilized by the golf entertainment venue. In this fashion, the set of elementary graphical images on each golf ball can allow the golf entertainment venue computing system to identify and track a specific golf ball, or specific group of golf balls.

In some embodiments, the elementary graphical images can be arranged in a pattern on the golf ball. By arranging the elementary graphical images in a pattern on a golf ball, a unique or near-unique set of elementary graphical images for different golf balls, or groups of golf balls, can be defined. In some embodiments, the set of elementary graphical images can include one or more rows of elementary graphical images and/or one or more columns of elementary graphical images. In some embodiments, the set of elementary graphical images can include a central elementary graphical image with a plurality of elementary graphical images disposed radially about the central elementary graphical image. In such embodiments, the radially disposed elementary graphical images can be spaced apart by an angle of at least 5 degrees, at least 10 degrees, at least 20 degrees, at least 30 degrees, at least 45 degrees, at least 90 degrees, or at least 120 degrees. In some embodiments, the radially disposed elementary graphical images can include 2 or more elementary graphical images, 3 or more elementary graphical images, 4 or more elementary graphical images, 5 or more elementary graphical images, or 6 or more elementary graphical images.

As used herein, an elementary graphical image can include an image including an outer shape having a standard geometric shape, for example but not limited to, a square, a rectangle, a circle, an oval, a triangle, a pentagon, or an octagon. Features of the elementary graphical images inside the outer shape can be varied to produce various series of elementary graphical images that can be used to create different sets of unique or near-unique elementary graphical images for a graphical image on a golf ball.

Figure 16:
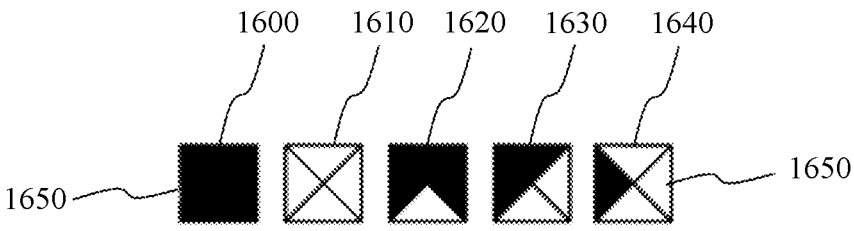
FIG. 16 illustrates a series of elementary graphical images that can be used on the exemplary golf balls according to some embodiments of the present disclosure.
Figure 17:
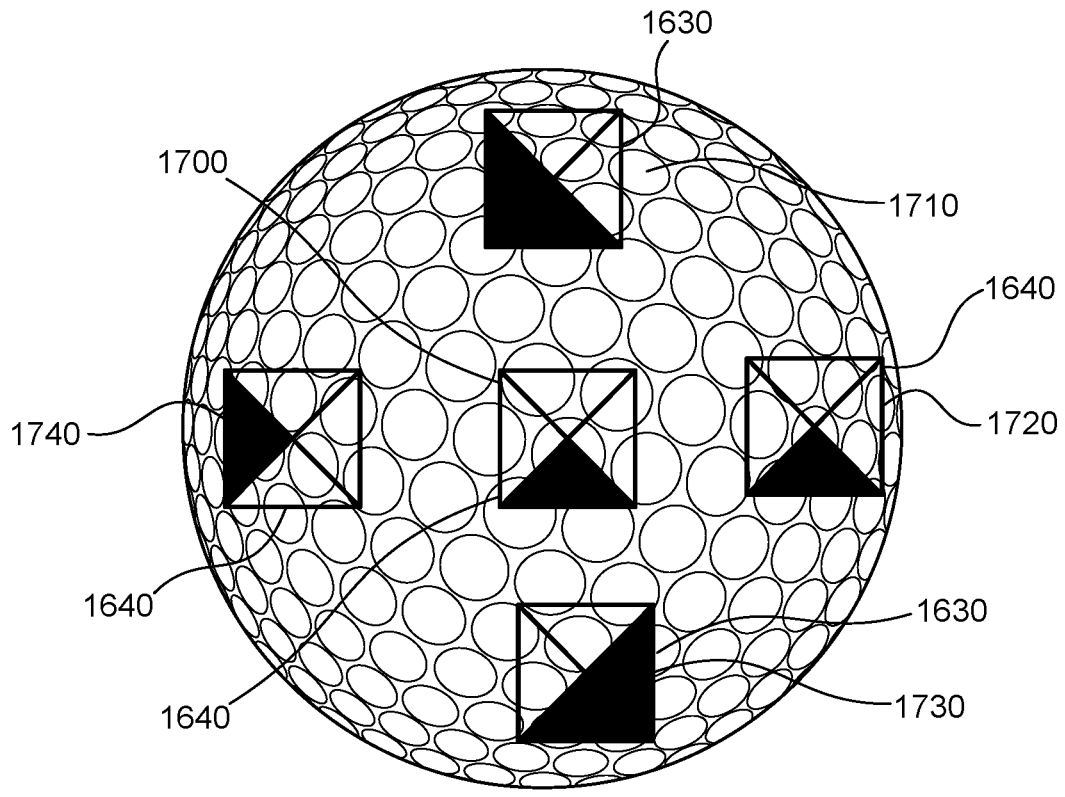
FIG. 17 illustrates an exemplary golf ball having a graphical image defined by a set of elementary graphical images that can be used within the exemplary golf entertainment venue according to some embodiments of the present disclosure.

FIG. 16 illustrates a series of elementary graphical images that can be used on the exemplary golf balls according to some embodiments of the present disclosure and FIG. 17 illustrates an exemplary golf ball having a graphical image defined by a set of elementary graphical images that can be used within the exemplary golf entertainment venue according to some embodiments of the present disclosure. FIG. 16 illustrates an exemplary series of elementary graphical images 1600, 1610, 1620, 1630, and 1640 that can be used to create different sets of elementary graphical images for graphical images on a golf ball. Each of elementary graphical images 1600, 1610, 1620, 1630, and 1640 includes a square outer shape 1650. The features inside square outer shape 1650 for each elementary graphical images 1600, 1610, 1620, 1630, and 1640 are different. Elementary graphical image 1600 includes a solid color fill within the outer shape 1650. Elementary graphical image 1610 includes an "X" shape within the outer shape 1650 with all four quadrants of the "X" shape unfilled with a color. Elementary graphical image 1620 includes an "X" shape within the outer shape 1650 with three quadrants of the "X" shape filled with a color. Elementary graphical image 1630 includes an "X" shape within the outer shape 1650 with two quadrants of the "X" shape filled with a color. Elementary graphical image 1630 includes an "X" shape within the outer shape 1650 with one quadrant of the "X" shape filled with a color.

As a non-limiting example, the five elementary graphical images 1600, 1610, 1620, 1630, and 1640 can be arranged in a five-location pattern on a golf ball as illustrated in FIG. 17. The first location 1700 can be a central location including a central elementary graphical image, for example elementary graphical image 1640. The second location 1710 can be a first radial location including a first radial elementary graphical image, for example elementary graphical image 1630. The third location 1720 can be a second radial location including a second radial elementary graphical image, for example elementary graphical image 1640. The fourth location 1730 can be a third radial location including a third radial elementary graphical image, for example elementary graphical image 1630. The fifth location 1740 can be a fourth radial location including a fourth radial elementary graphical image, for example elementary graphical image 1640.

The elementary graphical image at the first, second, third, fourth, and fifth locations can be the same or different. In some embodiments including a plurality of golf balls with unique or near-unique sets of elementary graphical images, no golf ball within the plurality of golf balls may include the same set of elementary graphical images arranged at the same locations on the golf ball. In some embodiments, no golf ball, or specific group of golf balls, within a plurality of golf balls tracked by the golf entertainment venue computing system includes the same set of elementary graphical images defining a graphical image on the golf ball, or specific group of golf balls.

Variations in a set of elementary graphical images for each of a plurality of golf balls, or for each of a plurality of specific groups of golf balls can be achieved by, among other things, changing one or more of: (i) the location of different elementary graphical images in a series of elementary graphical images, (ii) the color of one or more elementary graphical images in a series of elementary graphical images, (iii) the shape of one or more elementary graphical images in a series of elementary graphical images, (iv) the number of elementary graphical images in a set of elementary graphical images, (v) the location of one or more elementary graphical images in a set of elementary graphical images, and (vi) the orientation of one or more elementary graphical images in a set of elementary graphical images.

FIG. 18 and FIG. 19 illustrate exemplary dot patterns for a graphical image that can be used on the exemplary golf ball according to some embodiments of the present disclosure. FIG. 18 illustrates a dot pattern 1800 according to some embodiments. Dot pattern 1800 includes a solid color area 1810 and a plurality of dotted areas 1820, 1830, 1840. Dotted area 1820 includes a plurality of dots 1822. Dotted area 1830 includes a plurality of dots 1832. Dotted area 1840 includes a plurality of dots 1842.

Solid color area 1810 is defined by an area consisting of a single color. In some embodiments, the color of solid color area can be the same as the color of the dots 1822 in dotted area 1820, the dots 1832 in dotted area 1830, and/or the dots 1842 in dotted area 1840. In some embodiments, the color of solid color area can be different from the color of the dots 1822 in dotted area 1820, the dots 1832 in dotted area 1830, and/or the dots 1842 in dotted area 1840.

Dotted area 1820 includes a plurality of dots 1822 having a first set of characteristics. The first set of characteristics includes a circular shape, a first dot surface area, a dot density, and a color. Dotted area 1830 includes a plurality of dots 1832 having a second set of characteristics. The second set of characteristics includes the circular shape, a second dot surface area different from the first dot surface area, the dot density, and the color. Dotted area 1840 includes a plurality of dots 1842 having a third set of characteristics. The third set of characteristics includes the circular shape, a third dot surface area different from the first dot surface area and the second dot surface area, the dot density, and the color.

FIG. 19 illustrates a dot pattern 1900 according to some embodiments. Dot pattern 1900 includes a solid color area 1910 and a plurality of dotted areas 1920, 1930. Dotted area 1920 includes a plurality of dots 1922. Dotted area 1930 includes a plurality of dots 1932.

In some embodiments, the color of solid color area 1910 can be the same as the color of dots 1922 in dotted area 1920 and/or the dots 1932 in dotted area 1930. In some embodiments, the color of solid color area 1910 can be different from the color of dots 1922 in dotted area 1920 and/or the dots 1932 in dotted area 1930.

Dotted area 1920 includes a plurality of dots 1922 having a first set of characteristics. The first set of characteristics includes a circular shape, a first dot surface area, a first dot density, and a color. Dotted area 1930 includes a plurality of dots 1932 having a second set of characteristics. The second set of characteristics includes the circular shape, a second dot surface area different from the first dot surface area, the first dot density, and a second color different from the first color.

Figure 20:
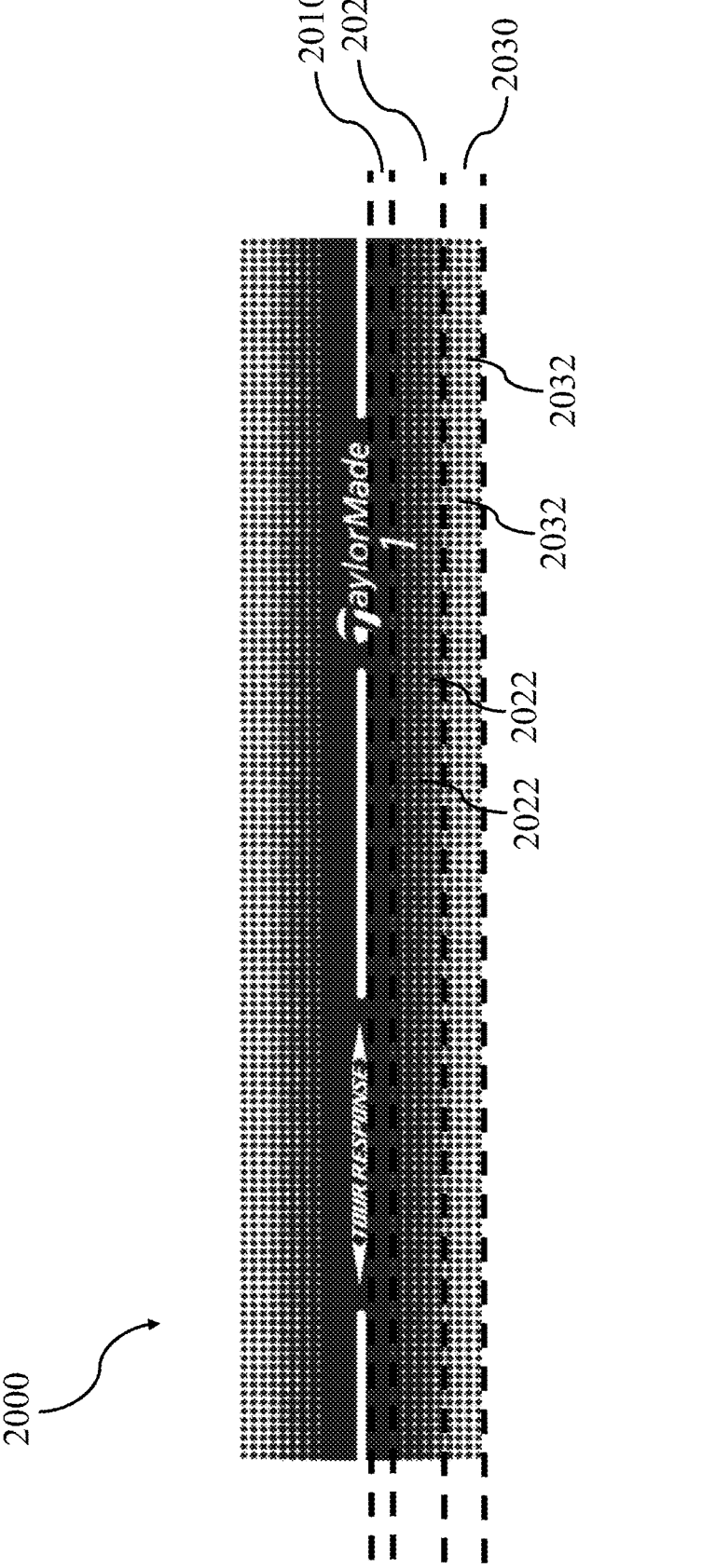
FIG. 20 through FIG. 22 illustrate exemplary stripe patterns for a graphical image that can be used on the exemplary golf ball according to some embodiments of the present disclosure.
Figure 21:
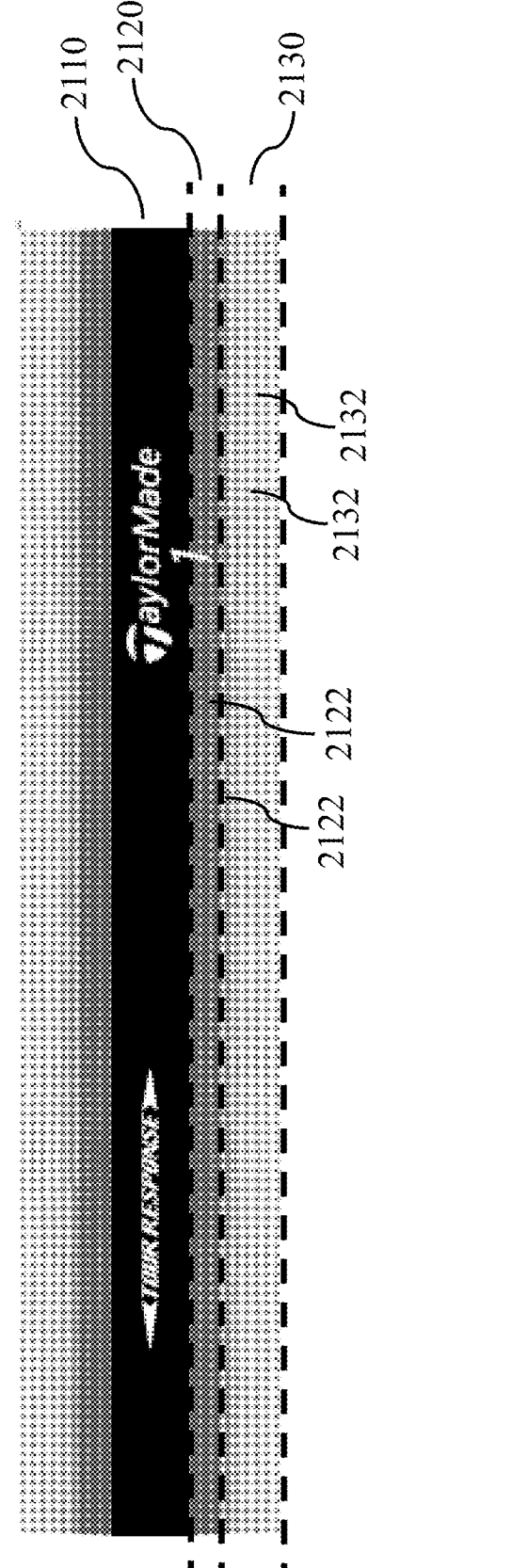

FIG. 20 through FIG. 22 illustrate exemplary dot patterns for a graphical image that can be used on the exemplary golf ball according to some embodiments of the present disclosure. FIG. 20 illustrates a stripe pattern 2000 according to some embodiments. Stripe pattern 2000 includes a solid color area stripe 2010 and a plurality of dotted area stripes 2020, 2030. Dotted area stripe 2020 includes a plurality dots 2022. Dotted area stripe #30 includes a plurality of dots #32.

In some embodiments, the color of solid color area stripe 2010 can be the same as the color of dots 2022 in dotted area stripe 2020 and/or the dots 2032 in dotted area stripe 2030. In some embodiments, the color of solid color area stripe 2010 can be different from the color of dots 2022 in dotted area stripe 2020 and/or the dots 2032 in dotted area stripe 2030. Dotted area stripe 2020 includes a plurality of dots 2022 having a first set of characteristics. The first set of characteristics includes a circular shape, a first dot surface area, a dot density, and a color. Dotted area stripe 2030 includes a plurality of dots 2032 having a second set of characteristics. The second set of characteristics includes the circular shape, a second dot surface area different from the first dot surface area, the dot density, and the first color.

FIG. 21 illustrates a stripe pattern 2100 according to some embodiments. Stripe pattern 2100 includes a solid color area stripe 2110 and a plurality of dotted area stripes 2120, 2130. Dotted area stripe 2120 includes a plurality dots 2122. Dotted area stripe 2130 includes a plurality of dots 2132.

In some embodiments, the color of solid color area stripe 2110 can be the same as the color of dots 2122 in dotted area stripe 2120 and/or the dots 2132 in dotted area stripe 2130. In some embodiments, the color of solid color area stripe 2110 can be different from the color of dots 2122 in dotted area stripe 2120 and/or the dots 2132 in dotted area stripe 2130. Dotted area stripe 2120 includes a plurality of dots 2122 having a first set of characteristics. The first set of characteristics includes a circular shape, a first dot surface area, a dot density, and a color. Dotted area stripe 2130 includes a plurality of dots 2132 having a second set of characteristics. The second set of characteristics includes the circular shape, a second dot surface area different from the first dot surface area, the dot density, and a second color different from the first color.

FIG. 22 illustrates a stripe pattern 2200 circumscribing at least 50% of the circumference of a golf ball according to some embodiments. Stripe pattern 2200 includes a plurality solid color area stripes 2210, 2212, 2214 and a plurality of dotted area stripes 2220, 2230.

Solid color area stripe 2210 is defined by a stripe of a first single color. Solid color area stripe 2212 is defined by a stripe of a second single color different from the color of the first single color. Solid color area stripe 2214 is defined by a stripe of a third single color different from the color of the first single color and different from the color of the second single color.

Dotted area stripe 2220 includes a plurality of dots 2222 having a first set of characteristics. The first set of characteristics includes a circular shape, a first dot surface area, a dot density, and a color. Dotted area stripe 2230 includes a plurality of dots 2232 having a second set of characteristics. The second set of characteristics includes the circular shape, a second dot surface area different from the first dot surface area, the dot density, and the color.

In some embodiments, golf entertainment venue 100 can include a sorting system for sorting golf balls having different graphical images 1310. The sorting system can identify a golf ball having a particular graphical image 1310 and sort that golf ball into a collection area for all golf balls having that same particular graphical image. For example, the sorting system can identify all golf balls at venue 100 having the dot pattern 1800 illustrated in FIG. 18 and sort all the golf balls having the dot pattern 1800 into a particular collection area.

Golf balls having a particular graphical image 1310 collected in a collection area can be distributed to a player before or during a first golf game. The player can use the golf balls having the particular graphical image 1310 for the golf game, the golf balls having the particular graphical image 1310 can be sorted by the sorting system into a collection area, and the golf balls having the particular graphical image 1310 can be redistributed to another player before or during a second golf game.

Figure 23:
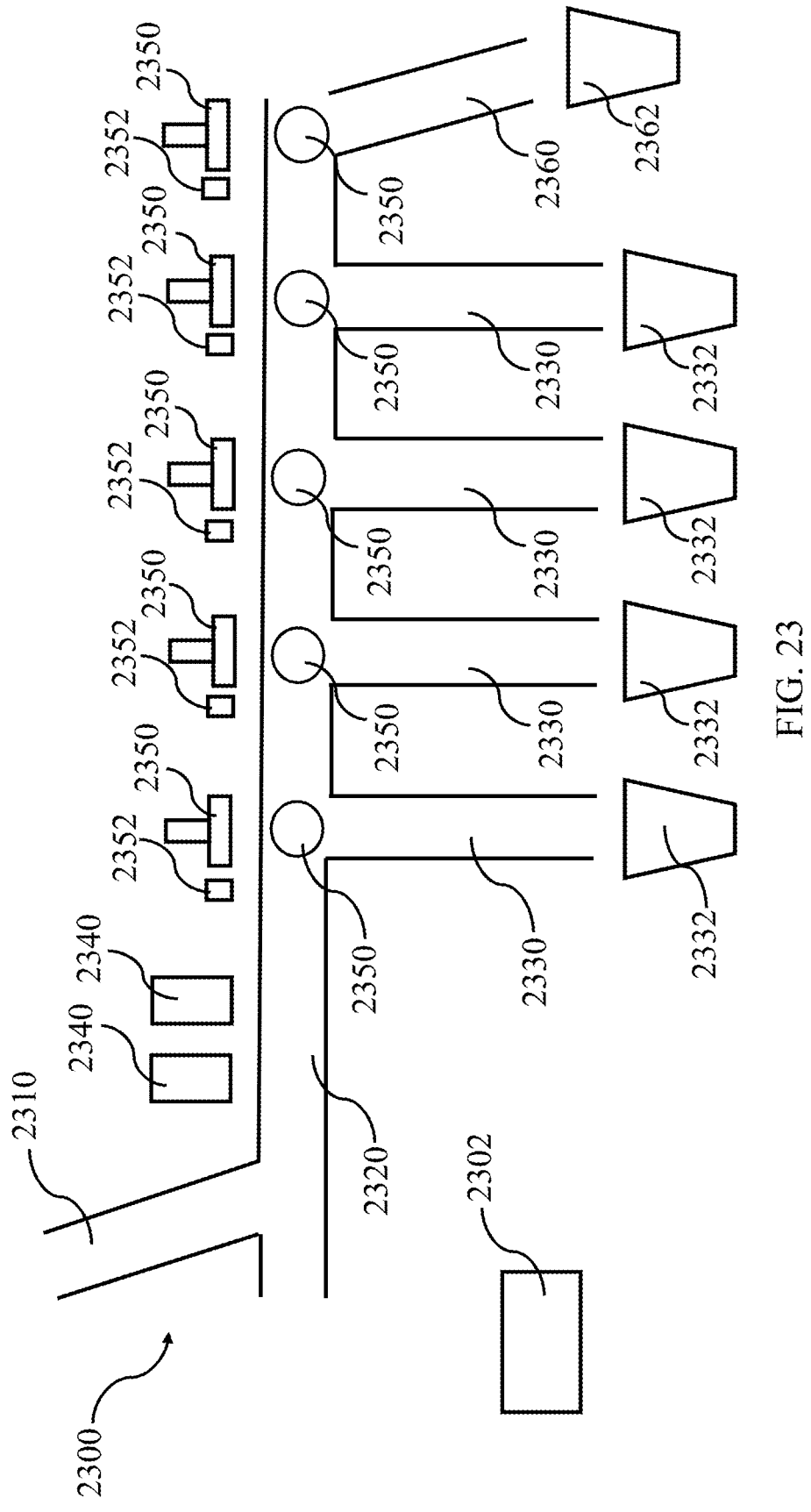
FIG. 23 illustrates a sorting system that can be implemented within the exemplary golf entertainment venue according to some embodiments.

Exemplary Sorting System that can be Implemented within the Exemplary Golf Entertainment Venue FIG. 23 illustrates a sorting system that can be implemented within the exemplary golf entertainment venue according to some embodiments. As illustrated in FIG. 23, sorting system 2300 includes one or more inlet channels 2310. In some embodiments, the sorting system 2300 can represent an exemplary embodiment of the golf ball collection mechanism 710 and/or can represent a standalone, or discrete device that is coupled to the golf ball collection mechanism 710. As illustrated in FIG. 23, inlet channels 2310 are configured to receive golf balls and lead them to a sorting line 2320. In some embodiments, the one or more inlet channels 2310 can be coupled to golf ball collection mechanism 710 of target areas, for example target areas 700 and 720, such that golf balls collected by the collection mechanisms 710 travel directly into sorting system 2300. In some embodiments, sorting line 2320 can be a channel through which golf balls travel. In some embodiments, sorting line 2320 can be a conveyor on which golf balls travel.

Sorting system 2300 includes a plurality of collection lines 2330. Each collection line 2330 is coupled to a collection area 2332. In some embodiments, collection lines 2330 can be channels through which golf balls travel. In some embodiments, collection lines 2330 can be conveyors on which golf balls travel.

Sorting system 2300 includes one or more image capture devices 2340 to capture one or more graphical images included, for example, printed, painted, or stamped on a golf ball as described above. In some embodiments, the one or more image capture devices 2340 can be utilized to capture the one or more digital images of the golf ball as described above which can be utilized by the golf ball identification procedure to identify the players that hit the golf balls that arrive at the target areas in a substantially similar manner as described above inn FIG. 1 through FIG. 12. In some embodiments, the one or more image capture devices 2340 can capture the one or more graphical images on a golf ball in an inlet channel 2310. In some embodiments, the one or more image capture devices 2340 can capture the one or more graphical images on a golf ball in sorting line 2320. Image capture devices 2340 can be any suitable electrical, mechanical, and/or electro-mechanical device that can capture the one or more graphical images included, for example, printed, painted, or stamped on a golf ball. In some embodiments, the one or more image capture devices 2340 can be implemented in a substantially similar manner as the image capture devices 310.1 through 310.*n* as described above in FIG. 3A and/or FIG. 3B.

Sorting system 2300 includes a plurality of sorting devices 2350 configured to direct a golf ball from sorting line 2320 into one of the collection lines 2330. In some embodiments, sorting devices 2350 can include a mechanical arm or piston configured to push a golf ball from sorting line 2320 into one of the collection lines 2330. In some embodiments, sorting devices 2350 can include a compressed air source coupled to nozzle configured to blow a golf ball from sorting line 2320 into one of the collection lines 2330. In some embodiments, sorting devices 2350 can include a trap door configured to open and allow a golf ball to fall from sorting line 2320 into one of the collection lines 2330.

Each sorting device 2350 can be associated with a particular collection line 2330 designated for golf balls having a particular graphical image 1310. In this manner, once a golf ball having the graphical image 1310 reaches a respective sorting device 2350 that sorting device 2350 can direct the golf ball into the collection line 2330 designated for golf balls having the graphical image 1310.

In some embodiments, each sorting device 2350 can include a golf ball detector 2352 configured to detect when a golf ball arrives at the sorting device 2350. In such embodiments, when the golf ball detector 2352 detects the presence of a golf ball, sorting device 2350 is activated to direct the golf ball into a collection line 2330. In some embodiments, the golf ball detectors 2352 can include a motion sensor. In some embodiments, the golf ball detectors 2352 can include an image capture device configured to capture an image of a golf ball. The image capture device of golf ball detectors 2352 can be any suitable electrical, mechanical, and/or electro-mechanical device that can capture the image of a golf ball. In some embodiments, image capture devices of golf ball detectors 2352 can include one or more digital cameras.

In operation, a golf ball having a graphical image 1310 enters inlet channel 2310 and travels to sorting line 2320. While in either inlet channel 2310 or sorting line 2320, the graphical image 1310 is imaged by one or more image capture devices 2340. After one or more images of the golf ball is captured, controller 2302 processes the image and identified the graphical image 1310 in a substantially similar manner as described above in FIG. 4A through FIG. 4D. In some embodiments, controller 2302 can be a component of a golf entertainment venue computing system, such as the golf entertainment venue computing system 106 as described above.

Once the graphical image 1310 is imaged and identified by the controller 2302, the golf ball travels along sorting line 2320 until it reaches a designated collection line 2330 for golf balls having the graphical image 1310. Once the golf ball reaches the designated collection line 2330, a sorting device 2350 associated with the collection line 2330 directs the golf ball from sorting line 2320 into the collection line 2330. The golf ball then travels in collection line 2330 to a collection area 2332.

In some embodiments, controller 2302 can be configured to sort golf balls by allowing only one golf ball to travel along sorting line 2320 at any given time. In such embodiments, the graphical image 1310 on a first golf ball is imaged and identified, the controller 2302 associates the first golf ball with a designated collection line 2330, the first golf ball travels down sorting line 2320 until it is detected by the detector 2352 of the sorting device 2350 associated with the designated collection line 2330, and the sorting device 2350 directs the first golf ball into the designated collection line 2330. Once the first golf ball is sorted, a second golf ball is imaged, identified, and sorted in the same manner as the first golf ball, and so on. In such embodiments, controller 2302 can execute an algorithm for associating respective graphical images with respective collection lines and actuating respective sorting devices when the detector of the sorting device first detects the presence of a golf ball.

In some embodiments, controller 2302 can be configured to sort multiple golf balls as they simultaneously travel along sorting line 2320. In such embodiments, the graphical image 1310 on a first golf ball is imaged and identified, and the controller 2302 associates the first golf ball with a first designated collection line 2330 and assigns a counter number to the detector 2352 of the sorting device 2350 associated with the first designated collection line 2330. The counter number informs the sorting device 2350 to activate once the detector 2352 detects the number of golf balls that arrive at the sorting device 2350 equal to the counter number. Once the correct number of golf balls are counted, the sorting device 2350 is activated to direct the first golf ball into the first designated collection line 2330, and the counter number for that detector 2352 is reset. Simultaneously, the graphical image 1310 on a second golf ball is imaged and identified, and the controller 2302 associates the second golf ball with a second designated collection line 2330 and assigns a counter number to the detector 2352 of the sorting device 2350 associated with the second designated collection line 2330. The counter number informs the sorting device 2350 to activate once the detector 2352 detects the number of golf balls that arrive at the sorting device 2350 equal to the counter number. Once the correct number of golf balls are counted, the sorting device 2350 is activated to direct the second golf ball into the second designated collection line 2330, and the counter number for that detector 2352 is reset.

In some embodiments configured to sort multiple golf balls as they simultaneously travel along sorting line 2320, controller 2302 can execute an algorithm for associating respective graphical images with respective collection lines and assigning counter numbers for respective detectors. By knowing the number and order of the golf balls in sorting line 2320, the algorithm can continuously update and assign counter numbers to sort the golf balls accordingly. If a detector 2352 is reassigned an updated counter number higher than previous counter number, the counter number for that detector 2352 is increased to let additional balls pass. If a detector is reassigned an updated counter number equal to or lower than a previous counter number, the detector's counter number is updated only after the first counter number is satisfied.

For example, if a first golf ball is designated for the fourth collection line 2330 in FIG. 23 and a second golf ball, imaged after the first golf ball, is designated for the third collection line 2330 in FIG. 23, controller 2302 assigns the following counter numbers (n) to the four detectors 2352: n=1 for the fourth detector, n=2 for the third detector, n=3 for the second detector, and n=3 for the first detector. Then, if a third golf ball imaged after the second golf ball, is designated for the third collection line 2330 in FIG. 23, controller 2302 assigns the following counter numbers (n) to the four detectors 2352: n=1 for the fourth detector, n=1 for the third detector, n=4 for the second detector, and n=4 for the first detector. The counter number of "1" for the third detector will be assigned immediately after the third detector satisfies its first counter number of 2. In this manner, the third sorting device in FIG. 23 will be activated when the second and third balls arrive. Then, if a fourth golf ball imaged after the third golf ball, is designated for the first collection line 2330 in FIG. 23, controller 2302 assigns the following counter numbers (n) to the four detectors 2352: n=1 for the fourth detector, n=1 for the third detector, n=4 for the second detector, and n=4 for the first detector. In this manner, the first sorting device in FIG. 23 will be activated when the fourth ball arrives.

In some embodiments, sorting system 2300 can be configured to sort worn golf balls for the golf entertainment venue. In some embodiments, sorting system 2300 can include a collection line 2360 and a collection area 2362 for worn golf balls and a sorting device 2350 associated with the collection line 2360. In this manner, once a worn golf ball reaches the sorting device 2350 associated with collection line 2360, that sorting device 2350 can direct the golf ball into the collection line 2360 designated for worn golf balls. Sorting device 2350 associated with collection line 2360 can be the same as sorting devices 2350 associated with other collection lines 2330 and can include a golf ball detector 2352 configured to detect when a golf ball arrives at the sorting device 2350. In some embodiments, sorting system 2300 can include a collection line 2360 for worn golf balls located at the end of sorting line 2320 and not including a sorting device 2350. In such embodiments, worn golf balls that are not sorted by sorting devices 2350 are simply directed into collection line 2360 after passing by all the collections lines 2330.

In some embodiments, sorting system 2300 can be incorporated into a traditional driving range venue that does not track golf balls for the purposes of assigning players a score. In such embodiments, golf balls collected from the driving range can be delivered to sorting system 2300 for sorting based on the one or more graphical images included, for example, printed, painted, or stamped on the golf balls. In some embodiments, the one or more graphical images included, for example, printed, painted, or stamped on the golf balls can be used to sort different types of golf balls at the driving range. Different types of golf balls can include, but are not limited to, different golf ball bands, or different golf ball designs.

Different golf ball bands, include but are not limited, TaylorMade® golf balls, Callaway® golf balls, and Titleist® golf balls. In some embodiments including sorting golf balls based on golf ball band, one or more graphical images that are, for example, printed, painted, or stamped on the golf balls can be associated with a particular golf ball band. In this manner, all golf balls of that golf ball brand can be sorted to a designated collection area 2332 of sorting system 2300. For example, a first graphical image (for example, stripe pattern 2000 illustrated in FIG. 20) can be included on all TaylorMade® golf balls and a second graphical image (for example, a peace sign graphical image) can be included on all Titleist® golf balls. By sorting golf ball brands using different graphical images, the particular golf ball brands can be sorted and provided to a player who wants to practice with a particular golf ball brand.

Different golf ball designs can include, but art not limited to TaylorMade® TP5 golf balls, TaylorMade® TP5x golf balls, Callaway® Chrome Soft golf balls, Callaway® Chrome Soft X golf balls, Titleist® Pro V1 golf balls, and Titleist® TourSoft golf balls. In some embodiments including sorting golf balls based on golf ball design, one or more graphical images that are, for example, printed, painted, or stamped on the golf balls can be associated with a particular golf ball design. In this manner, all golf balls of that golf ball design can be sorted to a designated collection area 2332 of sorting system 2300. For example, a first graphical image (for example, stripe pattern 2000 illustrated in FIG. 20) can be included on all TaylorMade® TP5 golf balls and a second graphical image (for example, stripe pattern 2100 illustrated in FIG. 21) can be included on all TaylorMade® TP5x golf balls. By sorting golf ball designs using different graphical images, the particular golf ball designs can be sorted and provided to a player who wants to practice with a particular golf ball design.

In some embodiments, the one or more graphical images, for example, printed, painted, or stamped on the golf balls, can be used to sort different golf balls at the driving range for a particular player. For example, a particular player can be assigned golf balls with one or more graphical images that are, for example, printed, painted, or stamped, on the golf balls. In such embodiments, after the particular player hits the golf balls, the golf balls can be collected, sorted, and returned to the player for re-use later.

In some embodiments, sorting system 2300 can be configured to identify a worn golf ball by analyzing the one or more graphical images on a golf ball captured by the one or more image capture devices 2340. In some embodiments, a worn golf ball can be identified using an edge detection analysis as to be described in further detail below in FIG. 24. In some embodiments, the sorting system 2300 can identify the worn golf ball through scuff wear detection that will be apparent to those skilled in the relevant art(s) without departing from the spirit and scope of the present disclosure. For example, this scuff wear detection can determine whether a warn golf ball includes cuts, gashes, abrasions, etc. which can cause the golf ball to be removed from future use within the golf entertainment venue or dirt and/or other debris which can be removed from the golf ball through cleaning. In some embodiments, the golf ball can include an inner layer of material, for example, ultraviolet paint to provide an example. This inner layer of material can include, for example, ultraviolet paint that is not visible to the human eye. In these embodiments, the golf ball 2404 can include an outer layer of material covering the inner layer in its entirety that is removed, for example, chipped away, through use of the golf ball 2404 to expose the inner layer of material. In this example, the sorting system 2300 can image the golf ball 2404 to capture the underlying inner layer of material exposed and can thereafter compare the amount of the inner layer of material exposed to an inner layer exposure threshold to determine whether to remove the golf ball from future use.

Exemplary Image Processing Techniques that can be Used within the Exemplary Golf Entertainment Venue FIG. 24 graphically illustrates exemplary image processing techniques that can be used within the exemplary golf entertainment venue according to some embodiments of the present disclosure. As described above, a golf entertainment venue computing system, such as the golf entertainment venue computing system 106 as described above, can process one or more digital images of golf balls within a golf entertainment venue to identify one or more graphical images included, for example, printed, painted, or stamped, on the golf balls. The discussion of FIG. 24 to follow is to describe an exemplary edge detection technique 2400 that identifies points in an input digital image 2402 where the brightness of the input digital image 2402 changes sharply, for example, includes discontinuities. These points can be referred to as edges, or boundaries, of the input digital image 2402. In some embodiments, the golf entertainment venue computing system 106 as described above in FIG. 1 can execute the exemplary edge detection technique 2400 to identify the edges, or the boundaries, of the input digital image 2402. In some embodiments, controller 2302 of the golf entertainment venue computing system 106 as described above in FIG. 1 can execute the exemplary edge detection technique 2400 to identify the edges, or the boundaries, of the input digital image 2402.

In the exemplary embodiment illustrated in FIG. 24, the golf entertainment venue can capture the input digital image 2402 of a golf ball 2404 having a graphical image 2406. In some embodiments, the golf entertainment venue can capture the input digital image 2402 in a substantially similar manner as described above in FIG. 3A, FIG. 3B, FIG. 7A, FIG. 7B, and FIG. 23. As illustrated in FIG. 24, the graphical image 2406 includes a striped pattern as described above, for example, in FIG. 20 through FIG. 22. However, the striped pattern as illustrated in FIG. 24 is for convenience only and not limiting. Those skilled in the relevant art(s) will recognize that the graphical image 2406 can include any of the graphical images described above and/or combinations thereof without departing from the spirit and scope of the present disclosure.

Generally, the edge detection technique 2400 performs a mathematical operation on the input digital image 2402 to identify the edges, or the boundaries, of the input digital image 2402 to provide an output digital image 2414 illustrating these edges, or these boundaries. In the exemplary embodiment illustrated in FIG. 24, the edge detection technique 2400 transforms the input digital image 2402 into an image matrix 2408 having points $p_{11}$ through $p_{ab}$ that are arranged in a series of a-rows and b-columns to form a matrix of points. In some embodiments, the points $p_{11}$ through $p_{ab}$ represent intensity values of the input digital image 2402 at different locations within the input digital image 2402. In these embodiments, these intensity values can be expressed in terms of hues, values, and/or chromas to provide some examples at different locations within the input digital image 2402.

As illustrated in FIG. 24, the edge detection technique 2400 performs a mathematical operation, such as convolution to provide an example, on the image matrix 2408 to provide an edge, or edge matrix 2412. As illustrated in FIG. 24, the edge detection technique 2400 performs a convolution between the image matrix 2408 and an edge filter matrix 2410 to provide the edge matrix 2412. In the exemplary embodiment illustrated in FIG. 24, the edge filter matrix 2410 includes coefficients $f_{11}$ through $f_{cd}$ that are arranged in a series of c-rows and d-columns to form a matrix of coefficients. In some embodiments, the edge filter matrix 2410 can represent a Prewitt edge detection filter, a Sobel edge detection filter, a Laplacian edge detection filter, a Canny edge detection filter, and/or any other suitable edge detection filter that will be apparent to those skilled in the relevant art(s) without departing from the spirit and scope of the present disclosure. In some embodiments, the edge filter matrix 2410 represents a three-by-three edge filter matrix; however, other matrices are possible that will be apparent to those skilled in the relevant art(s) without departing from the spirit and scope of the present disclosure.

In the exemplary embodiment illustrated FIG. 24, the edge matrix 2412 includes edge detection values $e_{11}$ through $e_{fg}$ that are arranged in a series of f-rows and g-columns to form a matrix of edge detection values. In some embodiments, the edge matrix 2412 can include less elements, for example, be a smaller size, than the image matrix 2408. In these embodiments, the image matrix 2408 can be padded to accommodate for this difference. As illustrated in FIG. 24, the edge detection technique 2400 can process the edge matrix 2412 to identify the edges, or the boundaries, of the input digital image 2402 to provide the output digital image 2414 having an edge, or boundary, 2416. In some embodiments, the edge detection technique 2400 compares the edge detection values $e_{11}$ through $e_{fg}$ with one another to identify the edge 2416 of the output digital image 2414. In some embodiments, the edge detection technique 2400 compares neighboring, adjacent edge detection values from among the edge detection values $e_{11}$ through $e_{fg}$ with each other to determine an intensity difference between these neighboring, adjacent edge detection values. In these embodiments, the edge detection technique 2400 can determine that the edge 2416 is between these neighboring, adjacent edge detection values when the intensity difference between these neighboring, adjacent edge detection values is greater than or equal to an intensity difference threshold. Otherwise, the edge detection technique 2400 can determine that the edge 2416 is not between these neighboring, adjacent edge detection values when the intensity difference between these neighboring, adjacent edge detection values is less than an intensity difference threshold.

In the exemplary embodiment illustrated in FIG. 24, the golf entertainment venue computing system can process the image matrix 2408 and/or the edge matrix 2412 to determine degradation, also referred to as wear, of the golf ball 2404 that can result from its repetitive use within the golf entertainment venue. For example, dirt and/or other debris can accumulate on the golf ball 2404 through the repetitive use of the golf ball 2404 within the golf entertainment venue. As another example, the graphical image 2406 can lighten, for example, fade, through the repetitive use of the golf ball 2404 within the golf entertainment venue. In some embodiments, the golf entertainment venue computing system can cause the golf ball 2404 to be removed from future use within the golf entertainment venue based upon the degradation of the golf ball 2404.

In some embodiments, the golf entertainment venue computing system can calculate one or more statistical measures of the golf ball 2404 from the image matrix 2408 and/or the edge matrix 2412 to numerically quantify the degradation of the golf ball 2404. As described above, the points $p_{11}$ through $p_{ab}$ of the image matrix 2408 represent intensity values of the input digital image 2402 at different locations. In some embodiments, the dirt and/or other debris on the golf ball 2404 as well as the fading of the graphical image 2406 can cause the points $p_{11}$ through $p_{ab}$ of the golf ball 2404 to change over time. In some embodiments, the golf entertainment venue computing system can utilize the image matrix 2408 to calculate the one or more statistical measures, for example, a mean, a median, a variance, and/or a standard deviation to provide some examples, of the intensity values of the golf ball 2404, or a portion thereof.

As described above, the edge detection values $e_{11}$ through $e_{fg}$ of the edge matrix 2412 can be utilized to identify the edge 2416. In some embodiments, the dirt and/or other debris on the golf ball 2404 as well as the fading of the graphical image 2406 can cause the edge detection values $e_{11}$ through $e_{fg}$ of the golf ball 2404 to change over time. In some embodiments, the golf entertainment venue computing system can utilize the neighboring, adjacent edge detection values having the intensity difference that is greater than or equal to the intensity difference threshold, for example, those along the edge 2416, to calculate the one or more statistical measures, for example, a mean, a median, a variance, and/or a standard deviation to provide some examples, of the intensity differences between neighboring, adjacent edge detection values of the golf ball 2404, or a portion thereof. The golf entertainment venue computing system can compare these statistical measures to one or more golf ball edge degradation thresholds to determine whether to remove the golf ball 2404 from future use within the golf entertainment venue. In some embodiments, the golf entertainment venue computing system can utilize the neighboring, adjacent edge detection values having the intensity difference that is less than the intensity difference threshold, for example, those within the edge 2416, to calculate the one or more statistical measures, for example, a mean, a median, a variance, and/or a standard deviation to provide some examples, of the intensity differences between neighboring, adjacent edge detection values of the golf ball 2404, or a portion thereof. The golf entertainment venue computing system can compare these statistical measures to one or more golf ball color degradation thresholds to determine whether to remove the golf ball 2404 from future use within the golf entertainment venue.

Generally, the one or more golf ball edge degradation thresholds and/or the golf ball color degradation thresholds represent adaptive thresholds that can be adapted over time, for example, using a machine learning process. In some embodiments, the one or more golf ball edge degradation thresholds and/or the golf ball color degradation thresholds can be adaptive adjusted in response to environmental elements, such as sunlight, precipitation, wind, and/or humidity to provide some examples. In some embodiments, the one or more golf ball edge degradation thresholds and/or the golf ball color degradation thresholds can represent a percentage difference between the neighboring, adjacent edge detection values, for example, 1%, 5%, 10%, 25%, etc.

CONCLUSION

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A computing system for a golf entertainment venue, the computing system comprising:

one or more memories that store a golf ball registration database, the golf ball registration database including a plurality of graphical images included on a plurality of golf balls within the golf entertainment venue; and one or more processors configured to execute instructions stored in the one or more memories, the instructions, when executed by the one or more processors, configuring the one or more processors to:

receive a first digital image of a golf ball from among the plurality of golf balls that is to be hit by a player from a teeing area within the golf entertainment venue, identify a graphical image included on the golf ball from the first digital image, register the graphical image included on the golf ball to the player in the golf ball registration database, receive a second digital image of the golf ball in response to the golf ball arriving at a target area within the golf entertainment venue, identify the graphical image included on the golf ball from the second digital image, identify that the player hit the golf ball that arrives at the target area from the graphical image included on the golf ball using the golf ball registration database, receive a third digital image of the golf ball as the golf ball is travelling through a sorting system of the golf entertainment venue, calculate a statistical measure of the golf ball from the third digital image to numerically quantify a degradation level of the golf ball, and compare the statistical measure to a golf ball degradation threshold to determine whether to remove the golf ball from being used within the golf entertainment venue.

2. The computing system of claim 1, wherein the instructions, when executed by the one or more processors, configure the one or more processors to:

identify a second graphical image from among the plurality of graphical images of the golf ball registration database that matches the graphical image included on the golf ball; and associate the second graphical image to the player in the golf ball registration database to register the graphical image included on the golf ball to the player in the golf ball registration database.

3. The computing system of claim 1, wherein the instructions, when executed by the one or more processors, configure the one or more processors to:

identify a second graphical image from among the plurality of graphical images of the golf ball registration database that matches the graphical image included on the golf ball; and identify the player that is associated with the second graphical image in the golf ball registration database as the player that hit the golf ball that arrives at the target area.

4. The computing system of claim 1, wherein the instructions, when executed by the one or more processors, configure the one or more processors to:

receive the first digital image from a teeing area image capture device associated with the teeing area; and receive the second digital image from a target area image capture device associated with the target area.

5. The computing system of claim 1, wherein the plurality of graphical images are configured and arranged on the plurality of golf balls to differentiate the plurality of golf balls from one another.

6. The computing system of claim 1, wherein the instructions, when executed by the one or more processors, configure the one or more processors to:

identify the graphical image included on the golf ball from the third digital image; and sort the golf ball to be collected with other golf balls within the golf entertainment venue having the graphical image.

7. The computing system of claim 1, wherein the instructions, when executed by the one or more processors, configure the one or more processors to:

process the third digital image to generate an edge matrix representing edge detection values of the golf ball;

compare neighboring, adjacent edge detection values from among the edge matrix to identify a plurality of edges of the golf ball; and calculate the statistical measure of the plurality of edges of the golf ball to numerically quantify the degradation level of the golf ball.

8. A method for operating a golf entertainment venue, the method comprising:

capturing, by a first image capture device within the golf entertainment venue, a first digital image of a golf ball that is to be hit by a player from a teeing area within the golf entertainment venue, the first digital image including the golf ball having a graphical image to differentiate the golf ball from other golf balls within the golf entertainment venue;

registering, by a computing system within the golf entertainment venue using the first digital image, the graphical image included on the golf ball to the player in a golf ball registration database;

capturing, by a second image capture device within the golf entertainment venue, a second digital image of the golf ball in response to the golf ball arriving at a target area within the golf entertainment venue, the second digital image including the golf ball having the graphical image;

identifying, by the computing system using the second digital image, that the player hit the golf ball that arrives at the target area from the graphical image included on the golf ball using the golf ball registration database;

capturing, by the computing system, a third digital image of the golf ball as the golf ball is travelling through a sorting system within the golf entertainment venue;

calculating, by the computing system using the third digital image, a statistical measure of the golf ball to numerically quantify a degradation level of the golf ball; and comparing, by the computing system, the statistical measure to a golf ball degradation threshold to determine whether to remove the golf ball from being used within the golf entertainment venue.

9. The method of claim 8, wherein the capturing the first digital image comprises capturing the first digital image at the teeing area, and wherein the capturing the second digital image comprises capturing the second digital image at the target area.

10. The method of claim 8, wherein the registering the graphical image comprises:

identifying a second graphical image from among a plurality of graphical images of the golf ball registration database that matches the graphical image included on the golf ball; and associating the second graphical image to the player in the golf ball registration database to register the graphical image included on the golf ball to the player in the golf ball registration database.

11. The method of claim 8, wherein the identifying that the player hit the golf ball comprises:

identifying a second graphical image from among a plurality of graphical images of the golf ball registration database that matches the graphical image included on the golf ball; and identifying the player that is associated with the second graphical image in the golf ball registration database as the player that hit the golf ball that arrives at the target area.

12. The method of claim 8, further comprising sorting the golf ball to be collected with other golf balls within the golf entertainment venue having the graphical image.

13. The method of claim 8, wherein the calculating comprises:

processing the third digital image to generate an edge matrix representing edge detection values of the golf ball;

comparing neighboring, adjacent edge detection values from among the edge matrix to identify a plurality of edges of the golf ball; and calculating the statistical measure of the plurality of edges of the golf ball to numerically quantify the degradation level of the golf ball.

14. A golf entertainment venue, comprising:

a first image capture device configured to capture a first digital image of a golf ball that is to be hit by a player from a teeing area within the golf entertainment venue, the first digital image including the golf ball having a graphical image to differentiate the golf ball from other golf balls within the golf entertainment venue;

a second image capture device configured to capture a second digital image of the golf ball in response to the golf ball arriving at a target area within the golf entertainment venue, the second digital image including the golf ball having the graphical image;

a golf entertainment venue computing system configured to:

identify the graphical image included on the golf ball from the first digital image, register the graphical image included on the golf ball to the player in a golf ball registration database, identify the graphical image included on the golf ball from the second digital image, and identify that the player hit the golf ball that arrives at the target area from the graphical image included on the golf ball using the golf ball registration database; and a sorting system configured to:

capture a third digital image of the golf ball as the golf ball is travelling through the sorting system;

calculate a statistical measure of the golf ball from the third digital image to numerically quantify a degradation level of the golf ball; and

US 12,623,129 B2

53 compare the statistical measure to a golf ball degradation threshold to determine whether to remove the golf ball from being used within the golf entertainment venue.

15. The golf entertainment venue of claim 14, wherein the golf entertainment venue computing system comprises:
    a teeing area computing device; and
    a golf entertainment venue computing device,
    wherein the teeing area computing device and the golf entertainment venue computing device are configured to functionally cooperate to register the graphical image included on the golf ball to the player in the golf ball registration database.

16. The golf entertainment venue of claim 14, wherein the golf entertainment venue computing system comprises:
    a target area computing device; and
    a golf entertainment venue computing device,
    wherein the target area computing device and the golf entertainment venue computing device are configured to functionally cooperate to identify that the player hit the golf ball that arrives at the target area from the graphical image included on the golf ball using the golf ball registration database.

17. The golf entertainment venue of claim 14, wherein the golf entertainment venue computing system is configured to:
    identify a second graphical image from among a plurality of graphical images of the golf ball registration database that matches the graphical image included on the golf ball; and

54 associate the second graphical image to the player in the golf ball registration database to register the graphical image included on the golf ball to the player in the golf ball registration database.

18. The golf entertainment venue of claim 14, wherein the golf entertainment venue computing system is configured to:
    identify a second graphical image from among a plurality of graphical images of the golf ball registration database that matches the graphical image included on the golf ball; and
    identify the player that is associated with the second graphical image in the golf ball registration database as the player that hit the golf ball that arrives at the target area.

19. The golf entertainment venue of claim 14, wherein the sorting system is further configured to sort the golf ball to be collected with other golf balls within the golf entertainment venue having the graphical image.

20. The golf entertainment venue of claim 14, wherein the golf entertainment venue computing system is configured to:
    process the third digital image to generate an edge matrix representing edge detection values of the golf ball;
    compare neighboring, adjacent edge detection values from among the edge matrix to identify a plurality of edges of the golf ball; and
    calculate the statistical measure of the plurality of edges of the golf ball to numerically quantify the degradation level of the golf ball.

* * * * *